US012777114B2

(12) United States Patent
Zhang et al.

(10) Patent No.: US 12,777,114 B2
(45) Date of Patent: Oct. 27, 2026

(54) FUNCTION SWITCHING ENTRY DETERMINING METHOD AND ELECTRONIC DEVICE

(71) Applicant: Huawei Technologies Co., Ltd., Shenzhen (CN)

(72) Inventors: Yanan Zhang, Shenzhen (CN); Hongjun Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 671 days.

(21) Appl. No.: 18/022,116

(22) PCT Filed: Aug. 11, 2021

(86) PCT No.: PCT/CN2021/112128
§ 371 (c)(1),
(2) Date: Feb. 17, 2023

(87) PCT Pub. No.: WO2022/037463
PCT Pub. Date: Feb. 24, 2022

(65) Prior Publication Data

US 2023/0308534 A1 Sep. 28, 2023

(30) Foreign Application Priority Data

Aug. 20, 2020 (CN) ........................ 202010845328.9

(51) Int. Cl.
*H04M 1/72409* (2021.01)
*G06F 9/451* (2018.01)
*H04M 1/72427* (2021.01)

(52) U.S. Cl.
CPC ........ *H04M 1/72409* (2021.01); *G06F 9/451* (2018.02); *H04M 1/72427* (2021.01)

(58) Field of Classification Search
CPC ......... H04M 1/72409; H04M 1/72427; H04M 1/72403; H04M 1/72415; H04M 1/72412;
(Continued)

(56) References Cited

U.S. PATENT DOCUMENTS

2013/0283196 A1* 10/2013 Farnan .............. A61M 5/14244
715/771
2015/0264529 A1* 9/2015 Cho ...................... H04W 4/025
455/456.6
(Continued)

FOREIGN PATENT DOCUMENTS

CN 106465048 A 2/2017
CN 107659712 A 2/2018
(Continued)

OTHER PUBLICATIONS

Kornaros, Georgios. "Hardware-assisted machine learning in resource-constrained IoT environments for security: review and future prospective." IEEE Access 10 (2022): 58603-58622. (Year: 2022).*

*Primary Examiner* — Sharad Rampuria
(74) *Attorney, Agent, or Firm* — Slater Matsil, LLP

(57) ABSTRACT

Embodiments of this application provide a function switching entry determining method and an electronic device, to provide a flexible manner of determining a software/hardware switching entry, and assist a user in conveniently and quickly using a software/hardware capability of a nearby device. According to the method, a control device determines a function requirement of a currently executed task, detects at least one nearby device in a current environment, and determines capability information of the at least one nearby device; and the control device determines at least one first function switching entry based on the function requirement of the currently executed task and the capability
(Continued)

information of the at least one nearby device, and displays the at least one first function switching entry.

9 Claims, 89 Drawing Sheets

(58) Field of Classification Search
CPC ................ H04M 1/72469; G06F 9/451; G06F 3/04817; G06F 3/0482; G06F 3/04883; G06F 3/04886; H04N 21/41407; H04N 21/43615; H04N 21/4131; H04W 4/023; H04W 88/02; Y02P 90/02; G05B 19/4183
See application file for complete search history.

(56) References Cited

U.S. PATENT DOCUMENTS

2015/0378520 A1* 12/2015 Chandrasekaran .......................... H04M 1/72412 715/810
2018/0335939 A1* 11/2018 Karunamuni ........... G06F 9/445
2019/0034075 A1* 1/2019 Smochko ............ G06F 3/04842
2020/0192529 A1* 6/2020 Li .......................... G06F 1/1641
2020/0201491 A1 6/2020 Coffman et al.
2020/0220914 A1* 7/2020 Carrigan ............ H04N 21/4222
2021/0124422 A1* 4/2021 Forsland ............... G06F 1/1626
2021/0274034 A1* 9/2021 Mase ...................... G16H 80/00

FOREIGN PATENT DOCUMENTS

| | | | |
|---|---|---|---|
| CN | 108810594 | A | 11/2018 |
| CN | 109120970 | A | 1/2019 |
| CN | 109976626 | A | 7/2019 |
| CN | 110597473 | A | 12/2019 |
| CN | 110764679 | A | 2/2020 |
| CN | 110825301 | A | 2/2020 |
| CN | 111343698 | A | 6/2020 |
| CN | 111404802 | A | 7/2020 |
| CN | 110248226 | A | 4/2021 |
| CN | 109660842 | A | 6/2021 |
| CN | 110377250 | A | 7/2021 |
| EP | 2939134 | B1 | 11/2018 |
| WO | 2020142293 | A1 | 7/2020 |
| WO | 2020155014 | A1 | 8/2020 |

* cited by examiner

CONT. FROM FIG. 10A

CONT. FROM FIG. 11A

CONT. FROM FIG. 12A

TO FIG. 13B

CONT. FROM FIG. 13A

TO FIG. 15B

When no nearby device is connected

After a user selects a Vision device

CONT. FROM FIG. 20A

CONT. FROM FIG. 21A

CONT. FROM FIG. 22A

CONT. FROM FIG. 28A

CONT. FROM FIG. 30(b)

CONT. FROM FIG. 31(b)

CONT. FROM FIG. 32(a)

TO FIG. 32(c)

CONT. FROM FIG. 32(b)

CONT. FROM FIG. 33(a)

TO FIG. 33(c)

CONT. FROM FIG. 33(b)

CONT. FROM FIG. 36(a)

TO FIG. 36(c)

CONT. FROM FIG. 36(b)

CONT. FROM FIG. 36(d)

CONT. FROM FIG. 37A

CONT. FROM FIG. 44A

CONT. FROM FIG. 46A

CONT. FROM FIG. 48A

CONT. FROM FIG. 50(b)

FUNCTION SWITCHING ENTRY DETERMINING METHOD AND ELECTRONIC DEVICE

CROSS-REFERENCE TO RELATED APPLICATIONS

This application is a national stage of International Application No. PCT/CN2021/112128, filed on Aug. 11, 2021, which claims priority to Chinese Patent Application No. 202010845328.9 filed on Aug. 20, 2020. Both of the aforementioned applications are hereby incorporated by reference in their entireties.

TECHNICAL FIELD

This application relates to the field of electronic devices, and in particular, to a function switching entry determining method and an electronic device.

BACKGROUND

All-scenario smart life means that a plurality of electronic devices can be controlled by using a control device to implement flexible use of the electronic devices in various scenarios. For example, by using the control device, a smart sound box is controlled to play music, or a smart air conditioner is controlled to adjust an operating mode or a temperature.

The control device may be a mobile phone commonly used by a user. As a control center of the all-scenario smart life, the control device can control the plurality of electronic devices. In addition, the plurality of electronic devices can also be used as a hardware input of the control device. Therefore, a function of the control device is improved by combining hardware capabilities of the control device and the plurality of electronic devices.

SUMMARY

This application provides a function switching entry determining method and an electronic device, so that a control device can implement a function of the control device by using a device capability of a nearby device.

According to a first aspect, embodiments of this application provide a function switching entry determining method. The method includes the following steps.

A control device determines a function requirement of a currently executed task, detects at least one first nearby device in a current environment, and determines capability information of the at least one first nearby device; the control device determines at least one first function switching entry based on the function requirement of the currently executed task and the capability information of the at least one first nearby device, where the first function switching entry is used to map a function corresponding to the first function switching entry to the at least one first nearby device, and the function corresponding to the first function switching entry is some or all of functions in the function requirement of the currently executed task; and the control device displays the at least one first function switching entry.

In the method, the control device can analyze the currently executed task, and determine the function requirement of the currently executed task. For example, if the control device currently executes a video playing task, the control device determines that a function requirement of the task is video output and audio output. The control device detects the first nearby device, and determines the capability information of the first nearby device in the current environment. For example, the control device detects that the first nearby device includes a Vision device, and determines that capability information of the Vision device is that the Vision device has a screen and can perform audio/video playing. In this case, the control device determines, based on the function requirement of the currently executed task and the capability information of the first nearby device, that the first function switching entry may be "projection". Therefore, a function switching entry that is currently required by a user and that is supported by the first nearby device can be determined. In addition, it is convenient for the user to quickly select the function switching entry, so that a nearby device implements a function of the control device. This improves user experience.

In a possible design, before determining the function requirement of the currently executed task, the control device receives a display instruction. The display instruction is used to instruct the control device to display a target interface. After determining the at least one first function switching entry based on the function requirement of the currently executed task and the capability information of the at least one first nearby device, the control device displays the target interface. The target interface includes the at least one first function switching entry and/or an identifier of the at least one first nearby device. In this manner, the at least one first function switching entry determined by the control device is displayed in the target interface, so that it is convenient for the user to select the required first function switching entry in the target interface, and user operations are simplified.

In a possible design, the target interface is a multi-device control center interface, and the display instruction is triggered by the user by using an operating system-level button or a preset gesture; or the target interface is a software/hardware switching interface, and the display instruction is triggered by the user by using a preset button in an application interface. According to this design, the user may trigger, by using a simple operation, display of an operating system-level multi-device control center interface or an application-level software/hardware switching interface, so that it is convenient for the user to view and select a function switching entry at any time without interrupting the currently executed task of the control device.

In a possible design, the at least one first function switching entry includes at least one hardware switching entry and/or at least one software switching entry. The control device may determine the at least one first function switching entry by using, but not limited to, one or a combination of the following manners:

Manner 1: Determine the at least one hardware switching entry based on a hardware function requirement of the currently executed task and hardware capability information of the at least one first nearby device.

Manner 2: Determine the at least one software switching entry based on a software function requirement of the currently executed task and software capability information of the at least one first nearby device.

According to this design, the first function switching entry displayed by the control device in the target interface includes the at least one hardware switching entry and/or the at least one software switching entry, and is not limited to a single projection or audio output switching entry. A plurality of different types of function switching entries are provided for the user, so that a hardware function or a software function of a nearby device can be fully used, and a better service can be provided for the user in combination with the control device and the function of the nearby device.

In a possible design, the control device determines capability information of a second nearby device that currently establishes a connection to the control device, and determines at least one second function switching entry based on the capability information of the second nearby device. The second function switching entry is used to map a function corresponding to the second function switching entry to the second nearby device, and the function corresponding to the second function switching entry is some or all of the functions in the function requirement of the currently executed task. In this manner, when the control device has currently established a connection to the second nearby device, the at least one second function switching entry corresponding to the capability information of the second nearby device is presented to the user. In this way, a function switching entry is more flexibly determined, and it is convenient for the user to implement a function of the control device by using the second nearby device that has currently established a connection to the control device.

In a possible design, the target interface further includes the at least one second function switching entry and/or an identifier of the second nearby device.

In a possible design, after the control device displays the target interface, the control device receives a target switching instruction, where the target switching instruction is used to instruct the control device to map a target function to a target nearby device; and in response to the target switching instruction, the control device implements the target function by using the target nearby device. In this manner, after the user triggers the target switching instruction, the control device implements the target function by using the target nearby device, and provides a service for the user with reference to the target nearby device and the control device, thereby improving user experience.

It may be understood that the target device may be the first nearby device, or may be the second nearby device.

In a possible design, the target function is a preset hardware function or software function; or the target function is a hardware function or a software function that is determined by the control device based on a hardware capability or a software capability of the target nearby device; or the target function is a hardware function or a software function that is determined by the control device based on the currently executed task. According to this design, after receiving the target switching instruction triggered by the user, the control device can analyze the target nearby device and the currently executed task, and adjust the target function corresponding to the target switching instruction, to provide a more intelligent function switching service for the user.

In a possible design, the currently executed task of the control device is playing a video, and the first nearby device in the current network connection is a Vision device; and the method further includes: determining that the function requirement of the currently executed task is video output, determining that capability information of the Vision device is supporting audio and video playing, and determining that the first function switching entry is projection; or the currently executed task of the control device is playing audio, and the first nearby device in the current network connection is a sound box; and the method further includes: determining that the function requirement of the currently executed task is audio output, determining that capability information of the sound box is supporting audio playing, and determining that the first function switching entry is audio output; or the currently executed task of the control device is Karaoke, and the first nearby device in the current network connection is a Vision device and a sound box; and the method further includes: determining that the function requirement of the currently executed task is video output, audio output, and audio recording, determining that capability information of the Vision device is supporting audio and video playing, determining that capability information of the sound box is supporting audio playing and audio recording, and determining that the first function switching entry is projection, audio output, and audio recording. According to this design, the first function switching entry that is required by the currently executed task and that can be provided by a nearby device can be conveniently and quickly determined, user operations are simplified, and user experience is improved.

According to a second aspect, embodiments of this application further provide a function switching entry determining method. A control device receives a display instruction. The display instruction is used to instruct the control device to display a target interface. The control device displays the target interface in response to the display instruction. The target interface includes at least one function switching entry, and any function switching entry is used to implement a function of the control device by using a nearby device.

In a possible design, the target interface is a multi-device control center interface, and the display instruction is triggered by a user by using an operating system-level button or a preset gesture; or the target interface is a software/hardware switching interface, and the display instruction is triggered by a user by using a preset button in an application interface.

In a possible design, the at least one function switching entry includes: at least one hardware switching entry and/or at least one software switching entry. Before the control device displays the target interface, the control device determines the at least one hardware switching entry displayed in the target interface; and/or the control device determines the at least one software switching entry displayed in the target interface.

In a possible design, the control device determines, according to at least one of the following manners, the at least one hardware switching entry displayed in the target interface: The control device detects at least one nearby device in a current environment, determines a hardware capability of the at least one nearby device, and determines the at least one hardware switching entry based on the hardware capability of the at least one nearby device; the control device determines a hardware requirement corresponding to a currently executed task, and determines the at least one hardware switching entry based on the hardware requirement; and the control device determines a first nearby device that currently establishes a connection to the control device, and determines the at least one hardware switching entry based on a hardware capability of the first nearby device.

In a possible design, the control device determines, according to at least one of the following manners, the at least one software switching entry displayed in the target interface: The control device detects at least one nearby device in a current environment, determines a software capability of the at least one nearby device, and determines the at least one software switching entry based on the software capability of the at least one nearby device; the control device determines a software requirement corresponding to a currently executed task, and determines the at least one software switching entry based on the software requirement; and the control device determines a second nearby device that currently establishes a connection to the control device, and determines the at least one software switching entry based on a software capability of the second nearby device.

In a possible design, the target interface further includes an identifier of the at least one nearby device. Before the control device displays the target interface, the control device detects at least one nearby device in the current environment, and displays the identifier of the at least one nearby device on the target interface.

In a possible design, the control device sorts the identifier of the at least one nearby device according to the following manners: The control device sorts the identifier of the at least one nearby device according to a distance between the nearby device and the control device; or the control device sorts the identifier of the at least one nearby device according to use frequency of the nearby device. The control device displays the identifier of the at least one nearby device in the target interface according to a sorted sequence of the identifier of the at least one nearby device.

In a possible design, after the control device displays the target interface, the control device receives a target switching instruction. The target switching instruction is used to instruct the control device to implement a target function of the control device by using a target nearby device. In response to the target switching instruction, the control device implements the target function by using the target nearby device.

In a possible design, the target function is a preset hardware function or software function; or the target function is a hardware function or a software function that is determined by the control device based on a hardware capability or a software capability of the target nearby device; or the target function is a hardware function or a software function that is determined by the control device based on the currently executed task.

According to a third aspect, embodiments of this application further provide an electronic device, including a processor and a memory. The memory is configured to store one or more computer programs, and when the computer program is executed by the processor, the electronic device is enabled to perform the following operations: determining a function requirement of a currently executed task; detecting at least one first nearby device in a current environment, and determining capability information of the at least one first nearby device; and determining at least one first function switching entry based on the function requirement of the currently executed task and the capability information of the at least one first nearby device. The first function switching entry is used to map a function corresponding to the first function switching entry to the at least one first nearby device, and the function corresponding to the first function switching entry is some or all of functions in the function requirement of the currently executed task. The display is configured to display the at least one first function switching entry.

In a possible design, when the computer program is executed by the processor, the electronic device is enabled to further perform the following operations: receiving a display instruction before determining the function requirement of the currently executed task, where the display instruction is used to instruct the control device to display a target interface; and displaying the target interface on the display after the control device determines the at least one first function switching entry based on the function requirement of the currently executed task and the capability information of the at least one first nearby device. The target interface includes the at least one first function switching entry and/or an identifier of the at least one first nearby device.

In a possible design, the target interface is a multi-device control center interface, and the display instruction is triggered by the user by using an operating system-level button or a preset gesture; or the target interface is a software/hardware switching interface, and the display instruction is triggered by the user by using a preset button in an application interface.

In a possible design, the at least one first function switching entry includes: at least one hardware switching entry and/or at least one software switching entry. When the computer program is executed by the processor, the electronic device is enabled to specifically perform the following operations: determining the at least one hardware switching entry based on a hardware function requirement of the currently executed task and hardware capability information of the at least one first nearby device; and/or determining the at least one software switching entry based on a software function requirement of the currently executed task and software capability information of the at least one first nearby device.

In a possible design, when the computer program is executed by the processor, the electronic device is enabled to further perform the following operations: determining capability information of a second nearby device that currently establishes a connection to the control device; and determining at least one second function switching entry based on the capability information of the second nearby device, where the second function switching entry is configured to map a function corresponding to the second function switching entry to the second nearby device, and the function corresponding to the second function switching entry is some or all of the functions in the function requirement of the currently executed task.

In a possible design, when the computer program is executed by the processor, the electronic device is enabled to further perform the following operation: after the display displays the target interface, receiving a target switching instruction, where the target switching instruction is used to instruct the control device to map a target function to a target nearby device; and in response to the target switching instruction, implementing the target function by using the target nearby device.

In a possible design, the target function is a preset hardware function or software function; or the target function is a hardware function or a software function that is determined by the control device based on a hardware capability or a software capability of the target nearby device; or the target function is a hardware function or a software function that is determined by the control device based on the currently executed task.

In a possible design, the currently executed task of the control device is playing a video, and the first nearby device in the current network connection is a Vision device; and when the computer program is executed by the processor, the electronic device is enabled to specifically perform the following operations: determining that the function requirement of the currently executed task is video output, determining that capability information of the Vision device is supporting audio and video playing, and determining that the first function switching entry is projection; or the currently executed task of the control device is playing audio, and the first nearby device in the current network connection is a sound box; and when the computer program is executed by the processor, the electronic device is enabled to specifically perform the following operations: determining that the function requirement of the currently executed task is audio output, determining that capability information of the sound box is supporting audio playing, and determining that the first function switching entry is audio output; or the currently executed task of the control device is Karaoke, and the first nearby device in the current network connection is a Vision device and a sound box; and when the computer program is executed by the processor, the electronic device is enabled to specifically perform the following operations: determining that the function requirement of the currently executed task is video output, audio output, and audio recording, determining that capability information of the Vision device is supporting audio and video playing, determining that capability information of the sound box is supporting audio playing and audio recording, and determining that the first function switching entry is projection, audio output, and audio recording.

According to a fourth aspect, embodiments of this application further provide an electronic device. The electronic device includes modules/units for performing the method according to any possible design in any one of the foregoing aspects. These modules/units may be implemented by hardware, or may be implemented by hardware by executing corresponding software.

According to a fifth aspect, embodiments of this application further provide a computer-readable storage medium. The computer-readable storage medium includes a computer program. When the computer program is run on an electronic device, the electronic device is enabled to perform the method according to any possible design in any one of the foregoing aspects.

According to a sixth aspect, embodiments of this application further provide a computer program product. When the computer program product runs on a terminal, the electronic device is enabled to perform the method according to any possible design in any one of the foregoing aspects.

According to a seventh aspect, embodiments of this application further provide a chip. The chip is configured to read a computer program stored in a memory, to implement the method according to any possible design in any one of the foregoing aspects.

According to an eighth aspect, embodiments of this application further provide a chip system. The chip system includes a processor, configured to support a terminal device in implementing the method according to any possible design in any one of the foregoing aspects. In a possible design, the chip system further includes a memory. The memory is configured to store program instructions and data that are necessary for the terminal device. The chip system may include a chip, or may include a chip and another discrete component.

DETAILED DESCRIPTION OF ILLUSTRATIVE EMBODIMENTS

Figure 1:
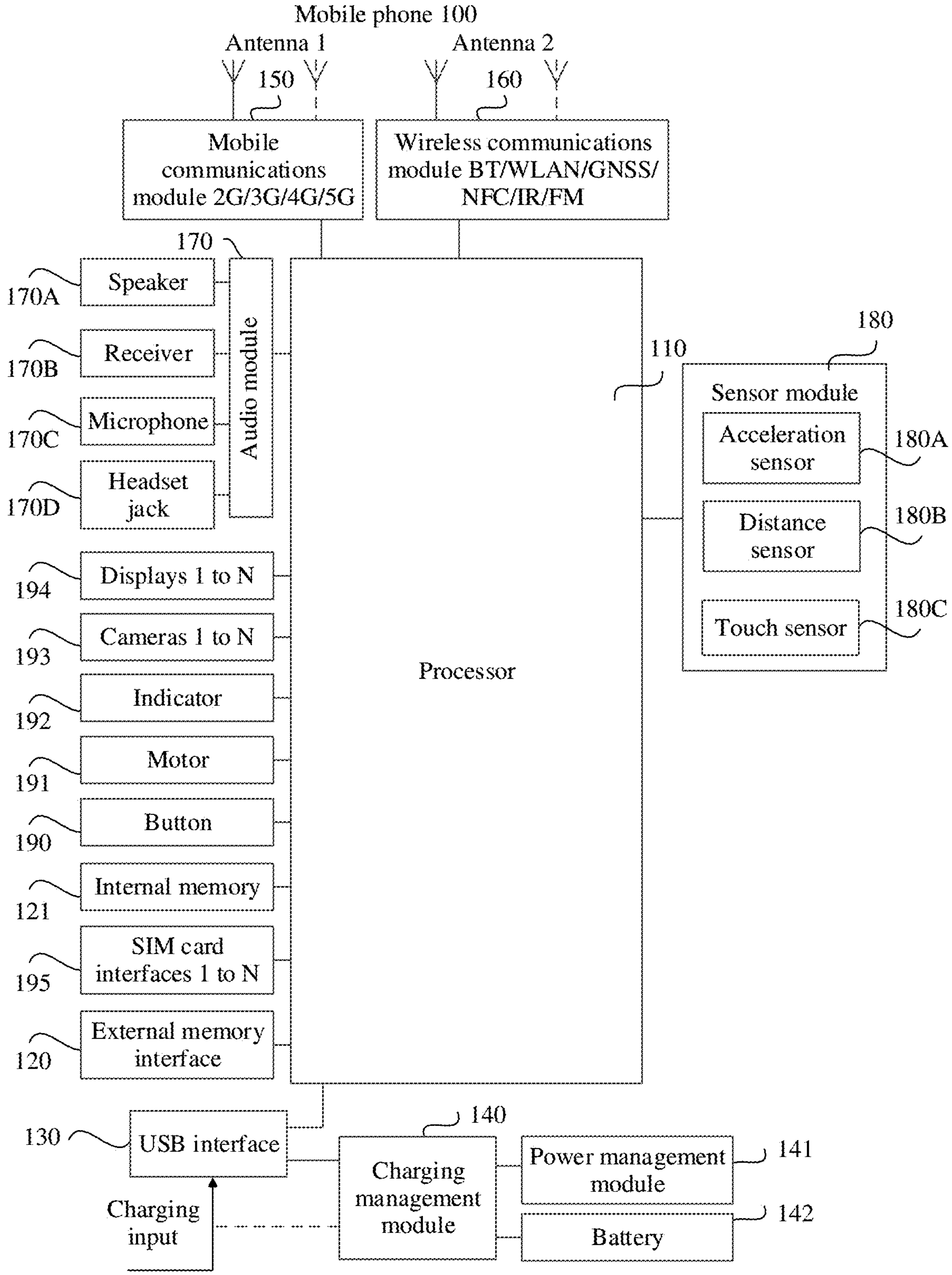
FIG. 1 is a schematic diagram of a hardware structure of an electronic device according to an embodiment of this application.

The following describes some terms in embodiments of this application, to facilitate understanding of a person skilled in the art.

1. The Internet of Things (The Internet of Things, IOT) uses various apparatuses and technologies, such as information sensors, a radio frequency identification technology, a global positioning system, an infrared sensor, and a laser scanner, to collect any objects or processes that need to be monitored, connected, and interact in real time, collect required information, implement ubiquitous connections between an object and another object and between an object and people through various possible network access, and implement intelligent perception, identification, and management of objects and processes. The Internet of Things is the bearer of information such as the Internet and traditional telecommunications networks. It enables all common physical objects that can perform independent addressing to communicate with each other.

2. An electronic device may be, for example, a mobile phone, a tablet computer, a wearable device (such as a watch, a band, a helmet, a headset, and a necklace), a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

In embodiments of this application, the electronic device may include the following types: a control device, a nearby device, and a peripheral device. The following separately describes these types of electronic devices.

The control device is an electronic device that controls the nearby device and the peripheral device, and is usually an electronic device that is frequently used and carried by a user, for example, a smartphone. The user uses the control device to connect to the nearby device or the peripheral device. The control device may send a control instruction to the nearby device or the peripheral device according to an instruction triggered by the user, to implement control on the nearby device or the peripheral device.

The nearby device is a relatively common electronic device, or an electronic device of a same brand as the control device, such as a tablet computer, a computer, a Vision device, or a sound box.

The peripheral device is an electronic device that has a relatively low use frequency, or that belongs to a different brand from the control device but can interact with the control device, for example, a loudspeaker or a smart camera.

3. A multi-device control function can implement control of a control device on a nearby device and/or a peripheral device, to implement a function of the control device by using software and hardware capabilities of the nearby device and/or the peripheral device.

After the multi-device control function of the control device is enabled, a target interface may be displayed on a display according to a display instruction triggered by a user. In embodiments of this application, the target interface includes a multi-device control center interface and a software/hardware switching interface.

For example, after the multi-device control function of the control device is enabled, the multi-device control center interface may be displayed on the display according to a multi-device control center interface display instruction input by the user. In the multi-device control center interface displayed by the control device, a function entry of the control device, a software/hardware switching entry, an identifier of a nearby device, and an identifier of a peripheral device are displayed.

Alternatively, when the multi-device control function of the control device is enabled, if a software/hardware switching interface display instruction input by the user is received in a process of running an application in the foreground, the software/hardware switching interface may be further displayed on the display. In the software/hardware switching interface, a software/hardware switching entry, an identifier of a nearby device, and an identifier of a peripheral device are displayed.

After the multi-device control function is enabled, the nearby device and/or the peripheral device may receive a capability query message sent by the control device, and feed back hardware capability information or software capability information of the nearby device and/or the peripheral device to the control device based on the capability query message; or the nearby device and/or the peripheral device may actively broadcast hardware capability information or software capability information of the nearby device and/or the peripheral device after the multi-device control function is enabled.

It should be noted that the multi-device control function of the control device, the nearby device, or the peripheral device may be configured by default, or may be obtained by installing an application. In addition, the multi-device control function of the control device, the nearby device, or the peripheral device may be started immediately after a power source is turned on, or may be started by the user by operating the multi-device control function.

4. A function switching entry includes a hardware switching entry and a software switching entry. Specifically:

The hardware switching entry is displayed on a display of a control device, and is used to trigger the control device to map a function corresponding to the hardware switching entry to a virtual button of a nearby device. For example, the hardware switching entry of the control device is “projection”. After a user taps “projection” on the display of the control device, the user selects a nearby device for projection, and the control device maps a video output function corresponding to the hardware switching entry “projection” to the nearby device, so that the nearby device is used as a video output device of the control device.

The software switching entry is displayed on the display of the control device, and is used to trigger the control device to map a function corresponding to the software switching entry to a virtual button of the nearby device. For example, the software switching entry of the control device is “computer mode”. In a process of projection from the control device to a Vision device, after the user taps a “computer mode” button on the display of the control device, the control device maps, to the Vision device, a software function displayed in a computer mode corresponding to the software switching entry “computer mode”, so as to project content currently displayed on the display of the control device to the Vision device in the computer mode.

A technical solution in embodiments of this application is described in detail below with reference to the accompanying drawings of the following embodiments of this application.

For example, FIG. 1 is a schematic diagram of a structure of a possible electronic device 100 to which a display method is applicable according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be independent components, or may be integrated into one or more processors. The controller may be a nerve center and a command center of the electronic device 100. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The wireless communications module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application, for example, a viewfinder interface of a camera application. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal of a standard format such as RGB or YUV.

The digital signal processor is configured to process a digital signal. In addition to the digital image signal, the digital signal processor may further process another digital signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by drawing on a structure of a biological neural network, for example, by drawing on a transfer mode between human brain neurons, and may further continuously perform self-learning. Applications such as intelligent cognition of the electronic device 100 may be implemented through the NPU, for example, image recognition, facial recognition, speech recognition, and text understanding.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, software code of at least one application (for example, iQIYI or WeChat), and the like. The data storage area may store data (for example, a shot image or a recorded video) or the like generated when the electronic device 100 is used. In addition, the internal memory 121 may include a high-speed random access memory, and may further include a nonvolatile memory, for example, at least one magnetic disk storage device, a flash memory device, or a universal flash storage (universal flash storage, UFS).

The external memory interface 120 may be configured to connect to an external storage card, for example, a micro SD card, to extend a storage capability of the electronic device. The external memory card communicates with the processor 110 through the external memory interface 120, to implement a data storage function. For example, files such as images or videos are stored in the external storage card.

The electronic device 100 may implement an audio function, for example, music playing and recording, through the audio module 170, the speaker 170A, the receiver 170B, the microphone 170C, the headset jack 170D, the application processor, and the like.

The sensor module 180 may include an acceleration sensor 180A, a distance sensor 180B, a touch sensor 180C, and the like.

The acceleration sensor 180A may detect values of acceleration of the electronic device 100 in various directions (usually on three axes). When the electronic device 100 is still, a value and a direction of gravity may be detected. The acceleration sensor 180A may be further configured to identify a posture of the electronic device 100, and is applied to applications such as a pedometer and switching between a landscape mode and a portrait mode.

The distance sensor 180B is configured to measure a distance. The electronic device 100 may measure the distance in an infrared manner or a laser manner. In some embodiments, the electronic device 100 may measure a distance by using the distance sensor 180B to determine a distance between another electronic device and the electronic device 100.

The touch sensor 180C is also referred to as a "touch panel". The touch sensor 180C may be disposed on the display 194, and the touch sensor 180C and the display 194 form a touchscreen, which is also referred to as a "touch screen" or a "touch display". The touch sensor 180C is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180C may alternatively be disposed on a surface of the electronic device 100 at a location different from a location of the display 194.

The button 190 includes a power button, a volume button, and the like. The button 190 may be a mechanical button, or may be a touch button. The electronic device 100 may receive a button input, and generate a button signal input related to user settings and function control of the electronic device 100. The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. A touch vibration feedback effect may further be customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100.

It can be understood that the components shown in FIG. 1 do not constitute a specific limitation on the electronic device 100. The electronic device in this embodiment of this application may further include more or fewer components than those shown in the figure, or combine some components, or split some components, or have different component arrangements. In addition, a combination/connection relationship between the components in FIG. 1 may also be adjusted and modified.

Figure 2:
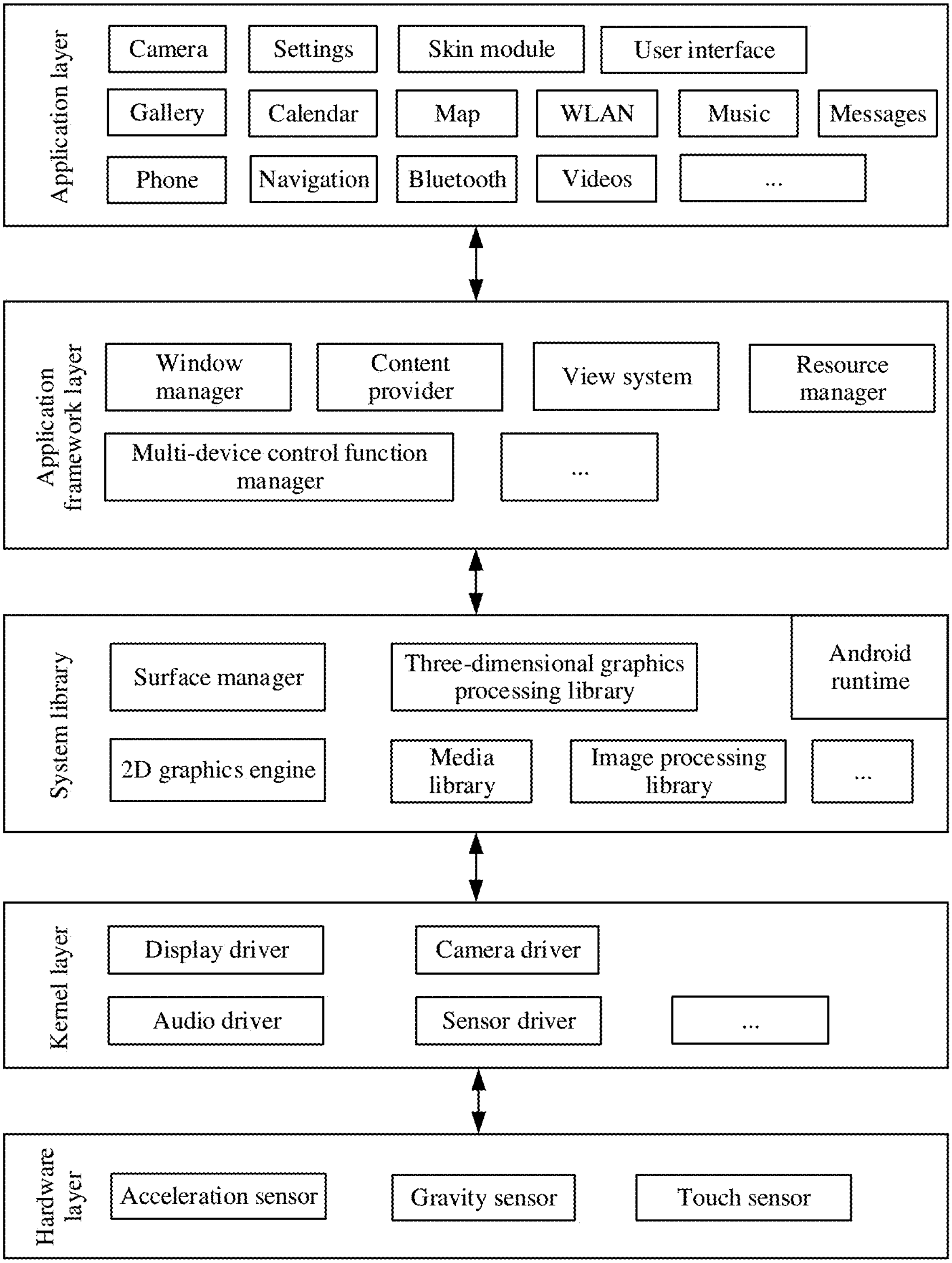
FIG. 2 is a schematic diagram of a software structure of an electronic device according to an embodiment of this application.

FIG. 2 is a block diagram of a software structure of an electronic device according to an embodiment of this application. As shown in FIG. 2, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 2, the application layer may include "Camera", "Settings", a skin module, a user interface (user interface, UI), a third-party application, and the like. The third-party application may include "WeChat", "QQ", "Gallery", "Calendar", "Phone", "Map", "Navigation", "WLAN", "Bluetooth", "Music", "Videos", "Messages", and the like.

The application framework layer provides an application programming interface (application programming interface, API) and a programming framework for an application at the application layer. The application framework layer may include some predefined functions. As shown in FIG. 2, the application framework layer may include a window manager, a content provider, a view system, a resource manager, a multi-device control function manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history, a bookmark, an address book, and the like.

The view system includes visual controls such as a control for displaying a text and a control for displaying an image. The view system may be configured to construct an application. A display interface may include one or more views. For example, a display interface including an SMS notification icon may include a text display view and an image display view.

The resource manager provides various resources for an application, such as a localized character string, an icon, an image, a layout file, and a video file.

For an operating system level, the multi-device control function manager may determine a soft/hardware switching entry, detect a nearby device and/or a peripheral device, and control display of a multi-device control center interface. In the multi-device control center interface, a function entry of the control device, the software/hardware switching entry, an identifier of the nearby device, and an identifier of the peripheral device are displayed.

For an application level, the multi-device control function manager may determine a software/hardware switching entry, detect a nearby device and/or a peripheral device, and control display of a software/hardware switching interface. In the software/hardware switching interface, the software/hardware switching entry, an identifier of the nearby device, and an identifier of the peripheral device are displayed.

The Android runtime includes a kernel library and a virtual machine. The Android runtime is responsible for Android system scheduling and management.

The kernel library includes two parts: One part is a performance function that needs to be invoked by the Java language, and the other part is an Android kernel library. The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, an OpenGL ES), and a 2D graphics engine (for example, an SGL).

The surface manager is configured to manage a display subsystem, and provides fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The hardware layer may include various types of sensors, for example, an acceleration sensor and a touch sensor in this embodiment of this application.

The control device in embodiments of this application may be the electronic device in FIG. 1 and FIG. 2. A method for displaying a multi-device control center interface on the control device in embodiments of this application may be applied to an all-scenario smart life scenario. The all-scenario smart life means that a control device controls a plurality of electronic devices, to implement collaborative work of the electronic devices in various scenarios. In addition, because a hardware function of the control device is limited, another electronic device with a relatively strong software/hardware capability is connected to the control device, so that software/hardware capabilities of a plurality of electronic devices can be used, to improve user experience.

Specifically, a "1+8+N" strategy can be used to improve user experience in the all-scenario smart life. Specifically: 1 indicates a control device, and may be an electronic device commonly used by a user, for example, a mobile phone. The control device serves as a control center in the all-scenario smart life, and is a main entry for interaction between a plurality of electronic devices in the all-scenario smart life.

8 indicates eight types of nearby devices including a personal computer (Personal Computer, PC), a tablet, a Vision device, a sound box, glasses, a watch, an in-vehicle infotainment, and a headset, and serves as an auxiliary entry.

N indicates peripheral devices such as a camera, a floor scanner, and a smart scale, and covers five scenarios including mobile office, smart home, sports and health, audio and video entertainment, and smart travel.

For example, when the control device plays a video, the user may tap a button corresponding to a projection function on the control device, and choose to project the video played on the control device to the Vision device. After receiving a projection instruction, the control device sends data of the currently played video to the Vision device, and the Vision device plays the video based on the received video data, to complete a projection process. The projection function makes full use of the large screen advantages of the Vision device, to provide better viewing experience for the user.

For another example, when the control device plays audio, the user may connect the control device to a sound box in a current environment by performing an operation, and then the control device sends data of the currently played audio to the sound box. The sound box plays an audio file based on the received audio data, to improve an audio playback effect based on an audio playback advantage of the sound box.

However, as the user owns more and more electronic devices such as a sound box, a microphone, a Vision device, and a game controller, a single projection or audio output function cannot meet a comprehensive requirement of the user.

Based on the foregoing problem, an embodiment of this application provides a function switching entry determining method, to provide a flexible manner of determining a software/hardware switching entry, so as to assist a user in conveniently and quickly using a software/hardware capability of a nearby device.

The following separately describes methods for determining an operating system-level function switching entry and an application-level function switching entry of a control device.

1. Operating System Level

A user may send a multi-device control center interface display instruction to the control device through a button, a touch display, or voice input, or in another manner. After receiving the display instruction, the control device displays a multi-device control center interface on a display. For example, the user may perform an up-slide gesture operation at the bottom of the touch display of the control device, to trigger the control device to display the multi-device control center interface; or the user may perform a down-slide gesture operation at the top of the touch display of the control device, to trigger the control device to display the multi-device control center interface; or the user may perform a slide gesture operation at a side of the touch display, to trigger the control device to display the multi-device control center interface.

Figure 3:
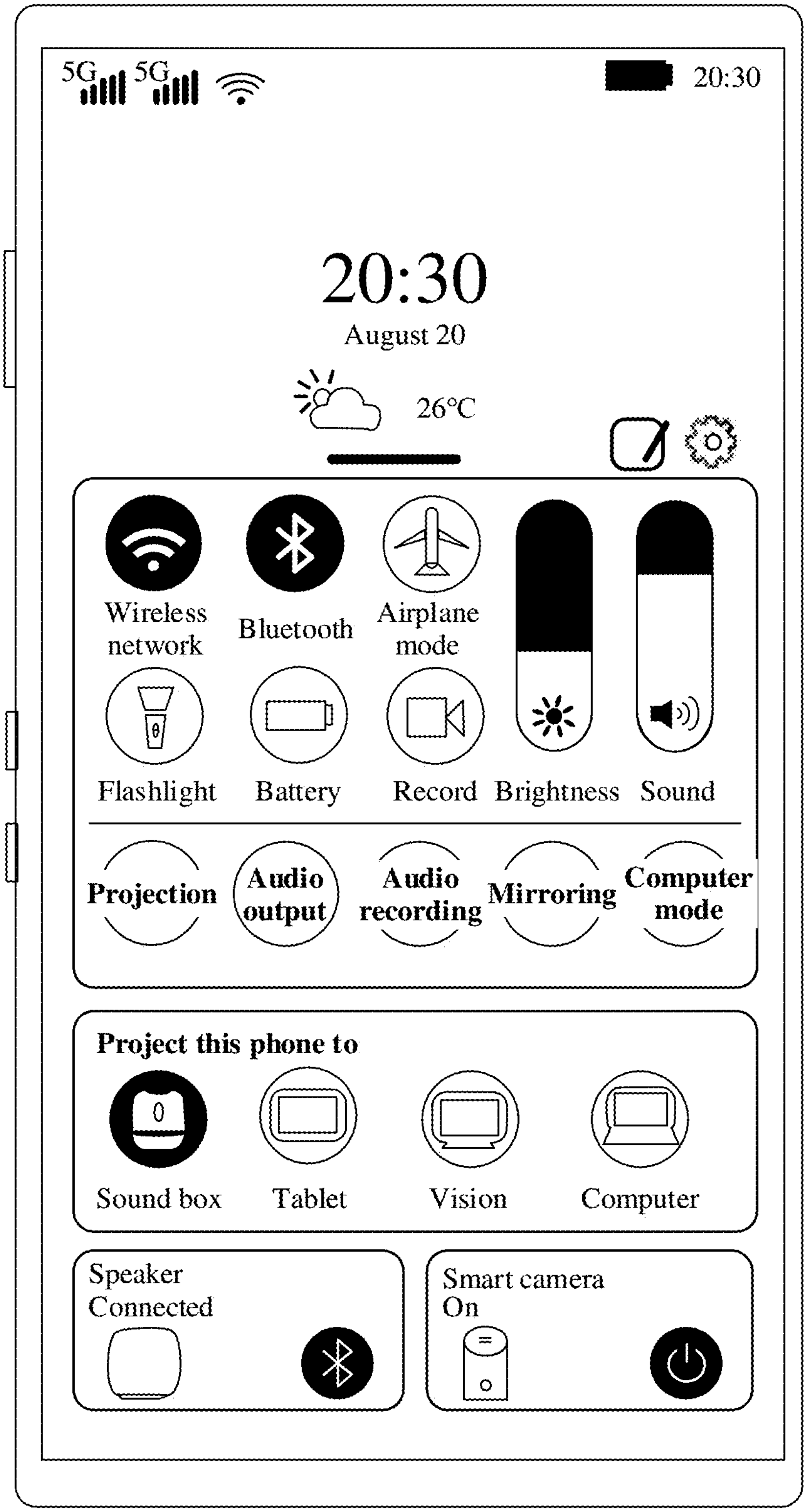
FIG. 3 is a schematic diagram of a first multi-device control center interface according to an embodiment of this application.
Figure 4:
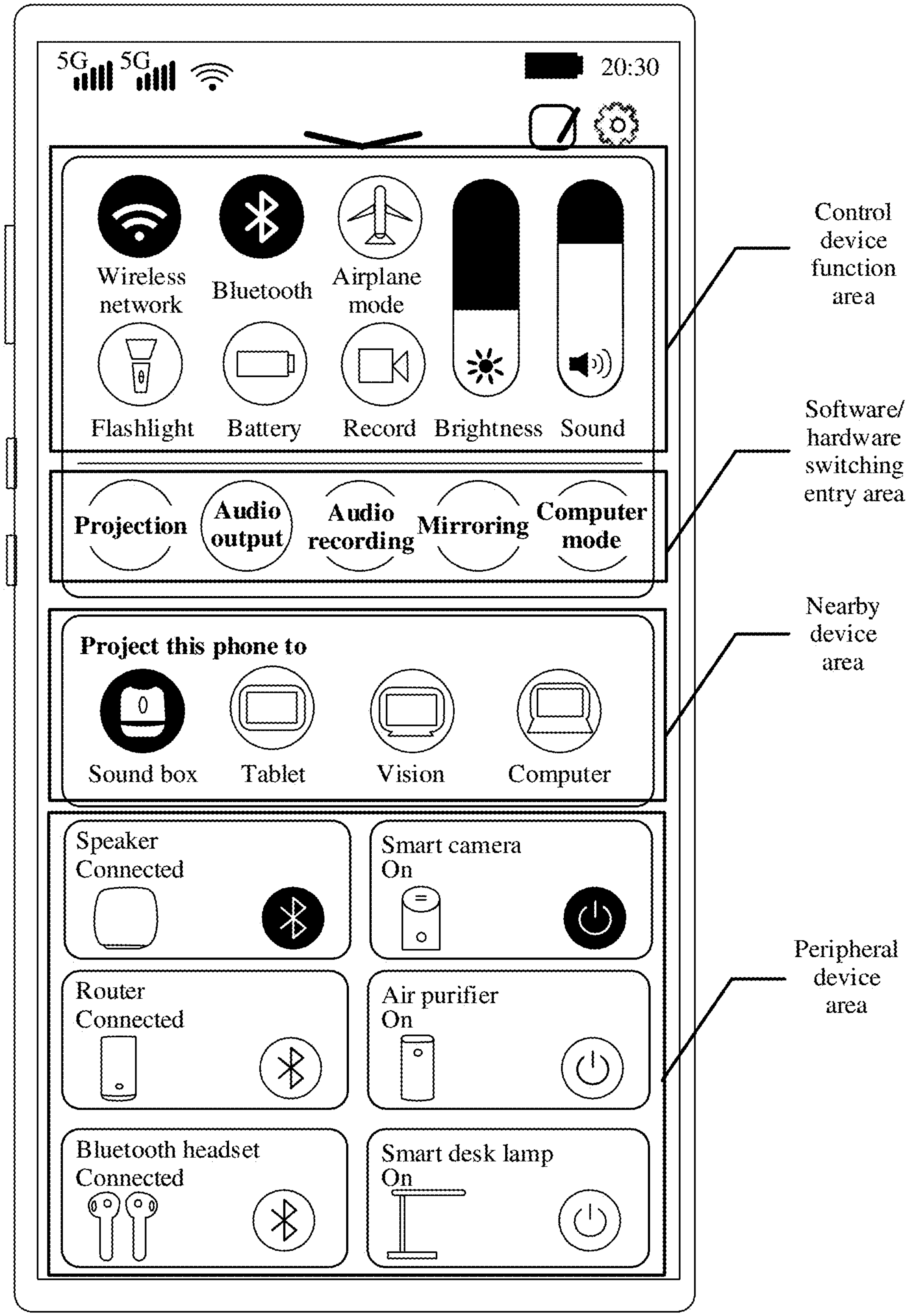
FIG. 4 is a schematic diagram of a second multi-device control center interface according to an embodiment of this application.

As shown in FIG. 3 and FIG. 4, the multi-device control center interface can display an identifier of a current nearby device of the control device, and a hardware switching entry, a software switching entry, and the like of the control device. Optionally, as shown in FIG. 3, the control device may display the multi-device control center interface in a part of an area of the display. In this case, because the multi-device control center interface does not occupy all display areas of the display, the user may view more content by sliding up and down the multi-device control center interface. Optionally, as shown in FIG. 4, the control device may alternatively display the multi-device control center interface in full screen.

The multi-device control center interface shown in FIG. 4 is used as an example for description. The multi-device control center interface may include but is not limited to: a control device function area, a software/hardware switching entry area, a nearby device area, and a peripheral device area. The control device function area includes buttons corresponding to function entries such as a control device mode, a network connection mode, and basic settings, for example, a "Bluetooth" button, an "Airplane mode" button, and a "Flashlight" button shown in FIG. 4. The software/hardware switching entry area includes a hardware switching entry and a software switching entry provided by the control device, for example, a hardware switching entry "projection", a hardware switching entry "audio output", a software switching entry "mirroring", and a software switching entry "computer mode". The control device displays, in the nearby device area, an identifier of a nearby device that can be currently detected by the control device. For example, the control device displays, in the nearby device area, icons and/or names of nearby devices such as a "sound box" and "Vision". The control device displays, in the peripheral device area, an identifier of a peripheral device that can be detected by the control device. For example, the control device displays, in the peripheral device area, icons and/or names of peripheral devices such as an "air purifier" and a "speaker".

In this embodiment of this application, after the control device detects the multi-device control center interface display instruction triggered by the user, the control device detects a nearby device in a current network connection. The current network connection may be a Wi-Fi network, a local area network, or a Bluetooth network.

Optionally, the control device may detect, by using Wi-Fi, a nearby device that is connected to a same local area network as the control device; or the control device may detect, by using a Bluetooth connection technology, a nearby device that enables a Bluetooth function. The control device displays the icon and name of the detected nearby device in the nearby device area of the multi-device control center interface.

In a possible implementation, when the control device displays an identifier of at least one nearby device in the multi-device control center interface, the identifier of the at least one nearby device may be sorted in at least one of the following manners:

Manner 1: The identifier of the at least one nearby device is sorted based on a distance between the nearby device and the control device.

The control device detects distances between nearby devices and the control device, and sorts identifiers of the detected nearby devices in descending order of the distances between the nearby devices and the control device.

Figure 5:
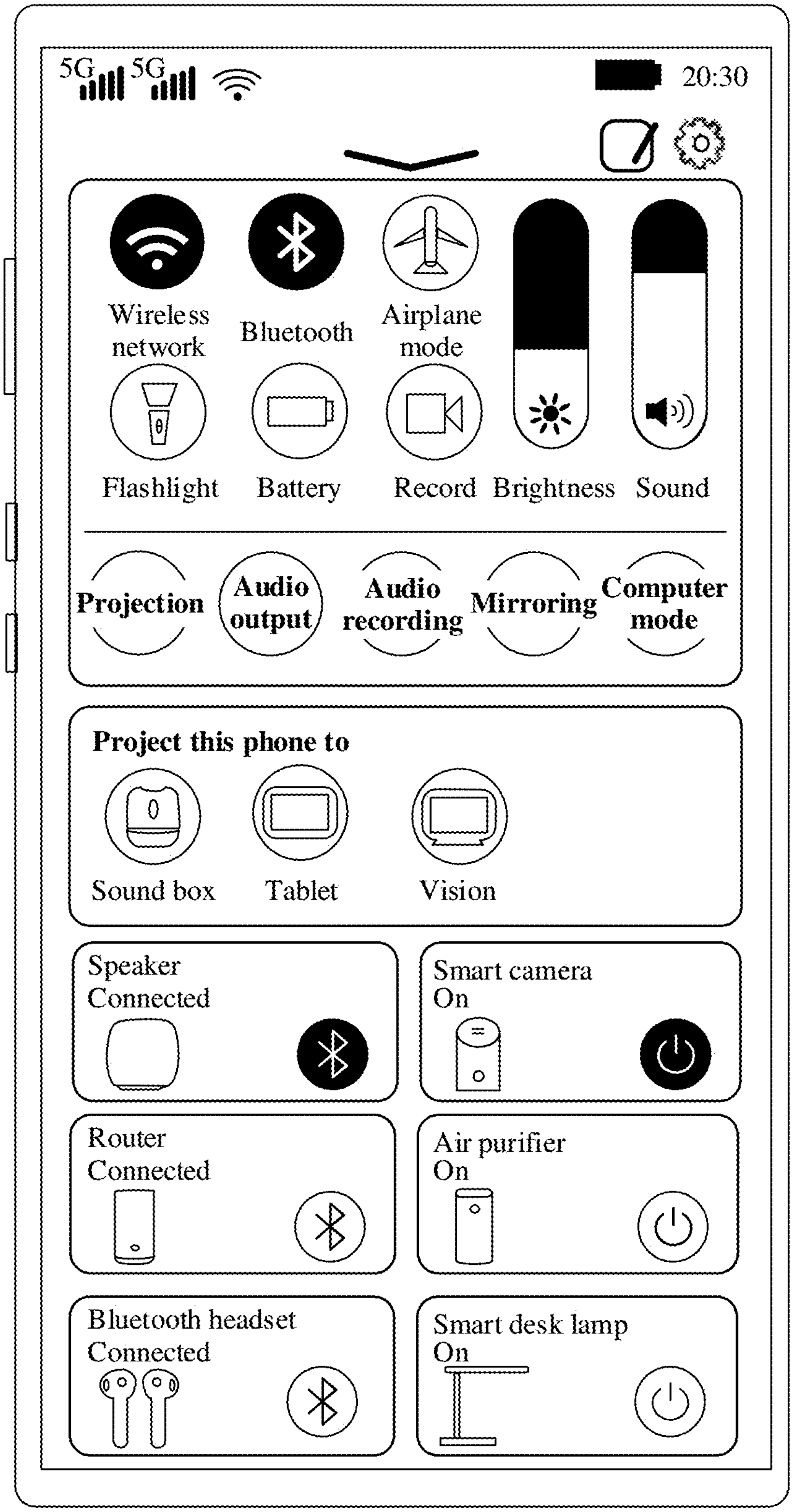
FIG. 5 and FIG. 6 are schematic diagrams of different display manners of nearby device areas in a multi-device control center interface according to an embodiment of this application.

For example, the nearby devices detected by the control device include a Vision device, a tablet, and a sound box, and sorts the nearby devices in descending order of distances between the detected nearby devices and the control device into the sound box, the tablet, and the Vision device. In this scenario, the multi-device control center interface displayed by the control device is shown in FIG. 5. Identifiers of the sound box, the tablet, and the Vision device are sequentially displayed from left to right in the nearby device area of the multi-device control center interface.

In this embodiment of this application, a distance between a nearby device and a control device may be detected in the following manners:

(1) Wi-Fi Positioning and Distance Measurement

After any nearby device is detected, the control device obtains Wi-Fi positioning information of the nearby device, and determines a distance between the nearby device and the control device based on Wi-Fi positioning information of the control device and the Wi-Fi positioning information of the nearby device.

(2) Bluetooth Positioning and Distance Measurement

In a scenario in which a Bluetooth local area network access point is installed indoors, after both the control device and the nearby device enable a Bluetooth function, a Bluetooth indoor positioning system can position the control device and the nearby device by measuring signal strength, and send positioning information to the control device and the nearby device. After the positioning information of the control device is obtained, the control device interacts with the nearby device to obtain the positioning information of the nearby device, and determines a distance between the control device and the nearby device based on the positioning information of the control device and the positioning information of the nearby device.

(3) The Control Device Performs Distance Measurement by Using a Distance Sensor

When a distance sensor is installed on the control device, the control device may measure a distance between the control device and the nearby device by using the distance sensor. For example, the control device may measure the distance between the control device and the nearby device by using infrared, laser, or ultrasonic. Specifically, a distance measurement manner of a distance sensor is described by using an ultrasonic wave distance measurement principle as an example. The control device transmits an ultrasonic wave to a direction in which a nearby device is located, and timing is started at the same time when the ultrasonic wave is transmitted. The ultrasonic wave is transmitted in air, and returns immediately after touching the nearby device in a way. The control device immediately stops timing after receiving a reflected wave. The control device determines the distance between the control device and the nearby device based on the propagation speed of the ultrasonic wave in the air and the timing time.

(4) Distance Measurement by Using a Camera

The control device captures, by using the camera, an image including the nearby device, and an image sensor of the control device performs depth calculation on the captured image to determine a distance between the control device and the nearby device. In an optional implementation, the image sensor may detect the nearby device by using a target detection box, and convert pixel coordinates in the image into world coordinates according to a coordinate conversion formula, to calculate depth information of the target detection box corresponding to the nearby device, and use the depth information obtained through calculation as the distance between the control device and the nearby device.

It should be noted that a manner in which the control device determines the distance between the control device and the nearby device is not limited in this embodiment of this application, and the control device may alternatively determine the distance between the control device and the nearby device in another manner. Alternatively, the control device determines the distance between the control device and the nearby device in a plurality of manners.

Manner 2: The identifier of the at least one nearby device is sorted based on use frequency of the nearby device.

The control device records frequency of selecting nearby devices by the user, and sorts identifiers of detected nearby devices in descending order of use frequency.

Figure 6:
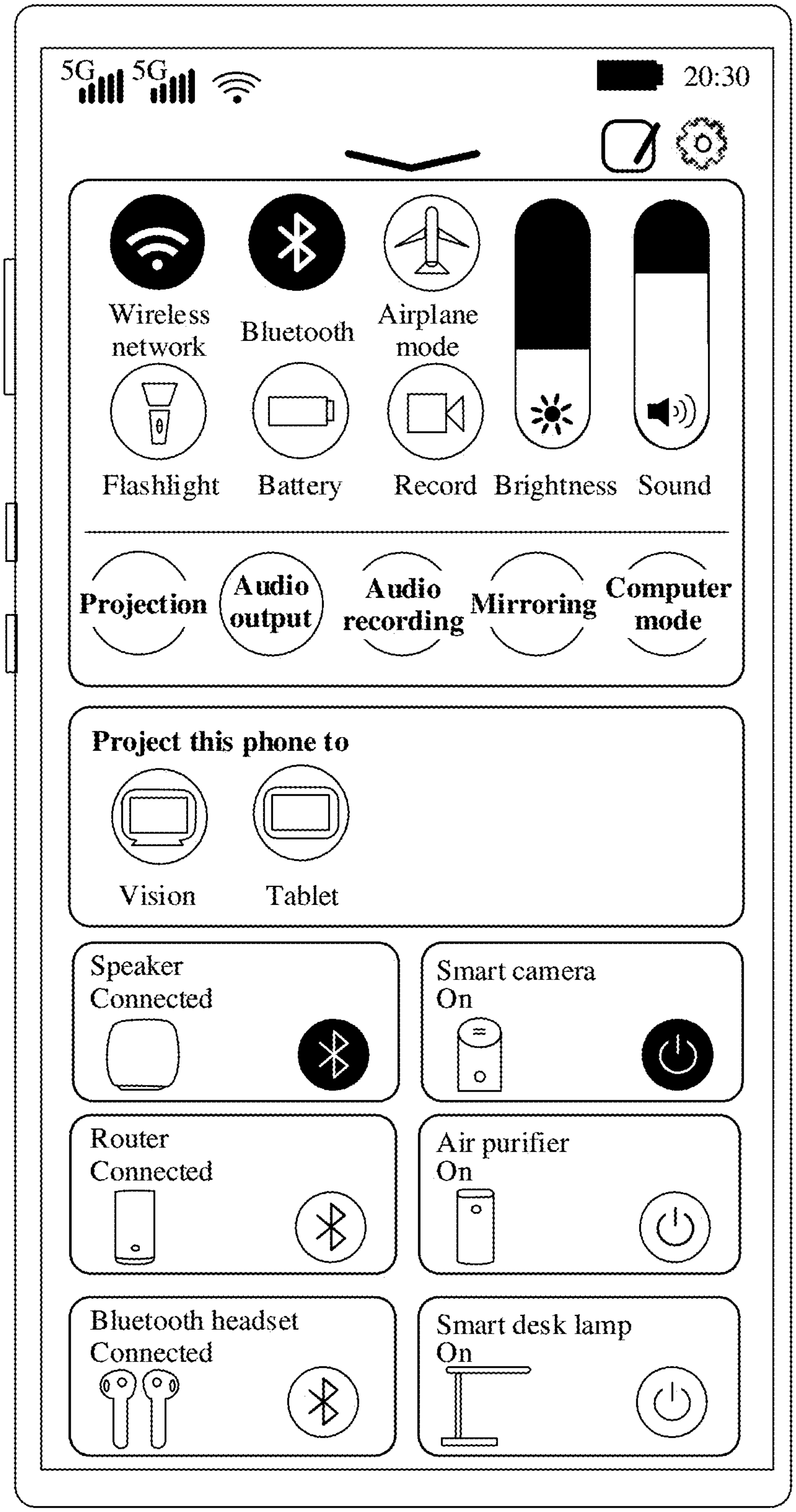

For example, the nearby devices detected by the control device include a Vision device and a tablet, and sorts the nearby devices based on frequency at which the user uses the nearby devices. For example, if the user uses the Vision more frequently, the nearby devices are sorted into the Vision device and the tablet. In this scenario, the multi-device control center interface displayed by the control device is shown in FIG. 6. Identifiers of the nearby devices such as the Vision device and the tablet are sequentially displayed from left to right in the multi-device control center interface.

In an implementation, after the nearby device is detected, the control device may determine, in at least one of the following manners, a hardware switching entry displayed in the multi-device control center interface:

Manner 1: The control device determines, based on detected hardware capability information of the nearby device, at least one hardware switching entry displayed in the multi-device control center interface.

In a possible implementation, the control device determines a hardware switching entry based on the detected hardware capability information of the nearby device. Specifically, after the nearby device is detected, the control device also detects device information of the nearby device. The device information of the nearby device includes a device type, a device name, and hardware capability information of the nearby device. The control device determines, based on the hardware capability information of the nearby device, the hardware switching entry corresponding to a hardware capability of the nearby device, and displays the determined hardware switching entry in the multi-device control center interface.

In another possible implementation, the control device determines a hardware switching entry based on hardware capability information fed back by the nearby device. Specifically, after the nearby device is detected, the control device sends a hardware capability query message to the nearby device. After receiving the hardware capability query message sent by the control device, the nearby device sends hardware capability information to the control device. The control device determines, based on the received hardware capability information of the nearby device, the hardware switching entry corresponding to a hardware capability of the nearby device, and displays the determined hardware switching entry on the multi-device control center interface.

After all the hardware switching entries displayed in a multi-device control center are determined, the control device sorts the hardware switching entries according to a sequence of identifiers of the nearby devices, for example, displays, in the front, hardware switching entries corresponding to stronger hardware capabilities of nearby devices that are sorted in the front; or sorts the hardware switching entries based on use frequency of the hardware switching entries, for example, displays, in the front, the software/hardware switching entries whose use frequency is higher.

The following further describes, by using Embodiment 1 to Embodiment 3, that the control device determines, based on the detected hardware capability information of the nearby device, at least one hardware switching entry displayed in the multi-device control center interface in this embodiment of this application.

Figure 7:
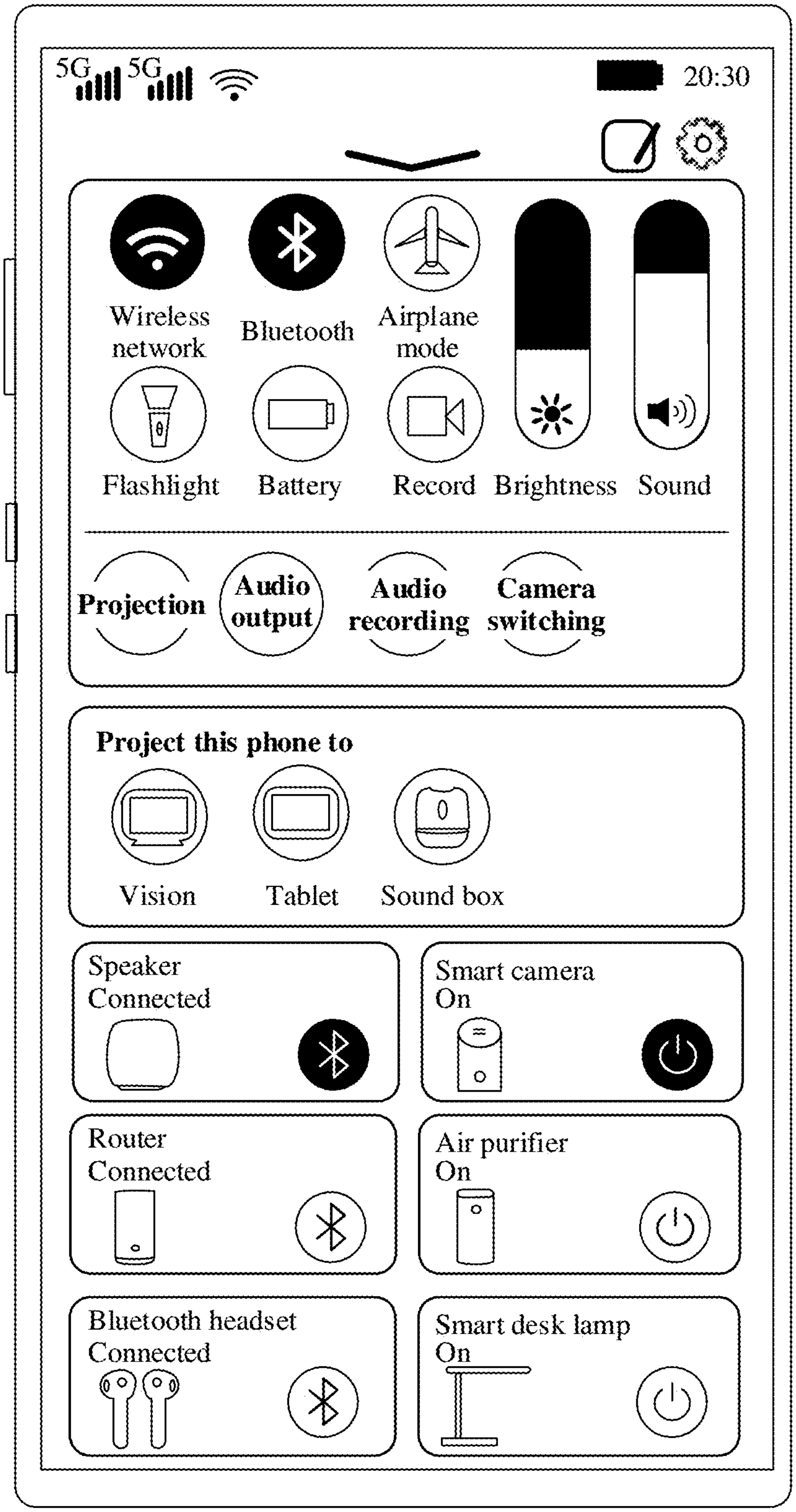
FIG. 7 to FIG. 13B are schematic diagrams of displaying at least one hardware switching entry in a multi-device control center interface according to an embodiment of this application.

Embodiment 1: The control device detects that nearby devices include a Vision device, a tablet, and a sound box, and sorts the nearby devices into the sound box, the tablet, and the Vision device based on detected distances between the nearby devices and the control device in descending order; and detects hardware capability information of the nearby devices, and determines hardware switching entries corresponding to the nearby devices: a hardware capability of the sound box is audio playing and sound receiving, and hardware capabilities of the tablet and the Vision device each are that a screen and a camera are provided, audio can be played, and the like. In this case, it is determined that the hardware switching entries corresponding to the nearby devices separately are "projection", "audio output", "audio recording", and "camera switching". The determined hardware switching entries are sorted based on frequency at which the user uses the hardware switching entries into "projection", "audio output", "audio recording", and "camera switching". In this scenario, the multi-device control center interface displayed by the control device is shown in FIG. 7. In the nearby device area, identifiers of the sound box, the tablet, and the Vision device are displayed from left to right. In the software/hardware switching entry area, the hardware switching entries "projection", "audio output", "audio recording", and "camera switching" are displayed from left to right.

Figure 8:
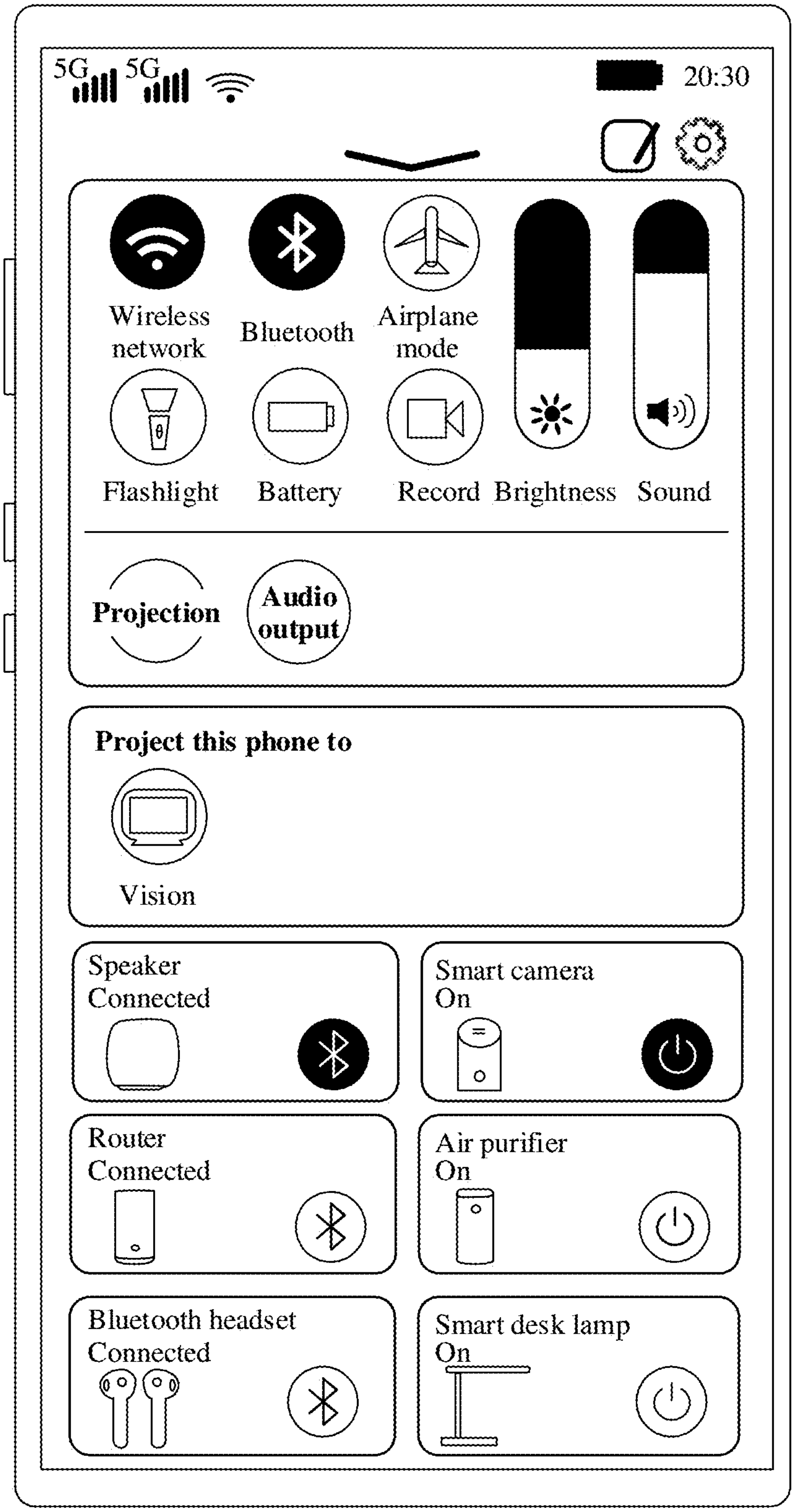

Embodiment 2: The control device detects that a nearby device is a Vision device. Hardware capability information that is fed back by the nearby device and that is received by the control device is that a hardware capability of the Vision device is that the nearby device has a screen, can play audio, and the like. In this case, it is determined that hardware switching entries corresponding to the nearby device are "projection" and "audio output"; and the hardware switching entries are sorted into "projection" and "audio output" based on frequency at which the user uses the hardware switching entries. In this scenario, the multi-device control center interface displayed by the control device is shown in FIG. 8. An identifier of the Vision device is displayed in the nearby device area, and the hardware switching entries "projection" and "audio output" are sequentially displayed from left to right in the software/hardware switching entry area.

Figure 9:
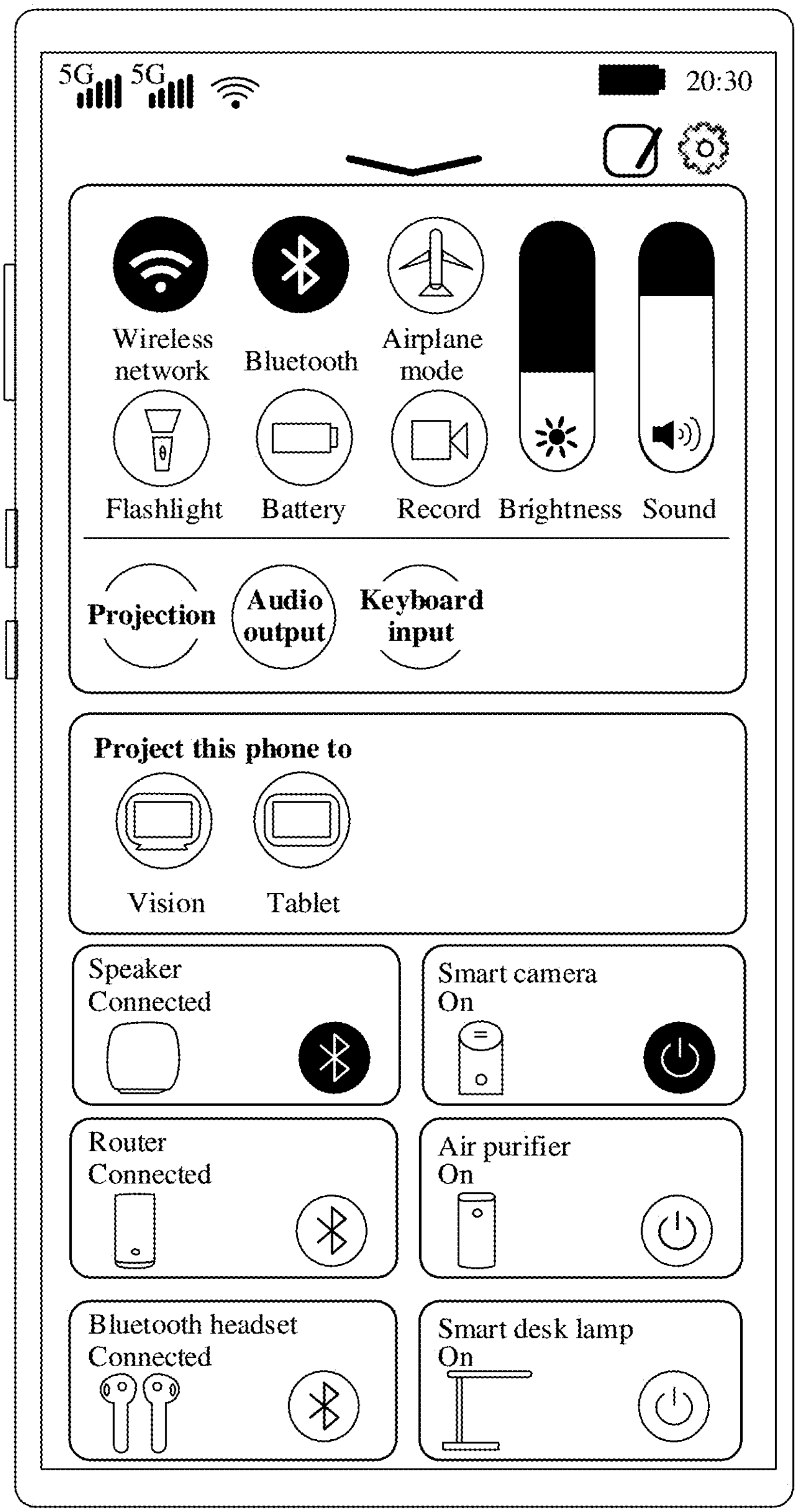

Embodiment 3: The control device detects that nearby devices include a Vision device and a tablet, and sorts the nearby devices based on use frequency of the nearby devices. For example, if use frequency of the Vision device is higher, the nearby devices are sorted into the Vision device and the tablet. Hardware capability information that is fed back by the nearby devices and that is received by the control device is as follows: A hardware capability of the Vision device is that a screen is provided, audio can be played, and the like; and a hardware capability of the tablet is that a screen is provided, audio can be played, and a keyboard input capability is provided. In this case, it is determined that hardware switching entries corresponding to the nearby devices are "projection", "audio output", and "keyboard input". The hardware switching entries are sorted based on the sequence of the nearby devices. The hardware switching entry "projection" corresponding to the hardware capability "a screen is provided" of both the Vision device and the tablet is sorted in the front, so that the hardware switching entries may be sorted into "projection", "audio output", and "keyboard input". In this scenario, the multi-device control center interface displayed by the control device is shown in FIG. 9. Identifiers of the Vision device and the tablet are sequentially displayed from left to right in the nearby device area, and the hardware switching entries "projection", "audio output", and "keyboard input" are sequentially displayed from left to right in the software/hardware switching entry area.

It can be learned from Embodiment 1 to Embodiment 3 that, in embodiments of this application, a hardware switching entry displayed in the multi-device control center interface can be adjusted based on a detected nearby device, and the hardware switching entry related to the detected nearby device is displayed in the multi-device control center interface, so that the user can select a currently available hardware switching entry. This improves user experience.

Manner 2: The control device determines, based on a hardware function requirement of a currently executed task, at least one hardware switching entry displayed in the multi-device control center interface.

The control device determines the hardware function requirement of the currently executed task and determines the at least one hardware switching entry displayed in the multi-device control center interface. If the currently executed task of the control device is a task for interacting with the user, for example, a game, the control device determines that the function requirement of the currently executed task is an external connection to a game controller. In this case, the control device determines that the hardware switching entry may include a "game controller". Alternatively, if the currently executed task of the control device is a task for playing through a screen, for example, playing a video, the control device determines that the function requirement of the currently executed task is video output and audio output. In this case, the control device determines that the hardware switching entry may include "projection" and "audio output".

The following further describes, by using Embodiment 4 to Embodiment 7, a manner in which the control device determines, based on the hardware function requirement of the currently executed task, the at least one hardware switching entry displayed in the multi-device control center interface.

Figure 10A:
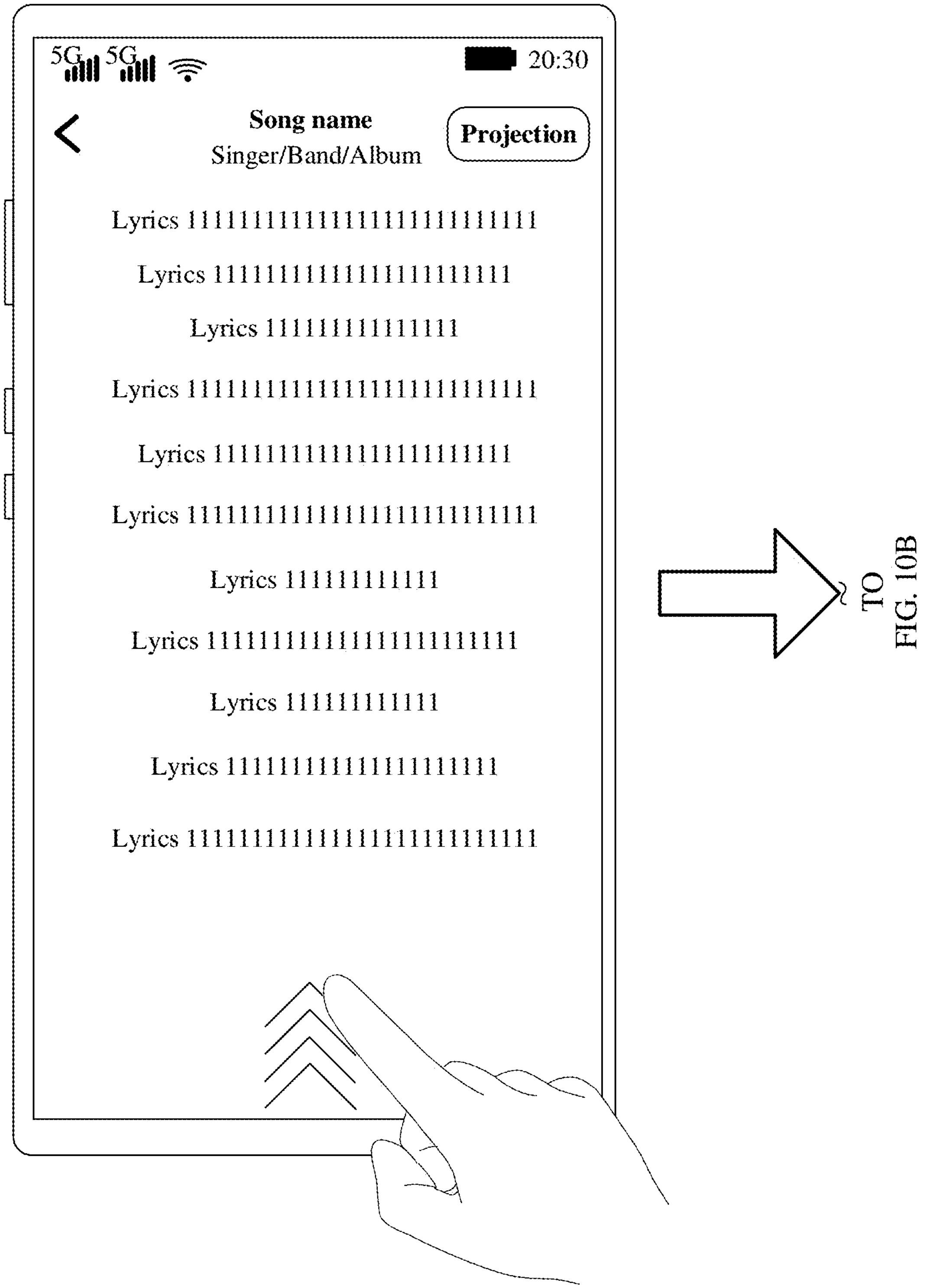
Figure 10B:
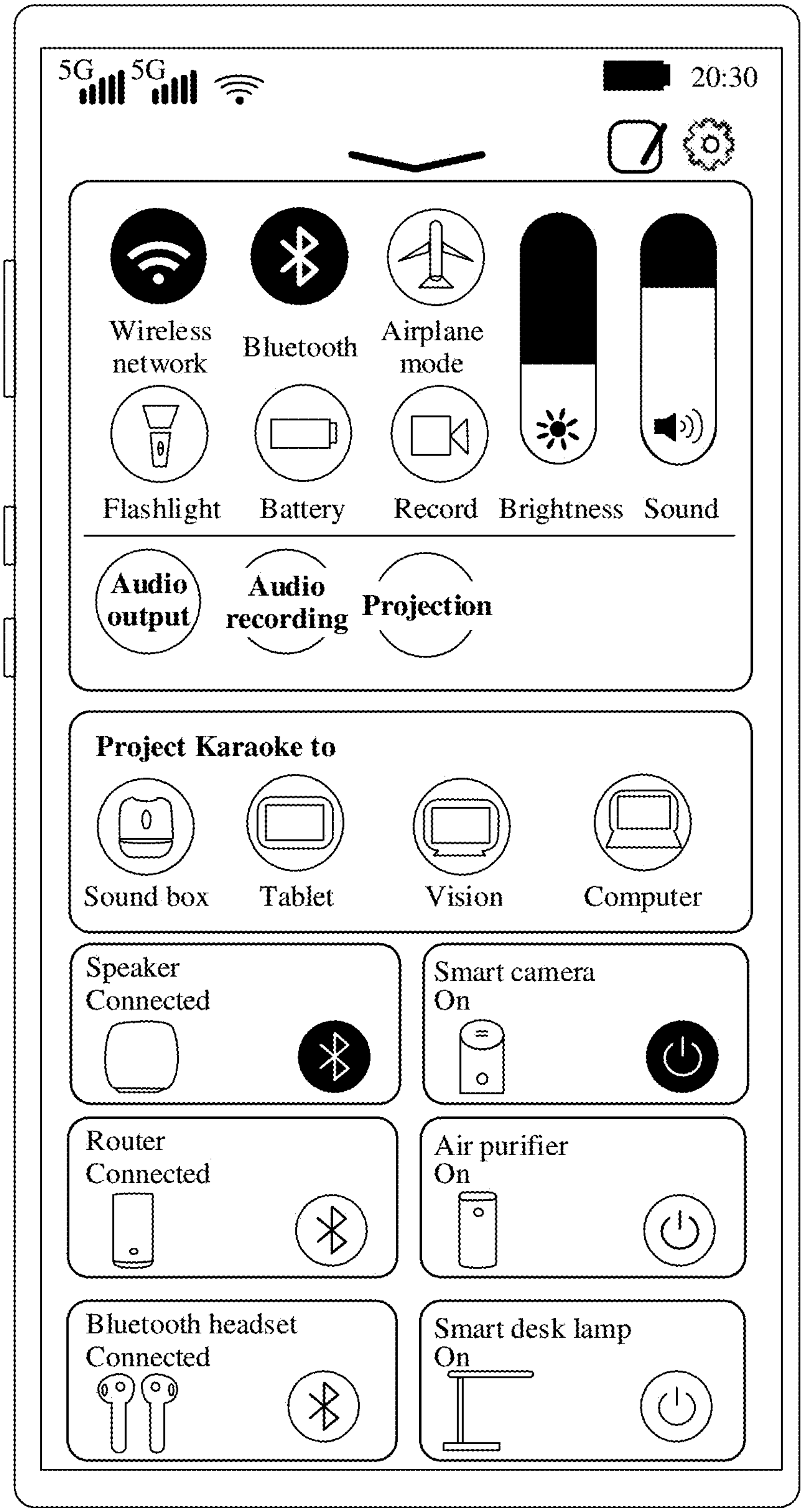

Embodiment 4: The control device currently runs a "Karaoke" application. When the control device executes a singing task, the control device displays a "Karaoke" application interface shown in FIG. 10A. The user triggers a multi-device control center interface display instruction. The control device determines that a hardware function requirement of the currently executed singing task is video output, audio output, and audio recording, and determines that hardware switching entries are "audio output", "audio recording", and "projection", as shown in FIG. 10B. The control device displays, in the nearby device area of the multi-device control center interface, an identifier of a nearby device that is detected by the control device, and displays the hardware switching entries "audio output", "audio recording", and "projection" in the software/hardware switching entry area of the multi-device control center interface.

Figure 11A:
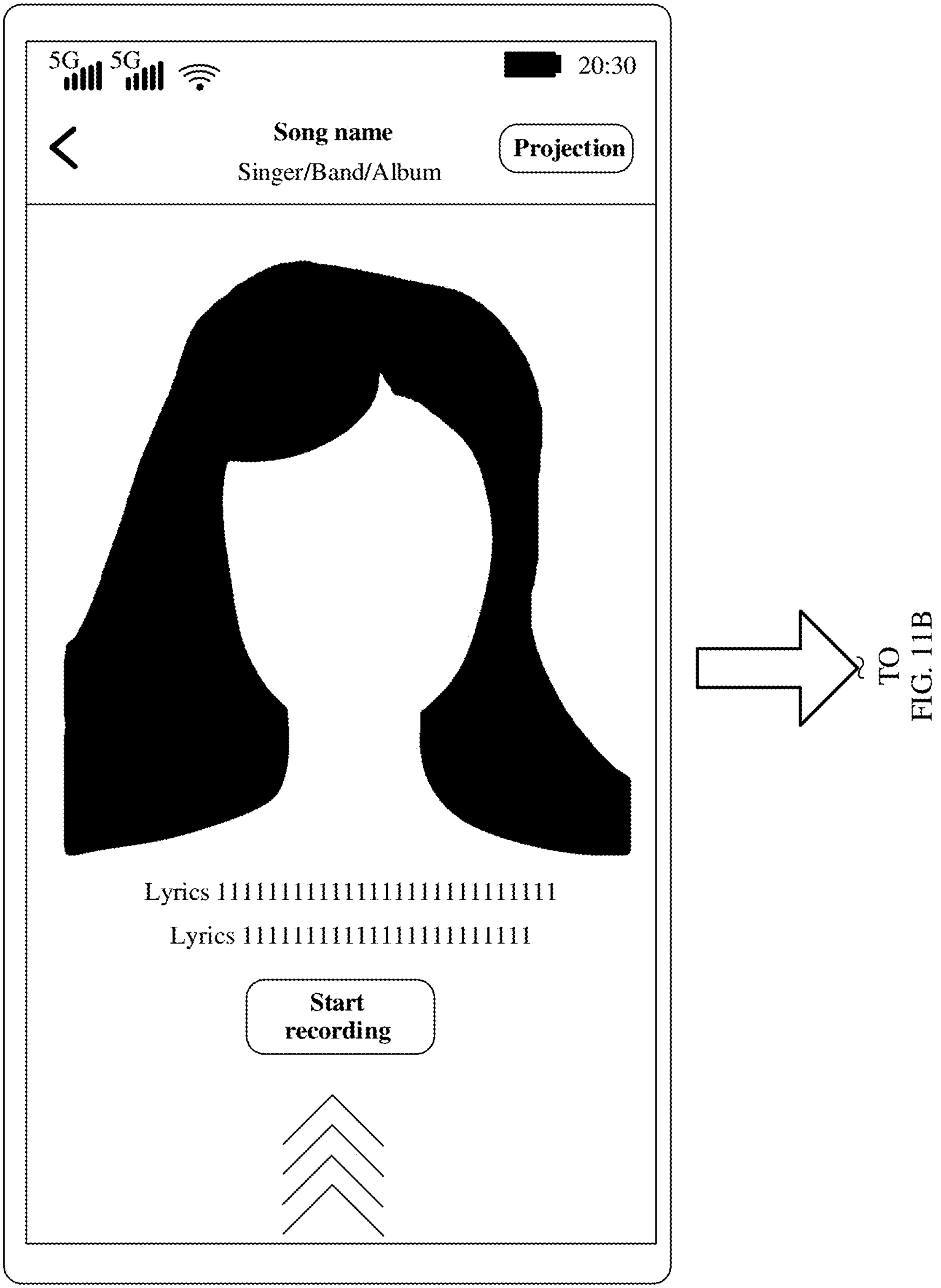
Figure 11B:
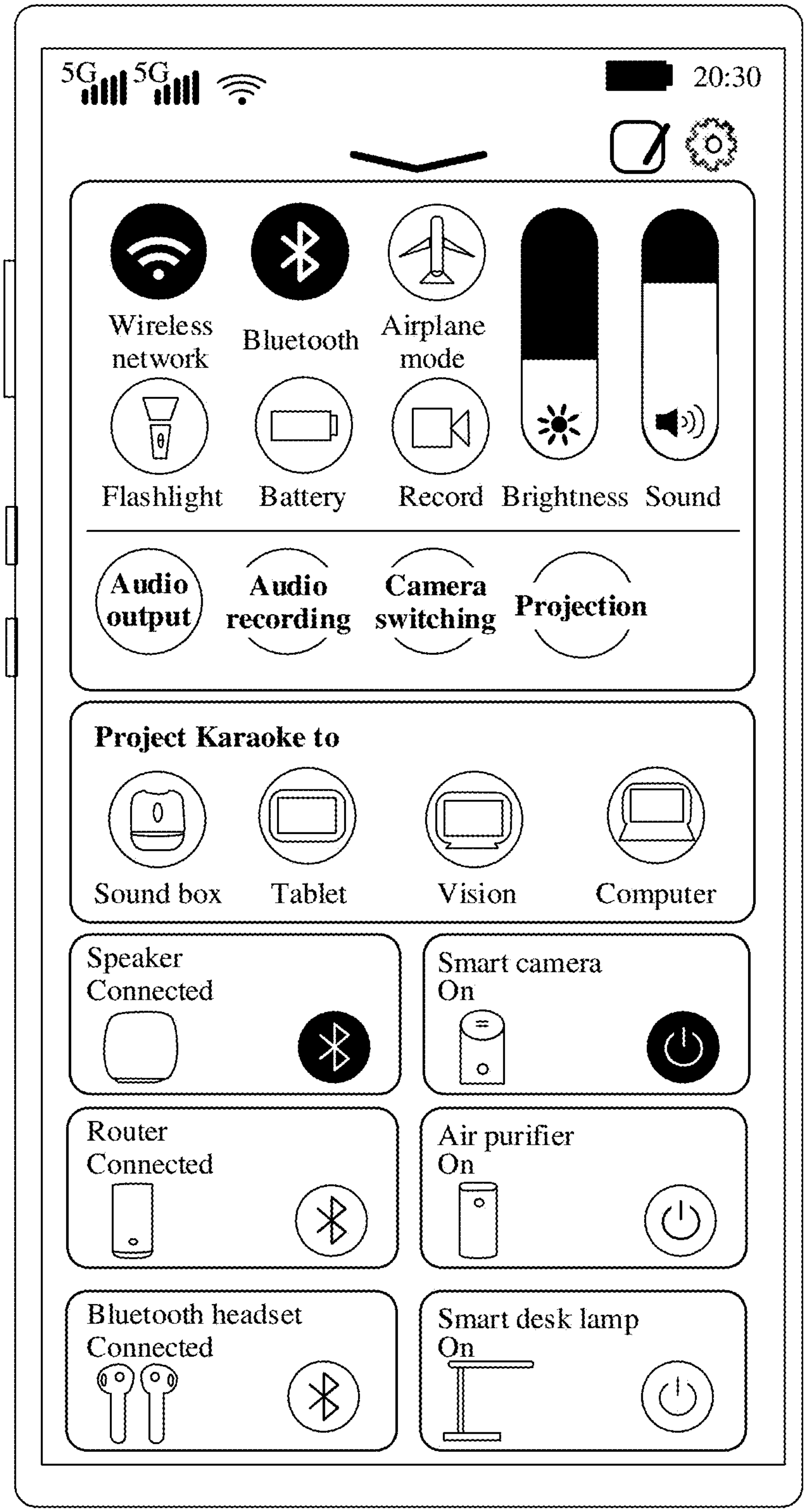

Embodiment 5: The control device currently runs a "Karaoke" application. When the control device executes a singing video recording task, the control device displays a "Karaoke video recording" application interface shown in FIG. 11A. When the user triggers a multi-device control center interface display instruction, the control device determines that a hardware function requirement of the currently executed singing video recording task is video output, audio output, audio recording, and video recording, and determines that hardware switching entries are "audio output", "audio recording", "camera switching", and "projection", as shown in FIG. 11B. The control device displays, in the nearby device area of the multi-device control center interface, an identifier of a nearby device that is detected by the control device, and displays the hardware switching entries "audio output", "audio recording", "camera switching", and "projection" in the software/hardware switching entry area of the multi-device control center interface.

Figure 12A:
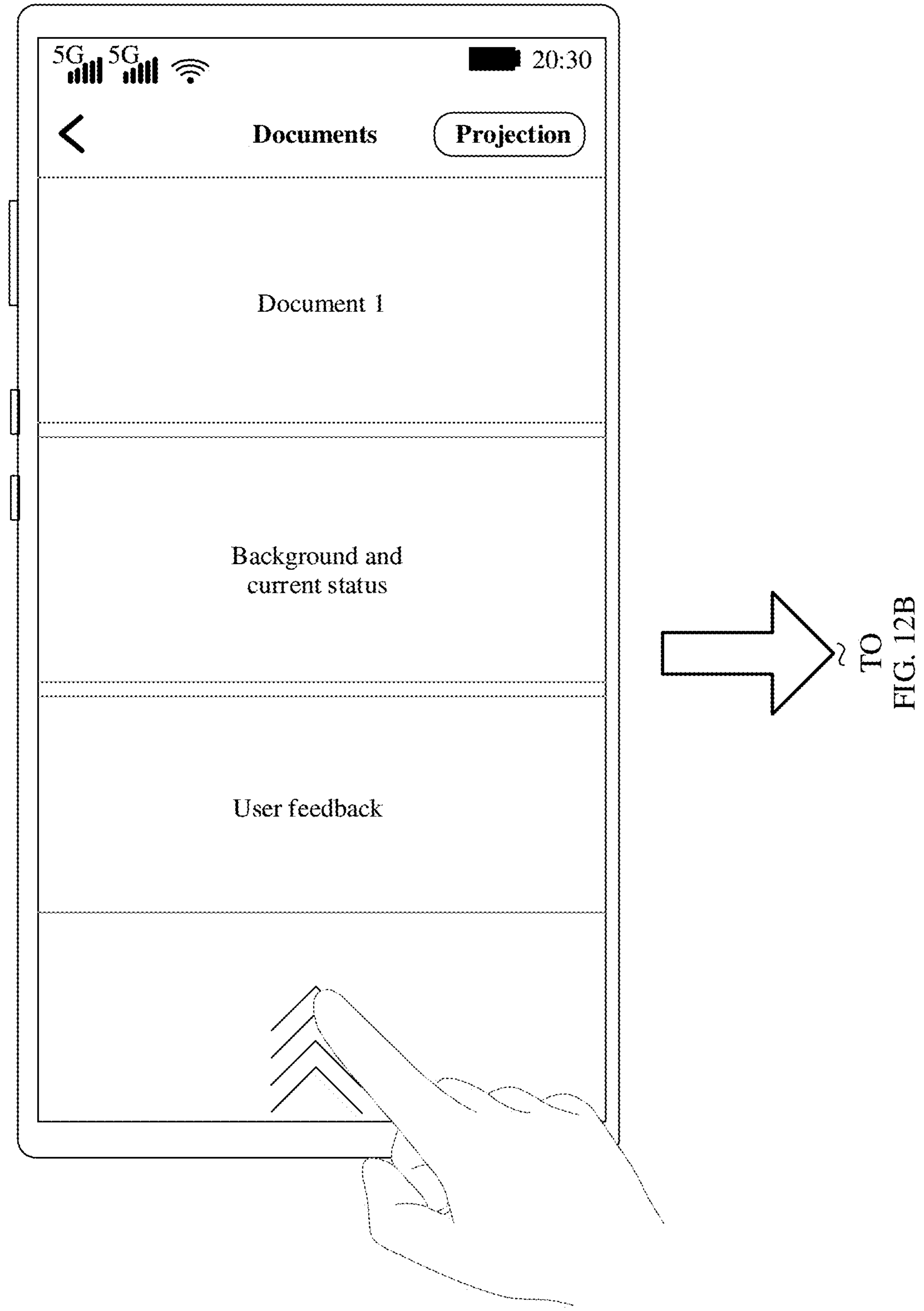
Figure 12B:
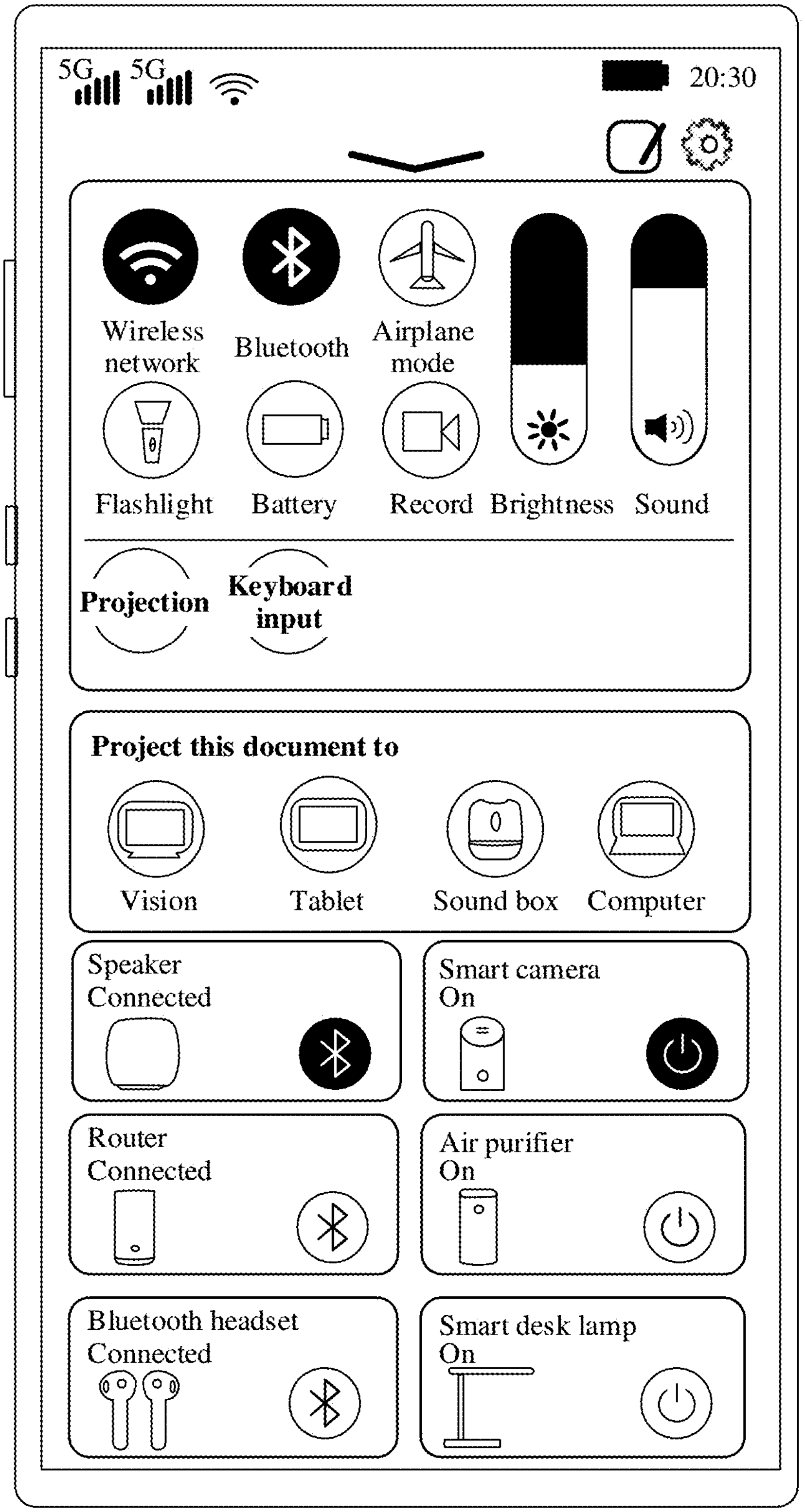

Embodiment 6: The control device currently executes a document viewing or document editing task. When the control device displays a document interface shown in FIG. 12A, the user triggers a multi-device control center interface display instruction. The control device determines that the hardware function requirement of the currently executed task is screen display and keyboard input, and determines that hardware switching entries are "projection" and "keyboard input", as shown in FIG. 12B. A nearby device that is detected by the control device is displayed in the nearby device area of the multi-device control center interface, and the hardware switching entries "projection" and "keyboard input" are displayed in the software/hardware switching entry area of the multi-device control center interface.

Figure 13A:
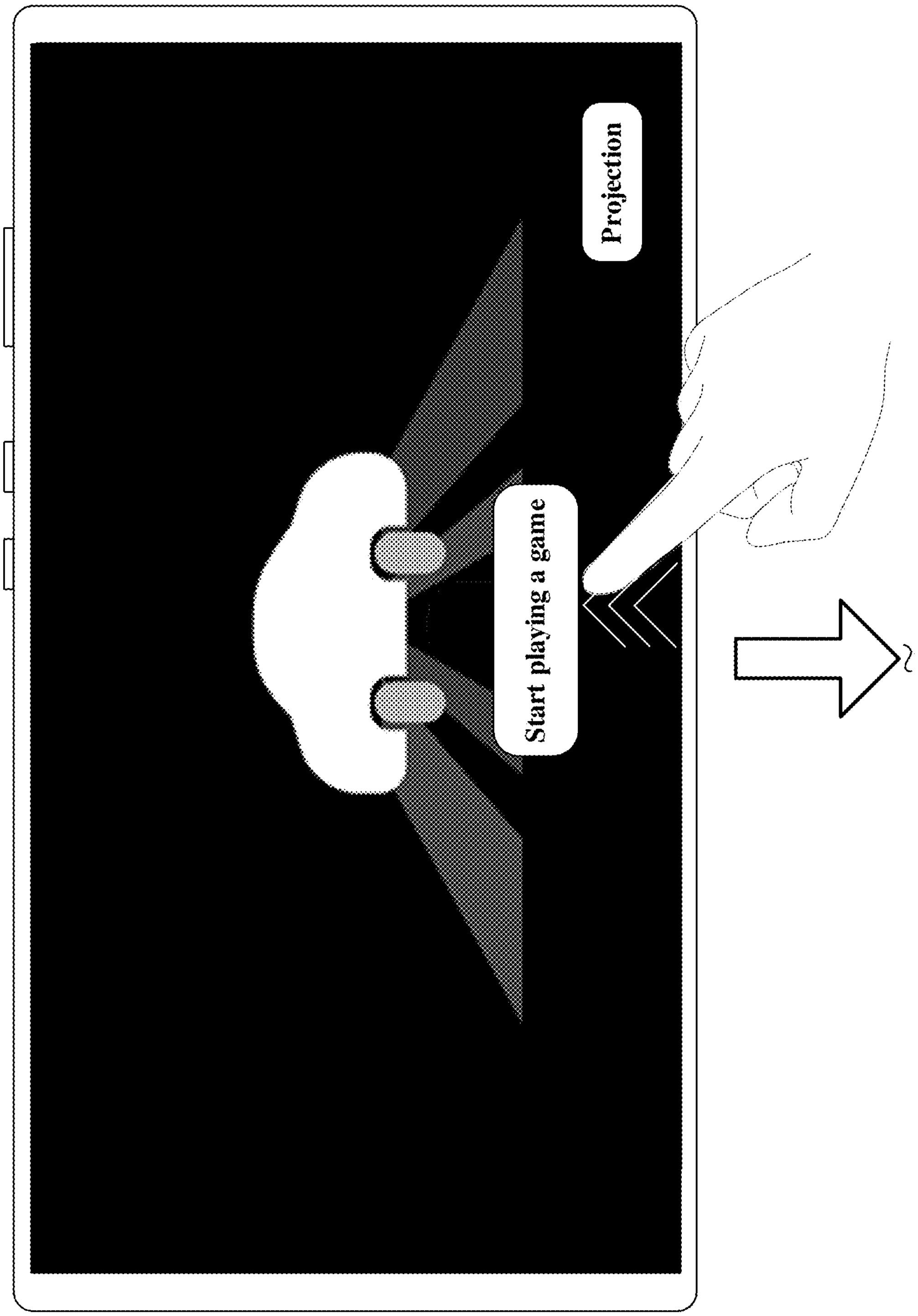
Figure 13B:
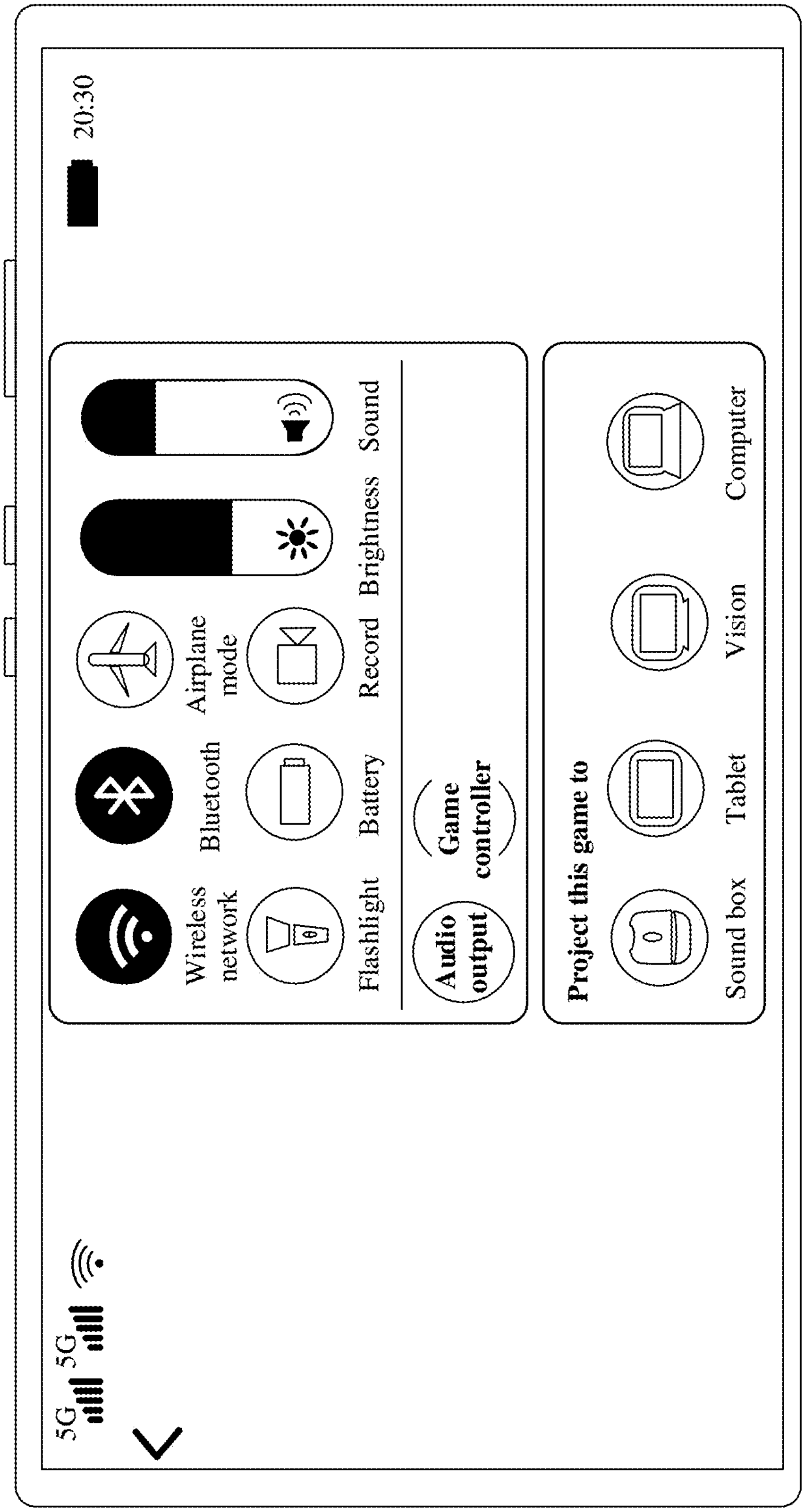

Embodiment 7: The control device currently runs a game application. As shown in FIG. 13A and FIG. 13B, the control device displays a game interface, and the user triggers a multi-device control center interface display instruction. If the control device determines that a hardware function requirement of the currently executed game task is audio output and an external connection to a game controller, the control device determines that hardware switching entries are "audio output" and "game controller", displays, in the nearby device area of the multi-device control center interface, an identifier of a nearby device that is detected by the control device, and displays the hardware switching entries "audio output" and "game controller" in the software/hardware switching entry area of the multi-device control center interface.

It can be learned from Embodiment 4 to Embodiment 7 that, in the display manner provided in this embodiment of this application, the control device can perform intelligent analysis on the currently executed task, and determine, based on the hardware function requirement of the currently executed task, hardware switching entries for the currently executed task, so as to display the different hardware switching entries in the multi-device control center interface based on different tasks, which helps the user select a required hardware switching entry. Therefore, user operations are simplified, and user experience is improved.

Figure 14A:
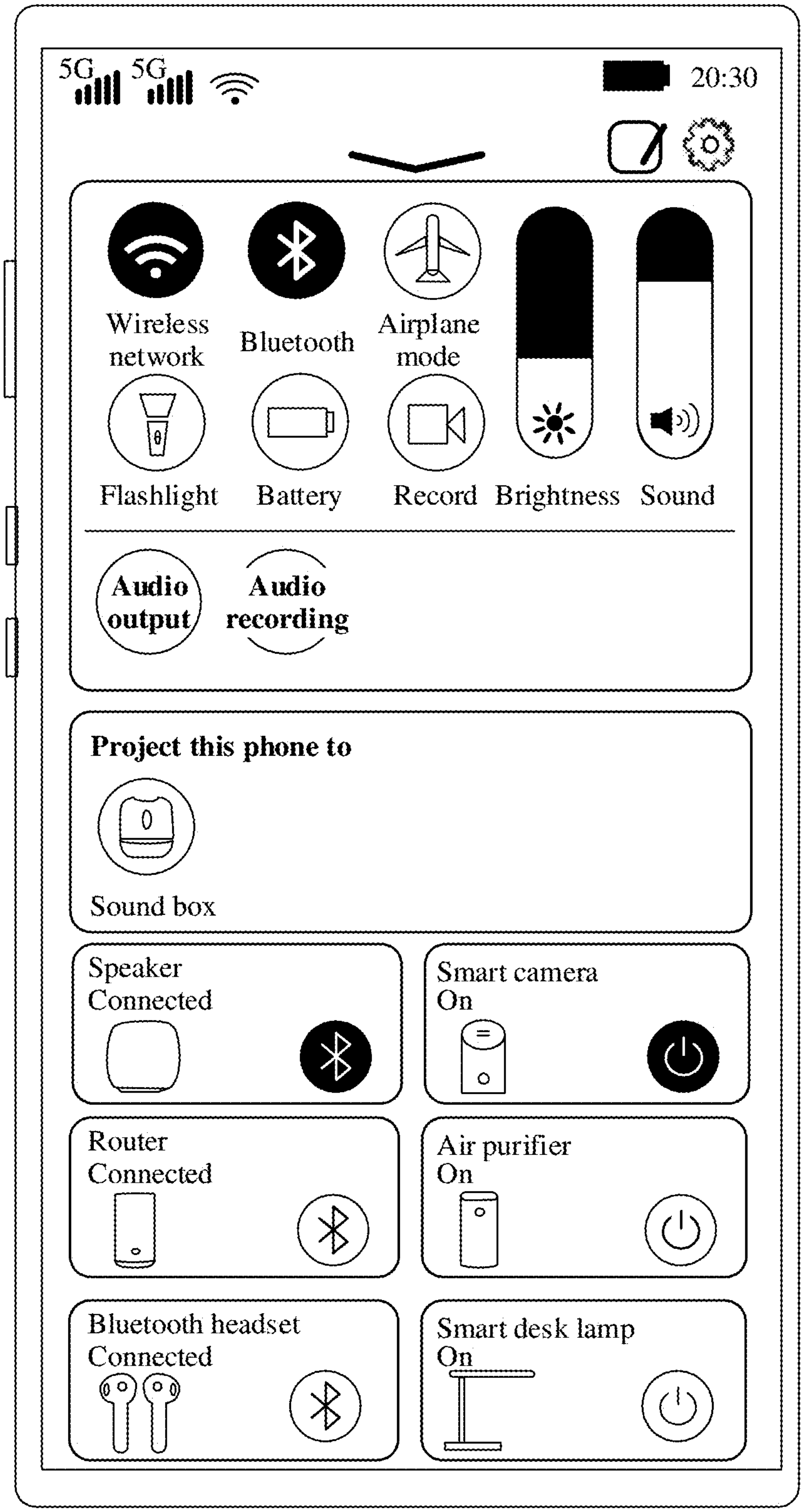
FIG. 14*a* to FIG. 14*c* are schematic diagrams of different display styles of nearby device areas in a multi-device control center interface according to an embodiment of this application.
Figure 14B:
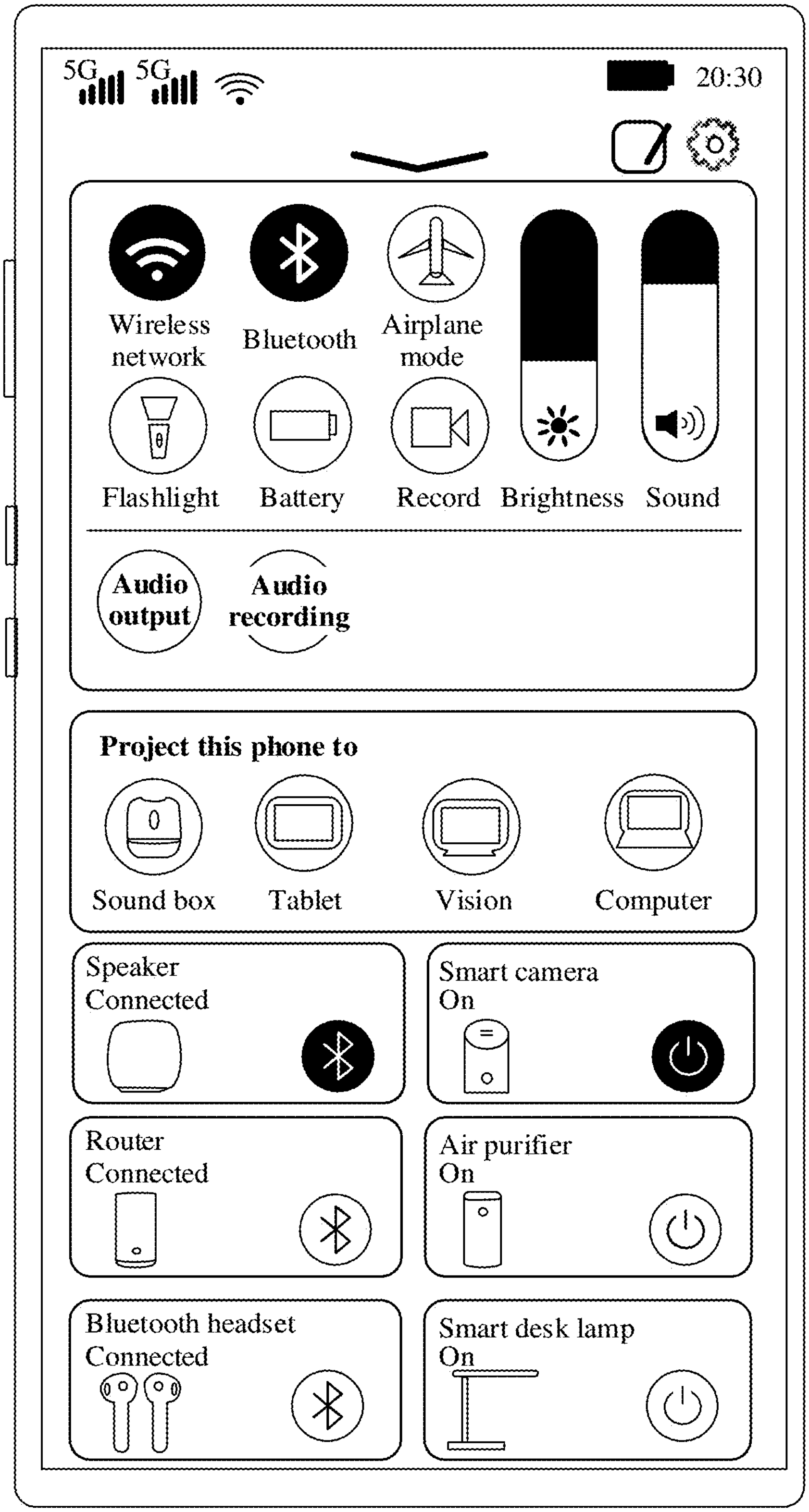
Figure 14C:
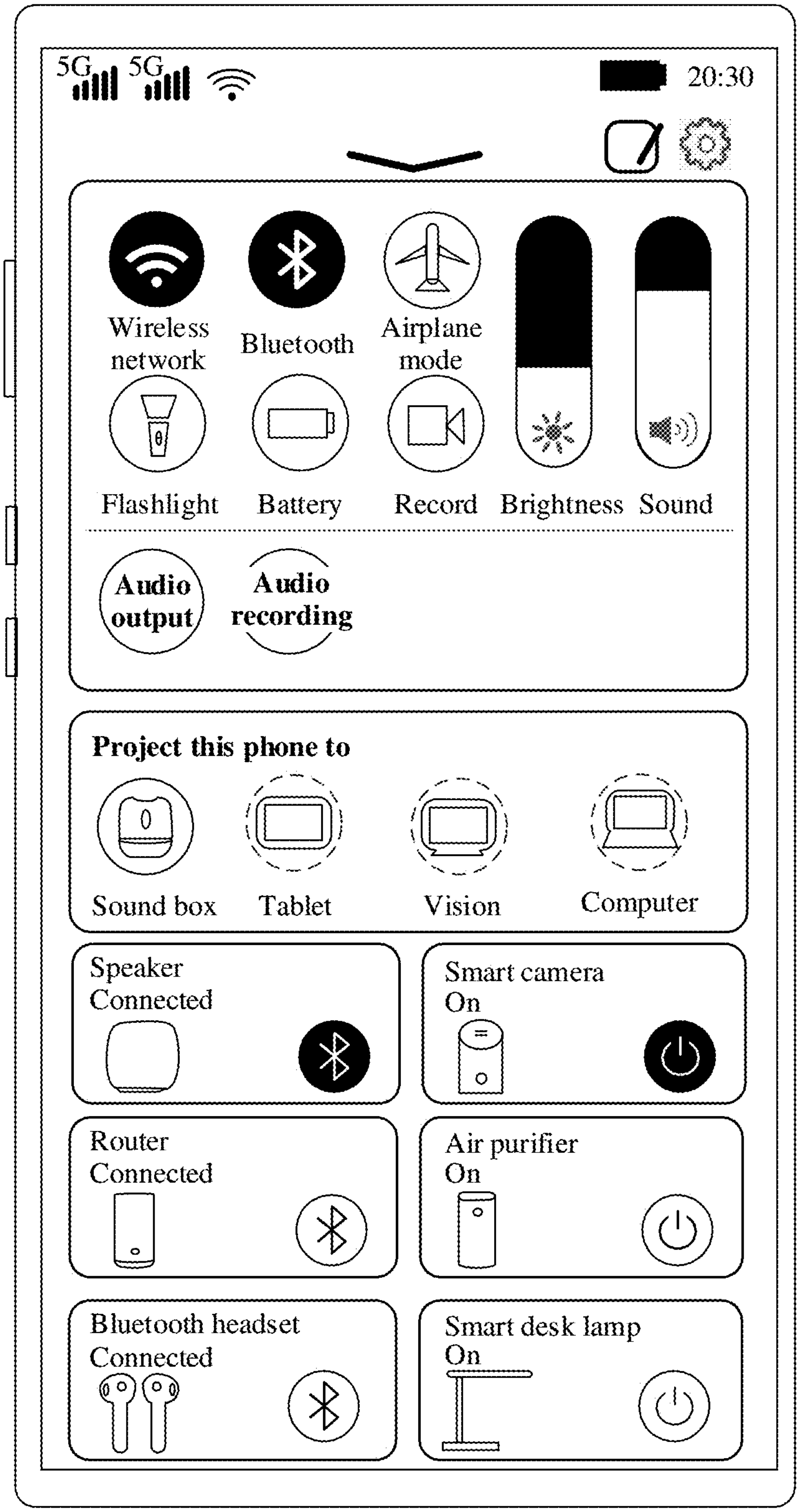

In addition, according to the currently executed task of the control device, the identifier of the nearby device displayed in the nearby device area of the multi-device control center interface may be further adjusted. For example, the identifier of the nearby device having the hardware capability required for executing the current task is highlighted. For example, if the control device currently executes an audio playing task, it is determined that hardware switching entries required for the current audio playing task are "audio output" and "audio recording", and the nearby device having the hardware capability required for the audio playing task is determined as a sound box. As shown in FIG. 14*a*, an identifier of the sound box is displayed in the nearby device area of the multi-device control center interface; or as shown in FIG. 14*b*, an identifier of the sound box is displayed in the front in the nearby device area of the multi-device control center interface; or as shown in FIG. 14*c*, an identifier of the sound box is highlighted in the nearby device area of the multi-device control center interface, and identifiers of other nearby devices are displayed in dotted lines.

Manner 3: The control device determines, based on hardware capability information of a nearby device that has currently established a connection, at least one hardware switching entry displayed in the multi-device control center interface.

After the control device is currently connected to a nearby device, the user triggers to display a multi-device control center interface display instruction. The control device determines the nearby device that has established a connection to the control device, sorts an identifier of the nearby device that has established a connection to the control device in the front and highlights the identifier in the nearby device area, determines a corresponding hardware switching entry based on hardware capability information of the nearby device, and displays the hardware switching entry corresponding to the nearby device in the software/hardware switching entry area of the multi-device control center interface, or sorts, in the software/hardware switching entry area of the multi-device control center interface, the hardware switching entry corresponding to the nearby device in the front and highlights the hardware switching entry.

Figure 15A:
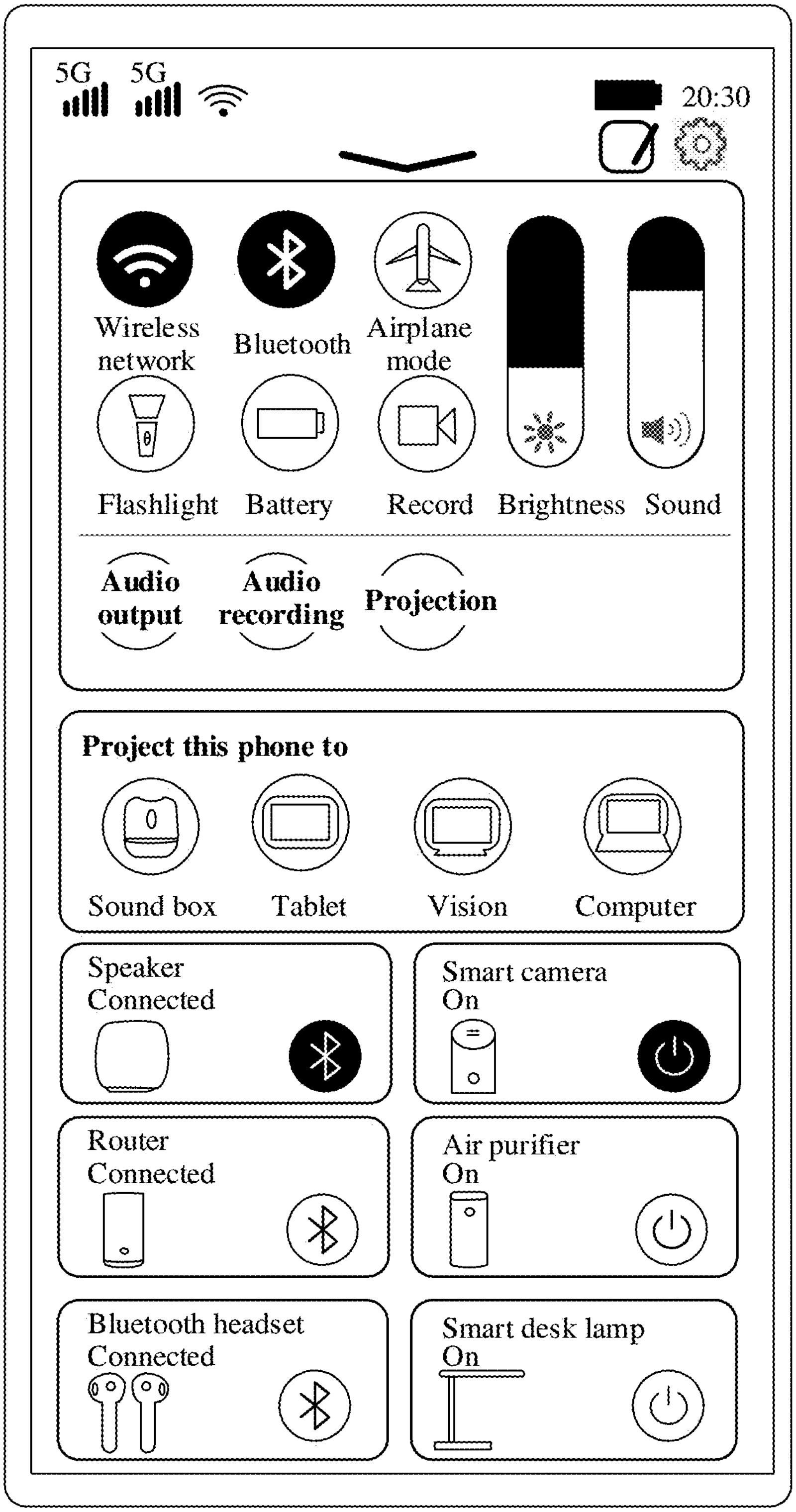
FIG. 15A and FIG. 15B are schematic diagrams of a multi-device control center interface after a control device is connected to a nearby device according to an embodiment of this application.
Figure 15B:
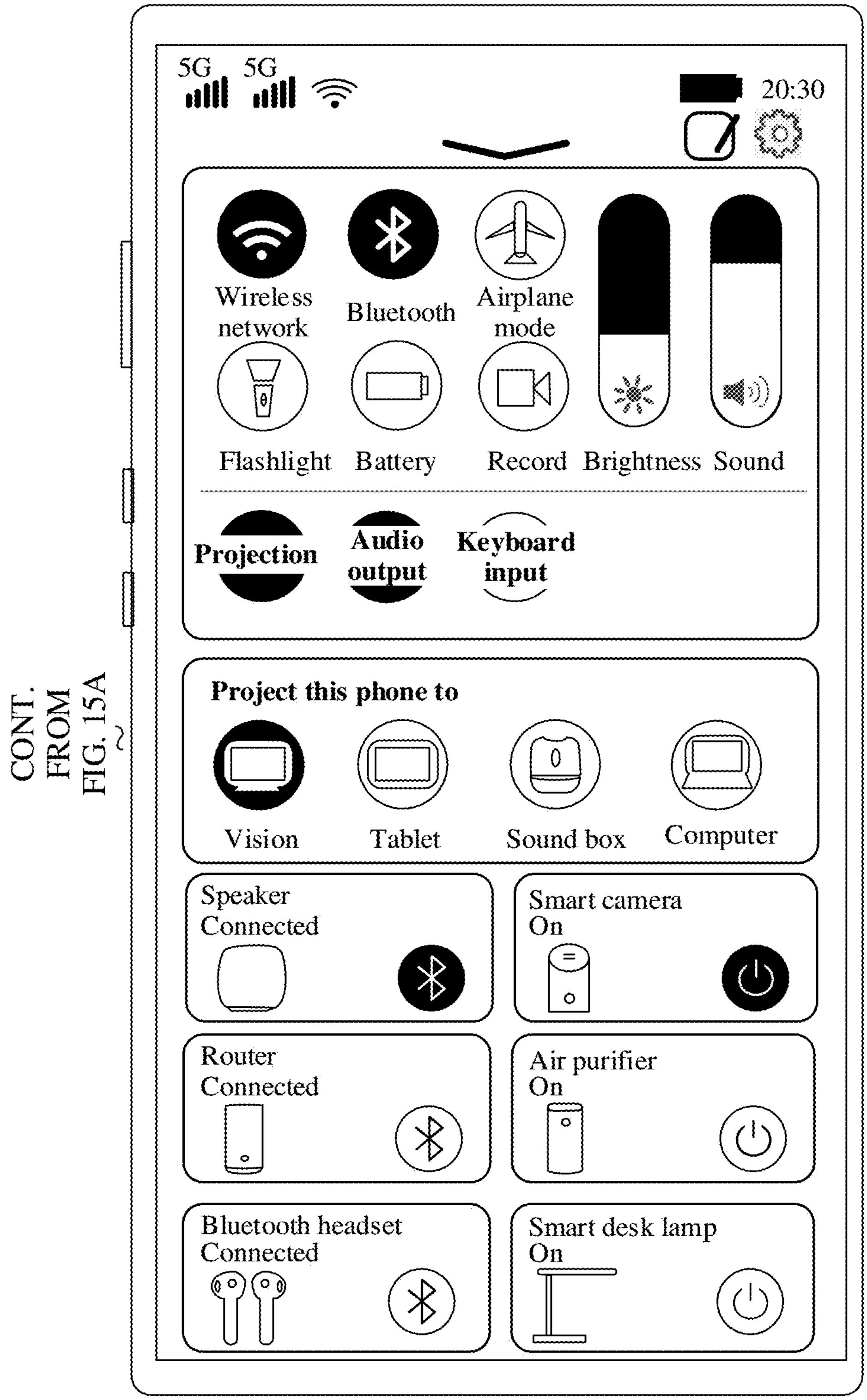

For example, when the control device is not connected to a nearby device, the multi-device control center interface of the control device is shown in FIG. 15A. After the user selects a Vision device, the multi-device control center interface is shown in FIG. 15B. An identifier of the Vision device in the nearby device area is highlighted, and it is determined that hardware capability information of the Vision device is: audio and video playback is supported. In this case, it is determined that hardware switching entries are "projection" and "audio output". The hardware switching entries corresponding to the Vision device are sorted in the front and highlighted, so that the currently connected nearby device and hardware capabilities that can be provided by the nearby device can be more intuitively displayed.

In an implementation, after the nearby device is detected, the control device may determine, in at least one of the following manners, a software switching entry displayed in the multi-device control center interface:

Manner 1: The control device determines, based on software capability information of the nearby device, at least one software switching entry displayed in the multi-device control center interface.

After the nearby device is detected, the control device determines the software capability information of the nearby device based on a device attribute of the nearby device, and determines at least one software switching entry based on the software capability information of the nearby device. For example, the software switching entry displayed by the control device in the multi-device control center interface is determined according to at least one of the following rules:

Rule 1: When the control device detects that the nearby device is an electronic device with a large screen and relatively difficult interaction, such as a television or a Vision device, the control device determines that the software capability information of the nearby device is supporting software functions of DLNA projection, mirroring, screen extension, and the like. Software switching entries displayed by the control device in the software/hardware switching entry area of the multi-device control center interface may be "DLNA projection", "mirroring", and "screen extension".

Rule 2: When the control device detects that the nearby device is an electronic device that is easy to interact with, for example, a computer, a tablet, or a mobile phone, the control device determines that the software capability information of the nearby device is supporting software functions of task connection, input borrowing, and the like, where the task connection function is that the control device continues to execute an ongoing task of the control device on the nearby device by establishing a connection to the nearby device, and the input borrowing function is that the control device borrows input content received by the nearby device, for example, the nearby device sends, to the control device, audio output data received by the nearby device. After the control device detects that the nearby device is the electronic device that is easy to interact with, software switching entries displayed in the software/hardware switching entry area of the multi-device control center interface may be "relay", "data synchronization", "computer mode", and "multi-screen collaboration".

Rule 3: When the control device detects that the nearby device is a device with a small screen, such as a watch, a band, or glasses, the control device determines that the software capability information of the nearby device is supporting software functions of task connection and the like. In this case, software switching entries displayed by the control device in the software/hardware switching entry area of the multi-device control center interface may be "relay" and "data synchronization".

Rule 4: When the control device detects that the nearby device has functions such as noise reduction and intelligent volume adjustment, it is determined that the software capability information of the nearby device is supporting software functions of noise reduction and intelligent volume adjustment. In this case, software switching entries displayed by the control device in the software/hardware switching entry area of the multi-device control center interface may be "noise reduction" and "intelligent volume adjustment".

The following further describes, by using Embodiment 8 to Embodiment 11, a manner in which the control device determines, based on the detected nearby device, the at least one software switching entry displayed in the multi-device control center interface in this embodiment of this application.

Figure 16:
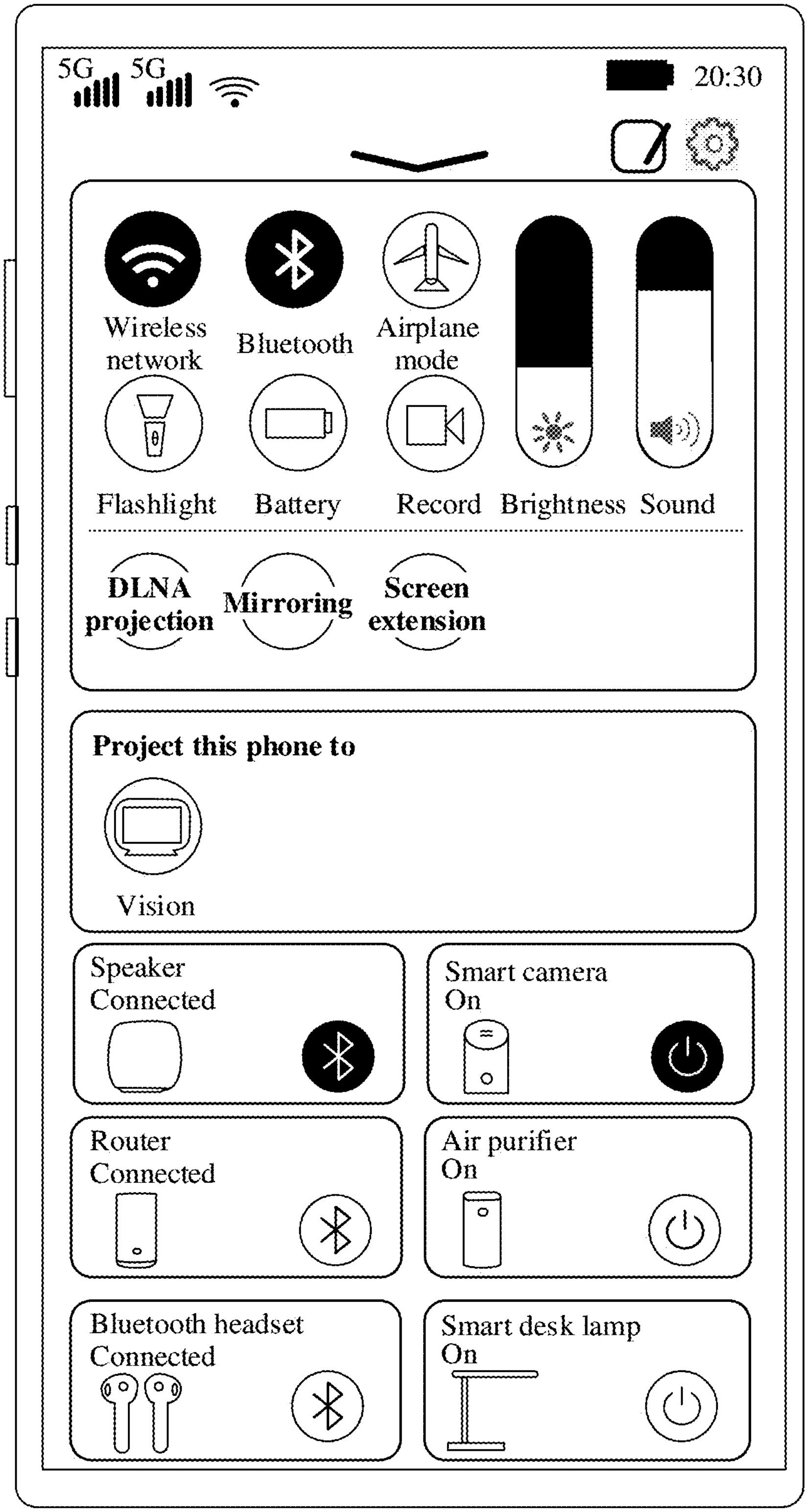
FIG. 16 to FIG. 19 are schematic diagrams of displaying at least one software switching entry in a multi-device control center interface according to an embodiment of this application.

Embodiment 8: The control device detects that the nearby device has a Vision device, and determines that an attribute of the vision device is a large screen. As shown in FIG. 16, software switching entries displayed by the control device in the software/hardware switching entry area of the multi-device control center interface may be "DLNA projection", "mirroring", and "screen extension".

Figure 17:
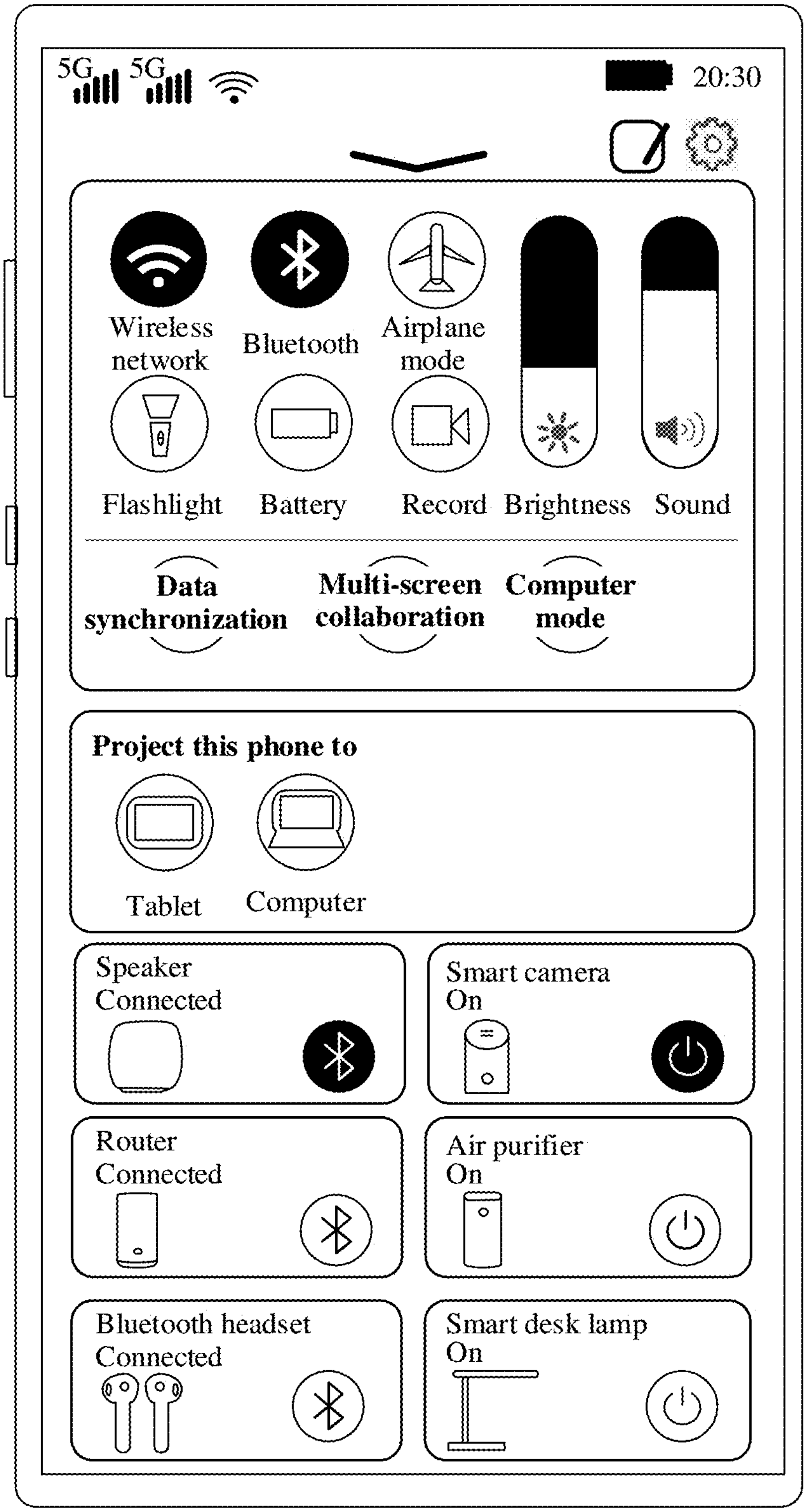

Embodiment 9: The control device detects that the nearby device includes a tablet and a computer, and determines that attributes of the tablet and the computer each is easy to interact with. As shown in FIG. 17, software switching entries displayed by the control device in the software/hardware switching entry area of the multi-device control center interface may be "data synchronization", "multi-screen collaboration", and "computer mode".

Figure 18:
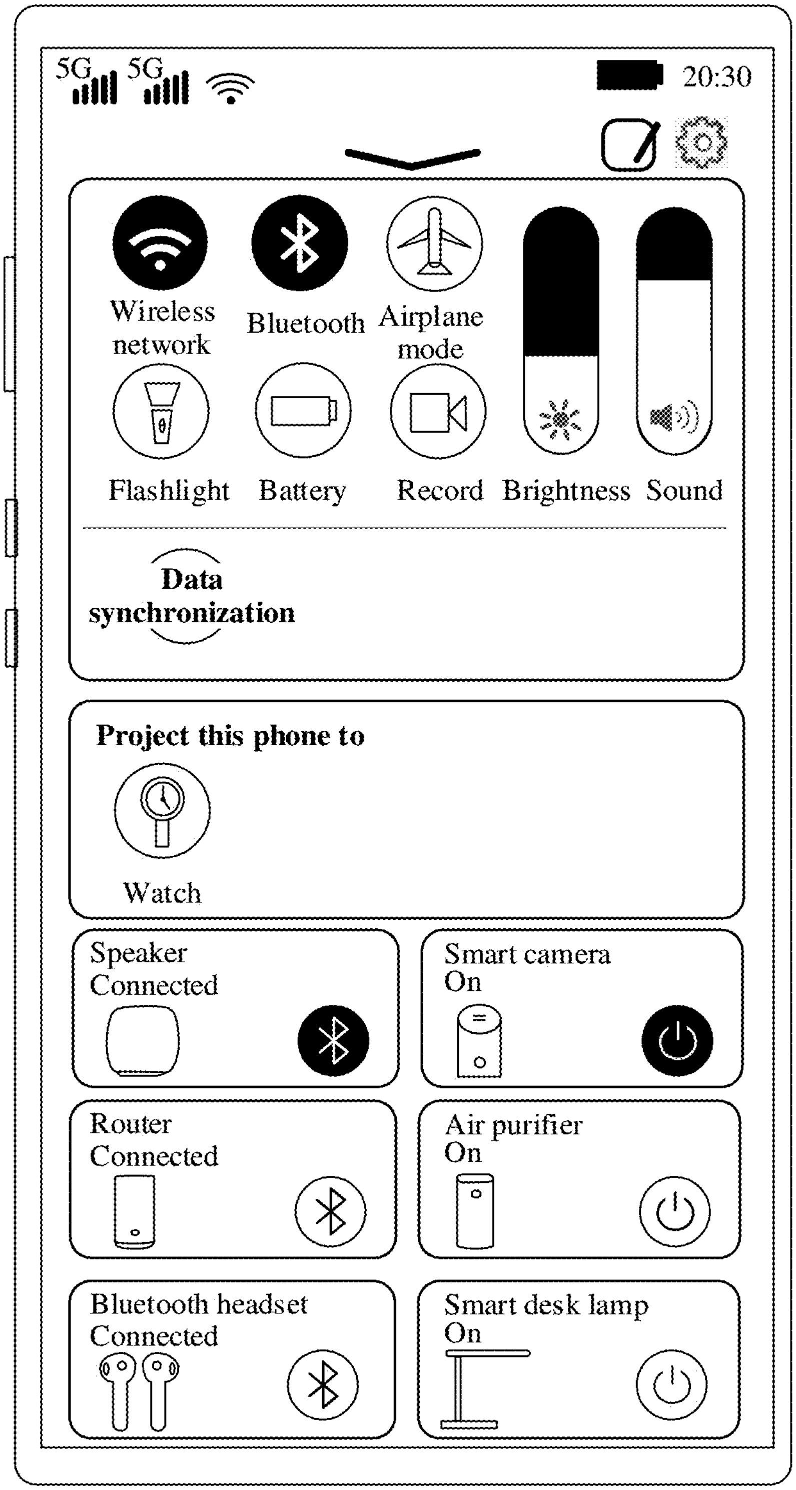

Embodiment 10: The control device detects that the nearby device has a watch, and determines that an attribute of the watch is a small screen. As shown in FIG. 18, a software switching entry displayed by the control device in the software/hardware switching entry area of the multi-device control center interface may be "data synchronization".

Figure 19:
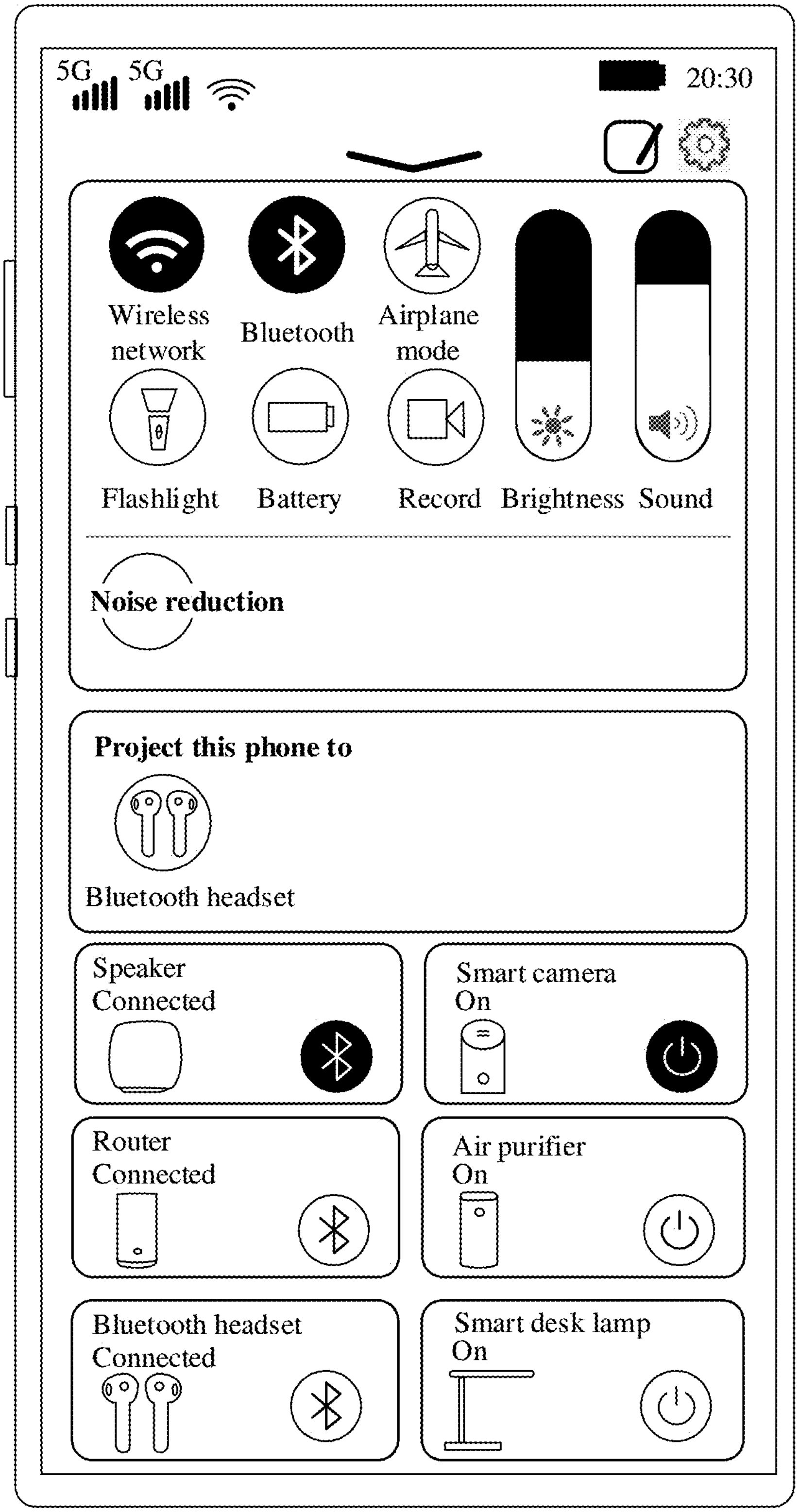

Embodiment 11: The control device detects that the nearby device has a headset, and determines that the headset has a noise reduction function. As shown in FIG. 19, a software switching entry displayed by the control device in the software/hardware switching entry area of the multi-device control center interface may be "noise reduction".

Manner 2: The control device determines, based on a software function requirement corresponding to a currently executed task, at least one software switching entry displayed in the multi-device control center interface.

The control device determines, based on the currently executed task, the software function requirement of the currently executed task, and determines a software switching entry corresponding to the software function requirement of the currently executed task. Specifically, the control device may determine, according to at least one of the following rules, at least one software switching entry displayed by the control device in the multi-device control center interface.

Rule 1: If the currently executed task of the control device is a media playing task, for example, playing music or playing a video, the control device determines that a software function requirement of the media playing task is a software function such as audio processing or video processing, for example, noise reduction or DLNA projection, and the software switching entry displayed in the multi-device control center interface includes software switching entries corresponding to projection and audio/video playing.

Rule 2: If the currently executed task of the control device is an office task, such as document viewing and editing, and email processing, the control device determines that a software function requirement of the office task is a software function such as data processing, and the software switching entry displayed in the multi-device control center interface includes a software switching entry corresponding to a task connection or input borrowing function.

Rule 3: If the currently executed task of the control device is a display-type task, for example, displaying a desktop or a calendar, the control device determines that a software function requirement of the display-type task is a software function such as adjusting a display effect, and the software switching entry displayed in the multi-device control center interface includes a software switching entry corresponding to a screen borrowing capability.

The following further describes, by using Embodiment 12 to Embodiment 14, a manner in which the control device in this embodiment of this application determines, based on the software function requirement of the currently executed task, the software switching entry displayed in the multi-device control center interface.

Figure 20A:
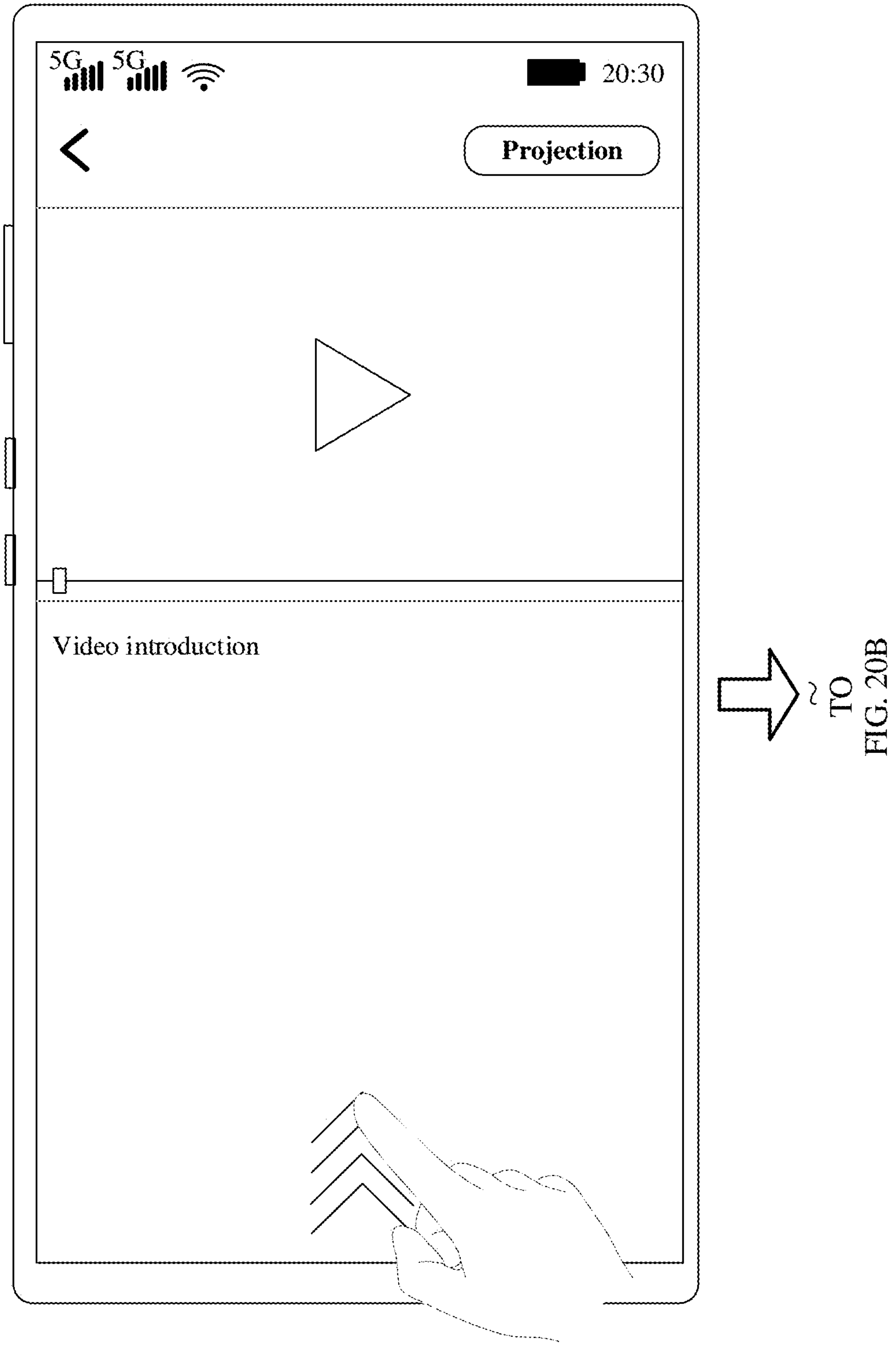
FIG. 20A to FIG. 26 are schematic diagrams of different display styles of a software switching entry and a hardware switching entry in a multi-device control center interface according to an embodiment of this application.
Figure 20B:
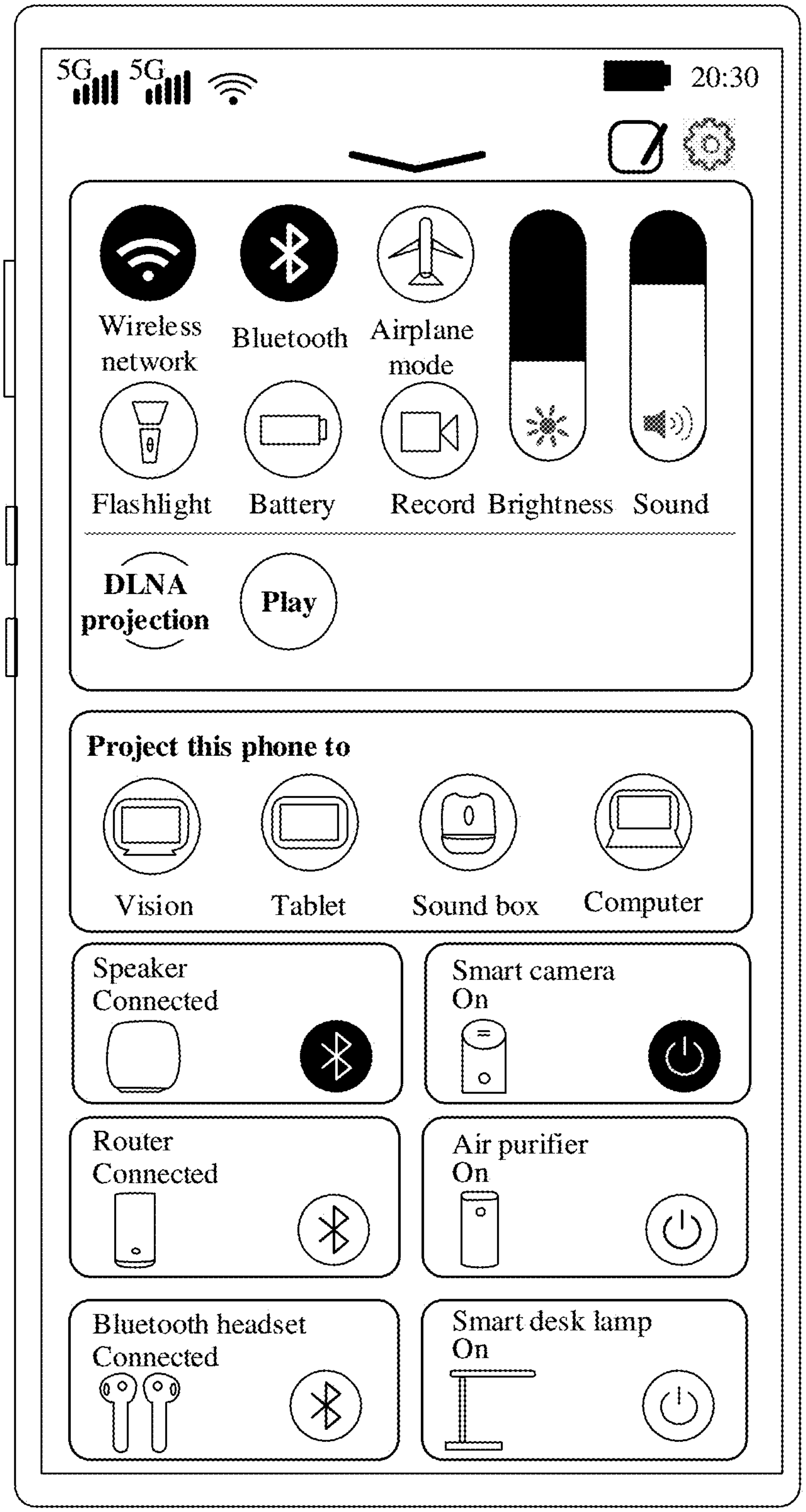

Embodiment 12: As shown in FIG. 20A and FIG. 20B, the currently executed task of the control device is playing a video, the user triggers a multi-device control center interface display instruction, the control device determines that software switching entries for the currently executed video playing task are "DLNA projection" and "play", and the control device displays the software switching entries "DLNA projection" and "play" in the software/hardware switching entry area of the multi-device control center interface.

Figure 21A:
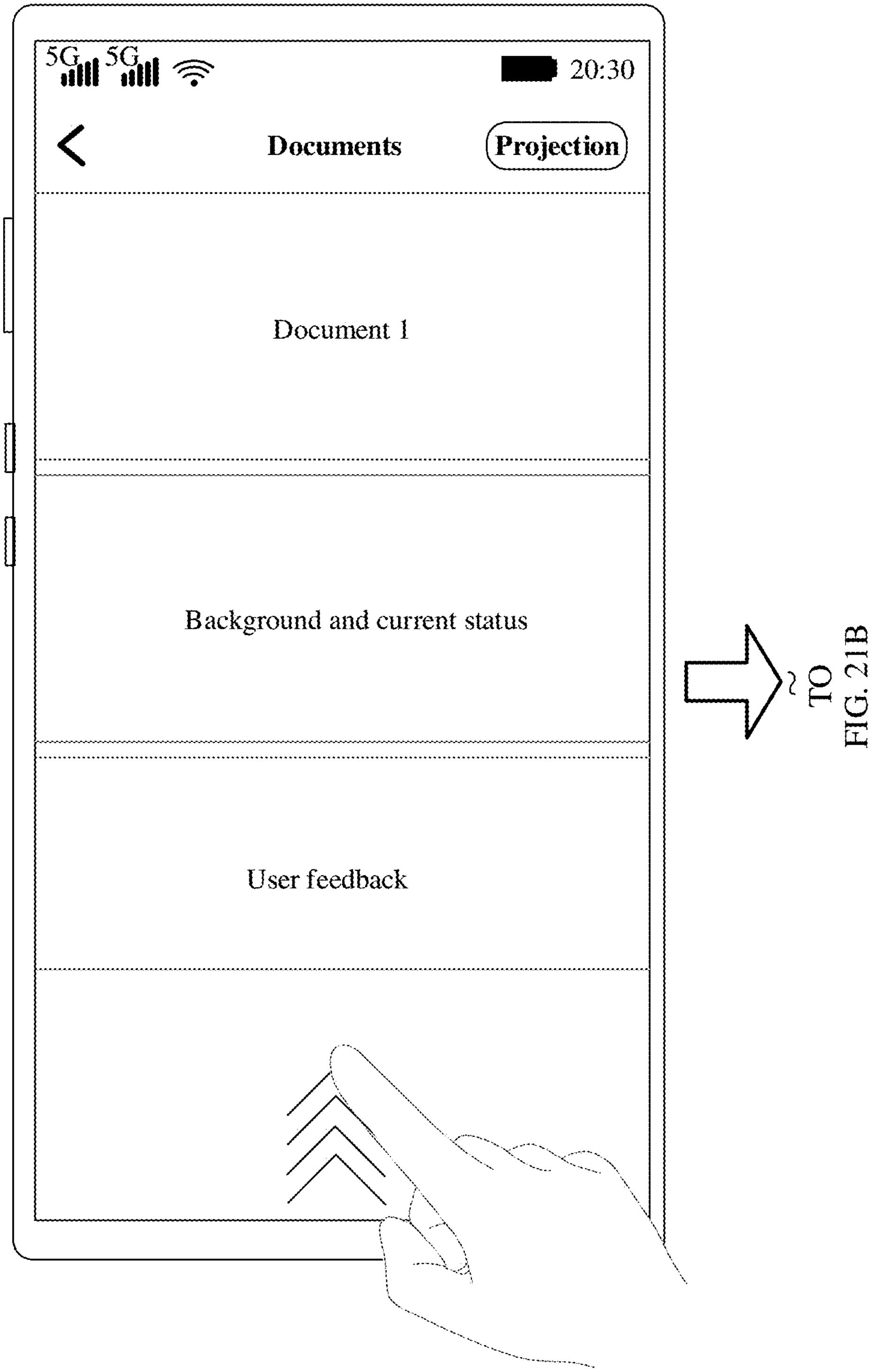
Figure 21B:
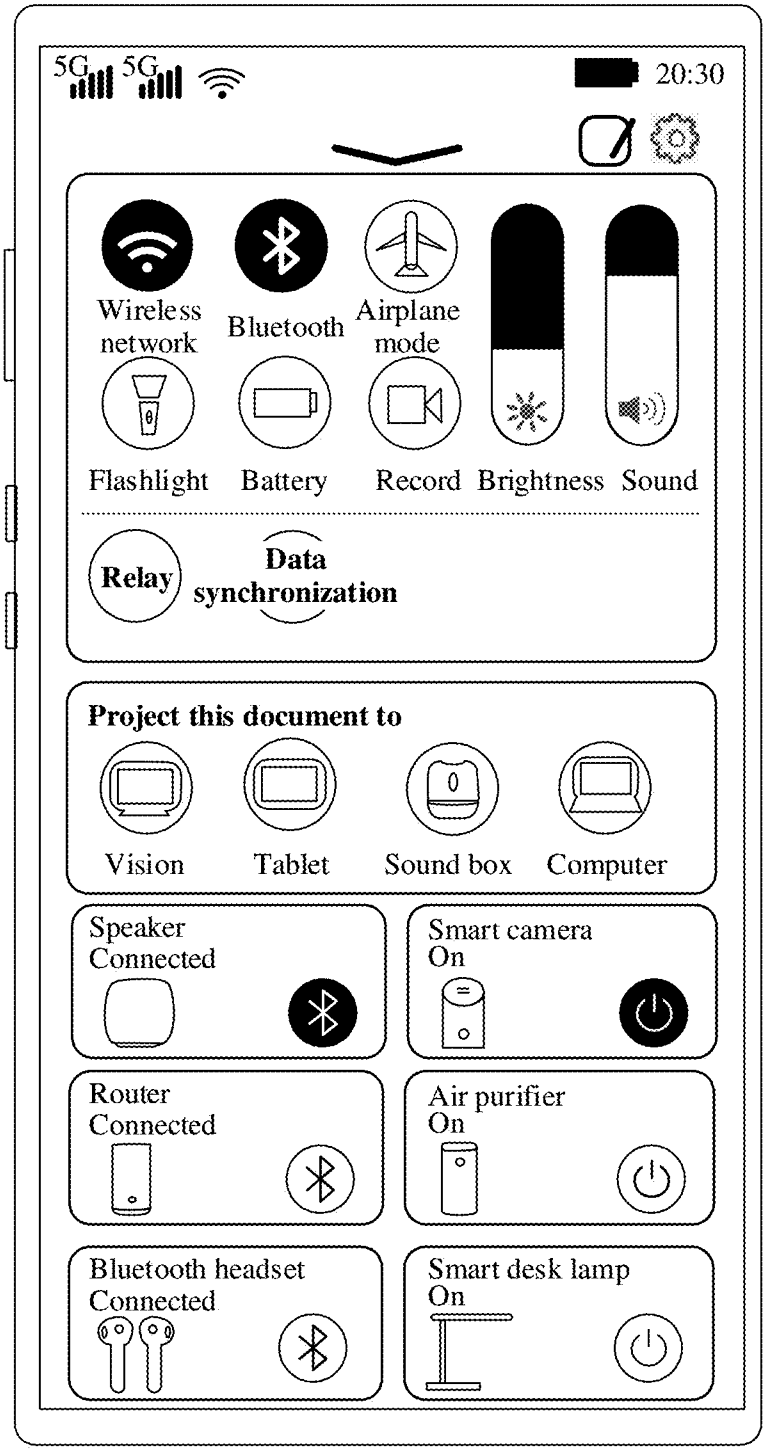

Embodiment 13: As shown in FIG. 21A and FIG. 21B, the currently executed task of the control device is document editing, the user triggers a multi-device control center interface display instruction, the control device determines that software switching entries for the currently executed document editing task are "relay" and "data synchronization", and the control device displays the software switching entries "relay" and "data synchronization" in the software/hardware switching entry area of the multi-device control center interface.

Figure 22A:
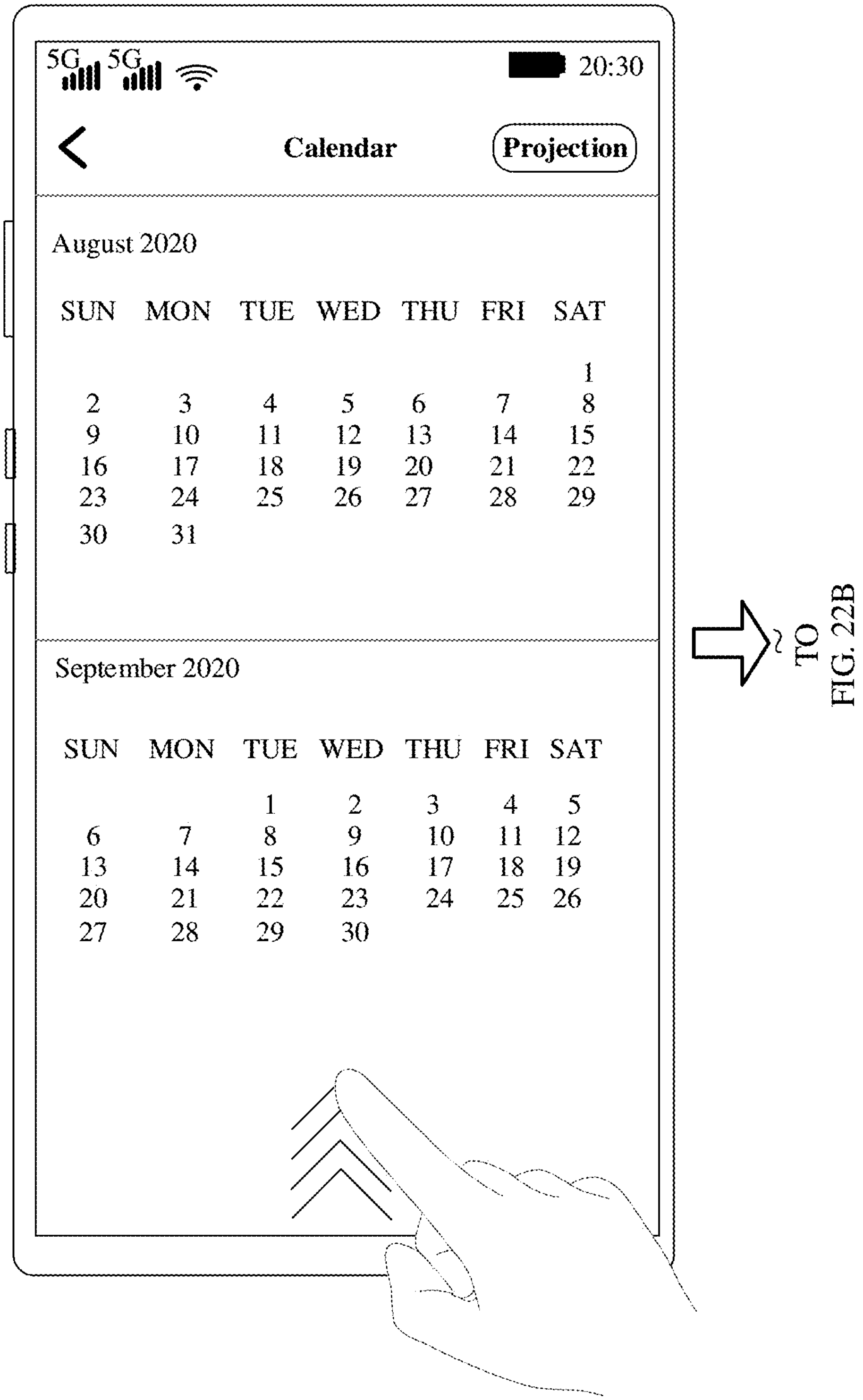
Figure 22B:
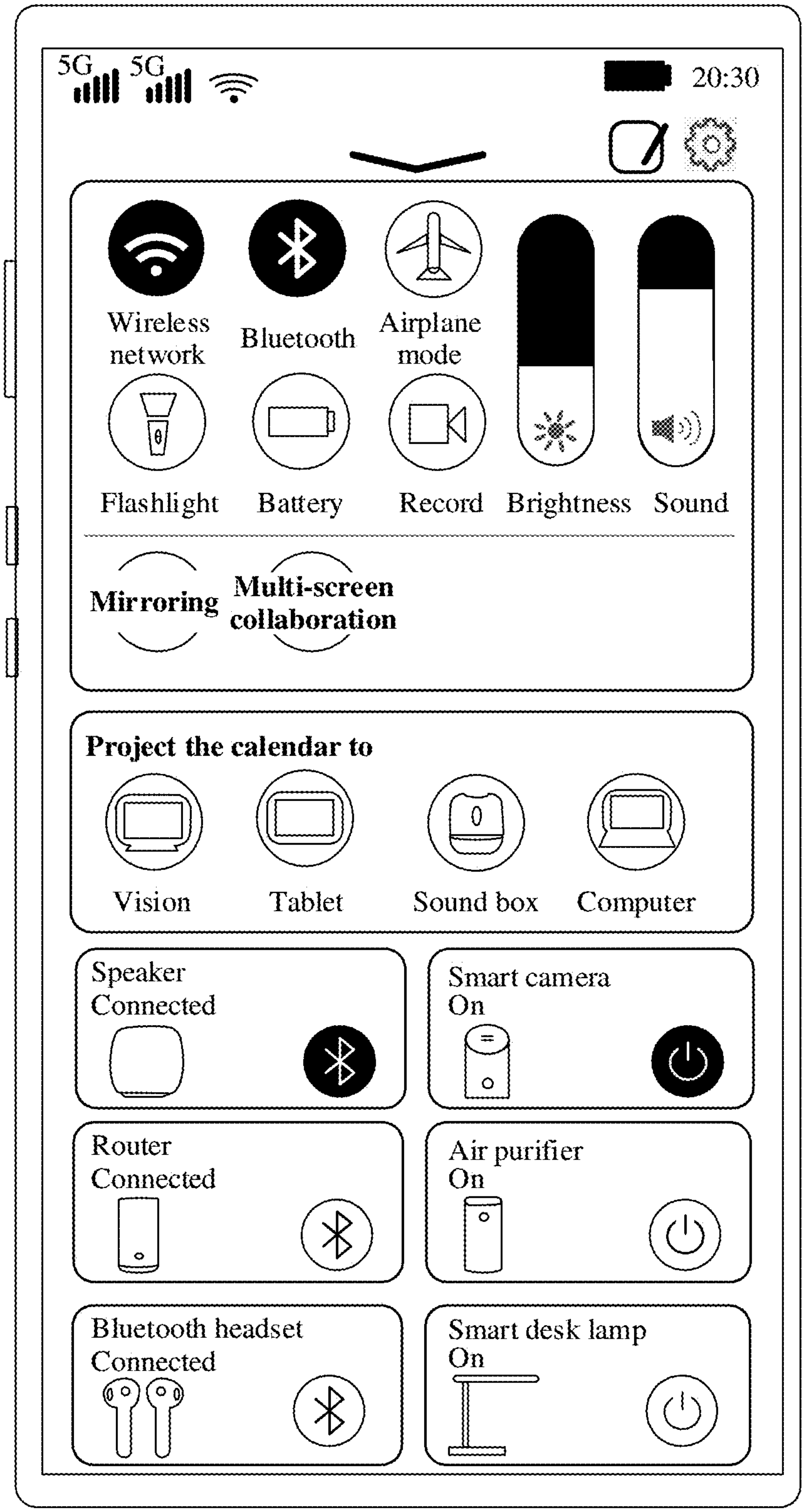

Embodiment 14: As shown in FIG. 22A and FIG. 22B, the currently executed task of the control device is calendar displaying, the user triggers a multi-device control center interface display instruction, the control device determines that software switching entries for the currently executed calendar displaying task are "mirroring" and "multi-screen collaboration", and the control device displays the software switching entries "mirroring" and "multi-screen collaboration" in the software/hardware switching entry area of the multi-device control center interface.

Manner 3: The control device determines, based on software capability information of a nearby device that has currently established a connection, at least one software switching entry displayed in the multi-device control center interface.

After the control device is currently connected to a nearby device, the user triggers a multi-device control center interface display instruction. The control device determines the nearby device that has established a connection to the control device, sorts an identifier of the nearby device that has established a connection to the control device in the front and highlights the identifier in the nearby device area, determines a corresponding software switching entry based on software capability information of the nearby device, and displays the software switching entry corresponding to the nearby device in the software/hardware switching entry area of the multi-device control center interface, or sorts, in the software/hardware switching entry area of the multi-device control center interface, the software switching entry corresponding to the nearby device in the front and highlights the software switching entry.

For example, if the user operates the control device and selects a computer, software switching entries corresponding to software capabilities that can be provided by the computer, such as "multi-screen collaboration", "screen extension", "relay", and "computer mode", are preferentially displayed in the software/hardware switching entry area of the multi-device control center interface.

Alternatively, if the user operates the control device and selects a television, software switching entries corresponding to software capabilities that can be provided by the television, such as "mirroring", "DLNA projection", and "computer mode", are preferentially displayed in the software/hardware switching entry area of the multi-device control center interface.

Alternatively, if the user operates the control device and selects a tablet, software switching entries corresponding to software capabilities that can be provided by the tablet, such as "multi-screen collaboration", "screen extension", and "relay", are preferentially displayed in the software/hardware switching entry area of the multi-device control center interface.

Alternatively, if the user operates the control device and selects a mobile phone, software switching entries corresponding to software capabilities that can be provided by the mobile phone, such as "mirroring", "relay", and "screen extension", are preferentially displayed in the software/hardware switching entry area of the multi-device control center interface.

The following further describes, by using Embodiment 15, a manner in which the control device determines, based on the software capability of the nearby device that has currently established a connection, the software switching entry displayed in the multi-device control center interface.

Figure 23:
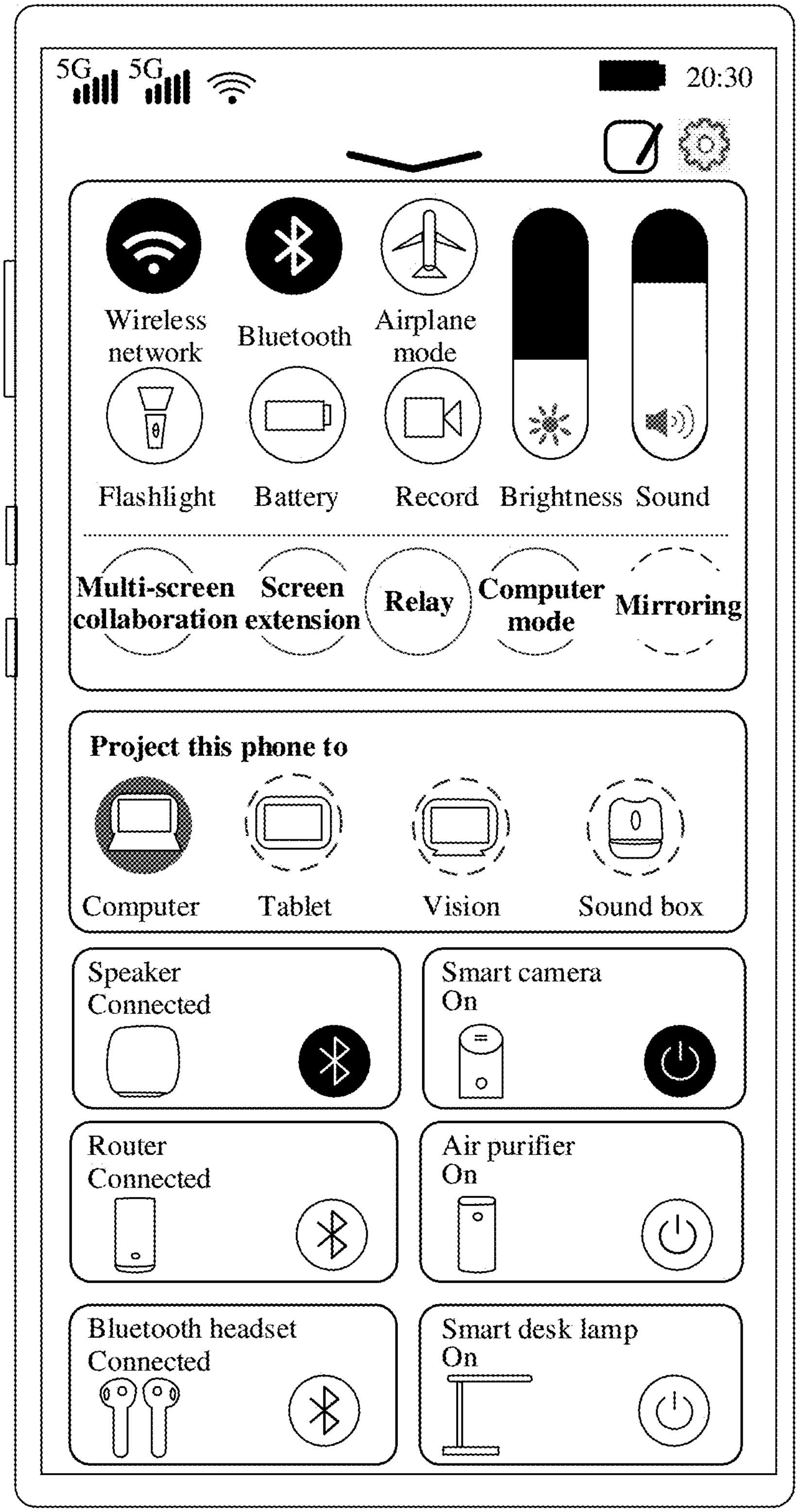

Embodiment 15: After the user operates the control device and selects a computer, the user triggers a multi-device control center interface display instruction. The control device determines that the control device has established a connection to the computer. In this scenario, the multi-device control center interface displayed by the control device is shown in FIG. 23. An identifier of the computer is highlighted in the nearby device area of the multi-device control center interface, and software switching entries "multi-screen collaboration", "screen extension", "relay", and "computer mode" are highlighted in the software switching entry area.

It should be noted that the control device may display the hardware switching entry in the software/hardware switching entry area of the multi-device control center interface, as shown in Embodiment 1 to Embodiment 7. The control device may display the software switching entry in the software/hardware switching entry area of the multi-device control center interface, as shown in Embodiment 8 to Embodiment 15. The control device may alternatively display both the hardware switching entry and the software switching entry in the same or different sub-areas of the software/hardware switching entry area of the multi-device control center interface.

Figure 24:
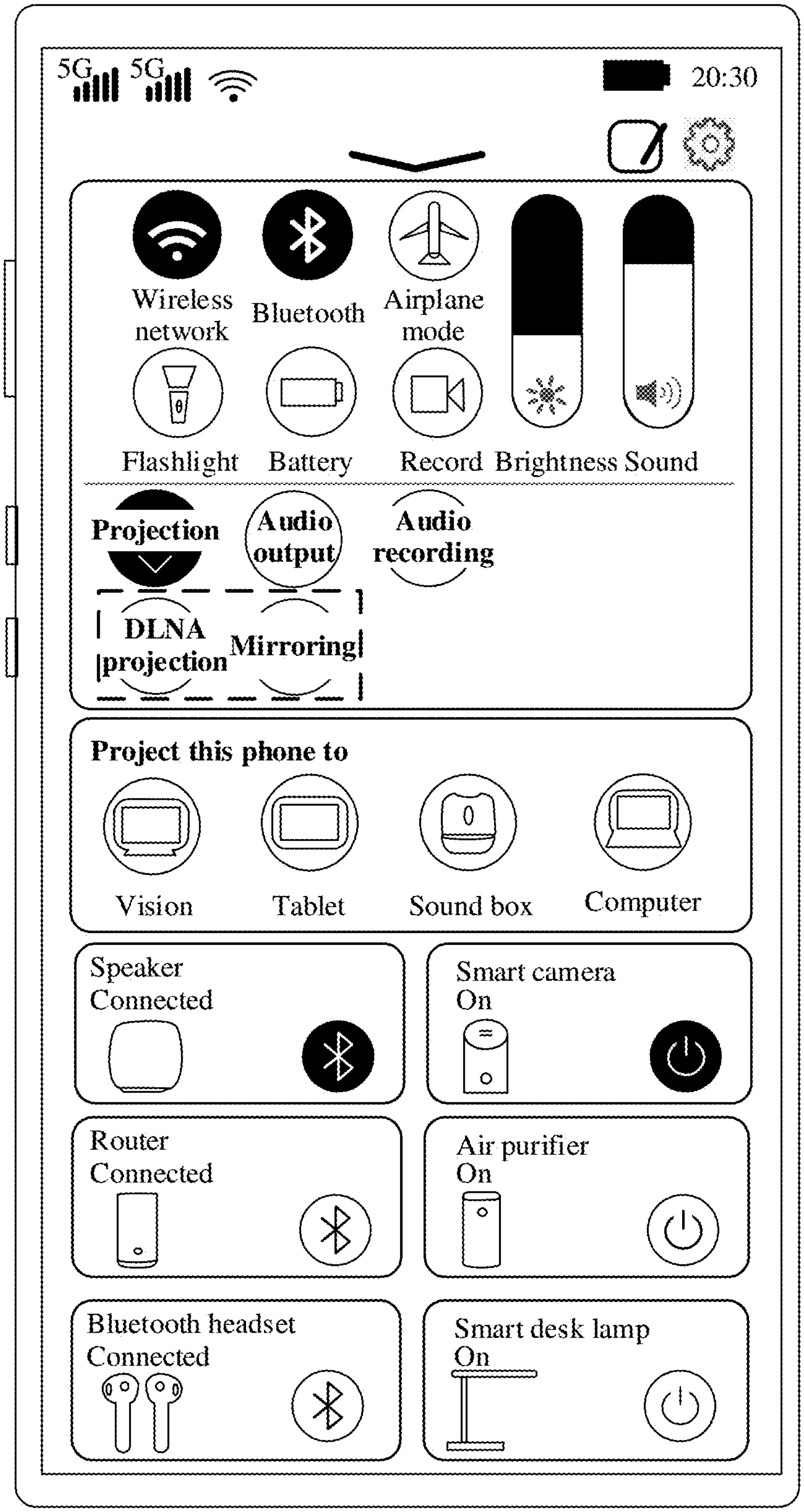
Figure 25:
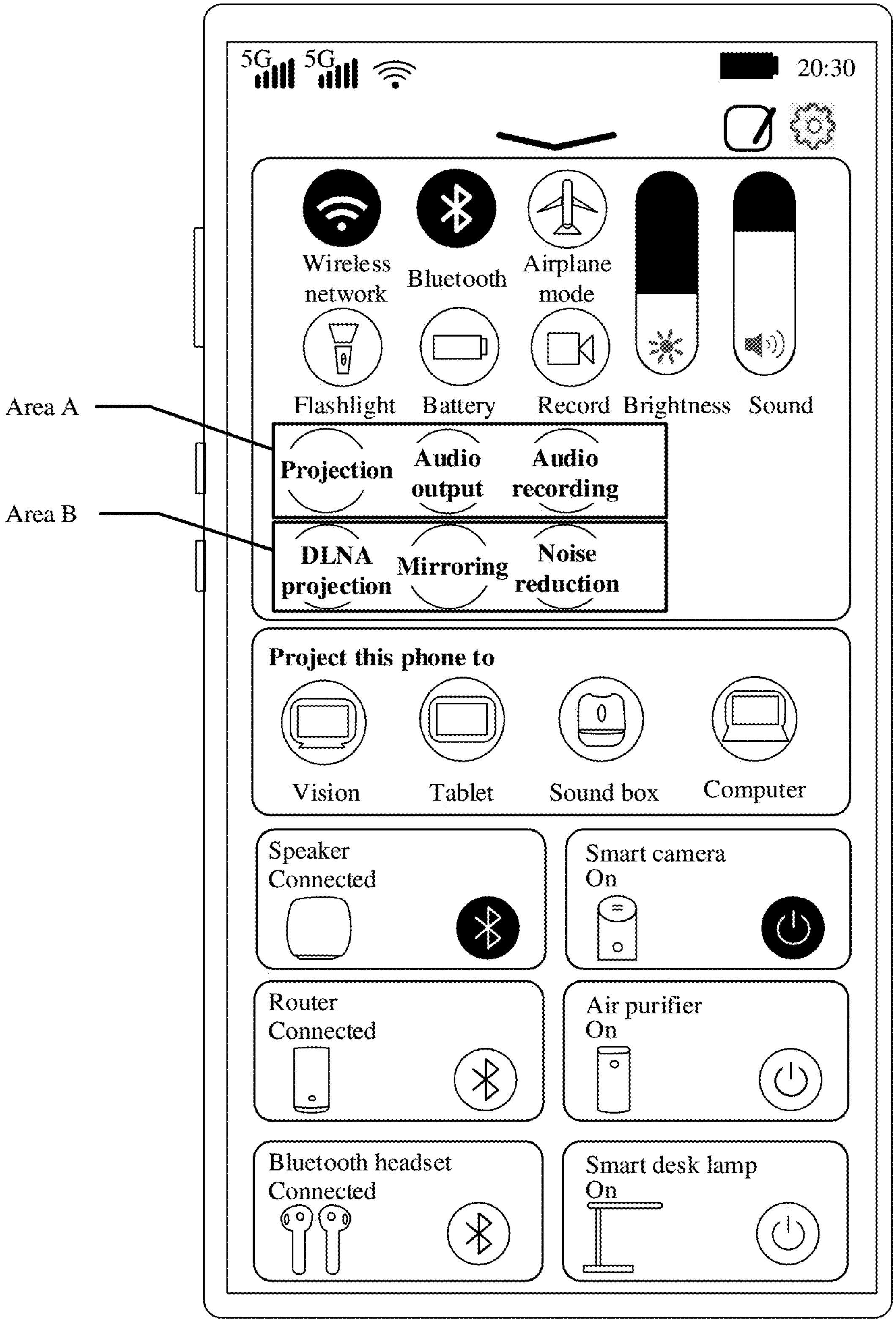
Figure 26:
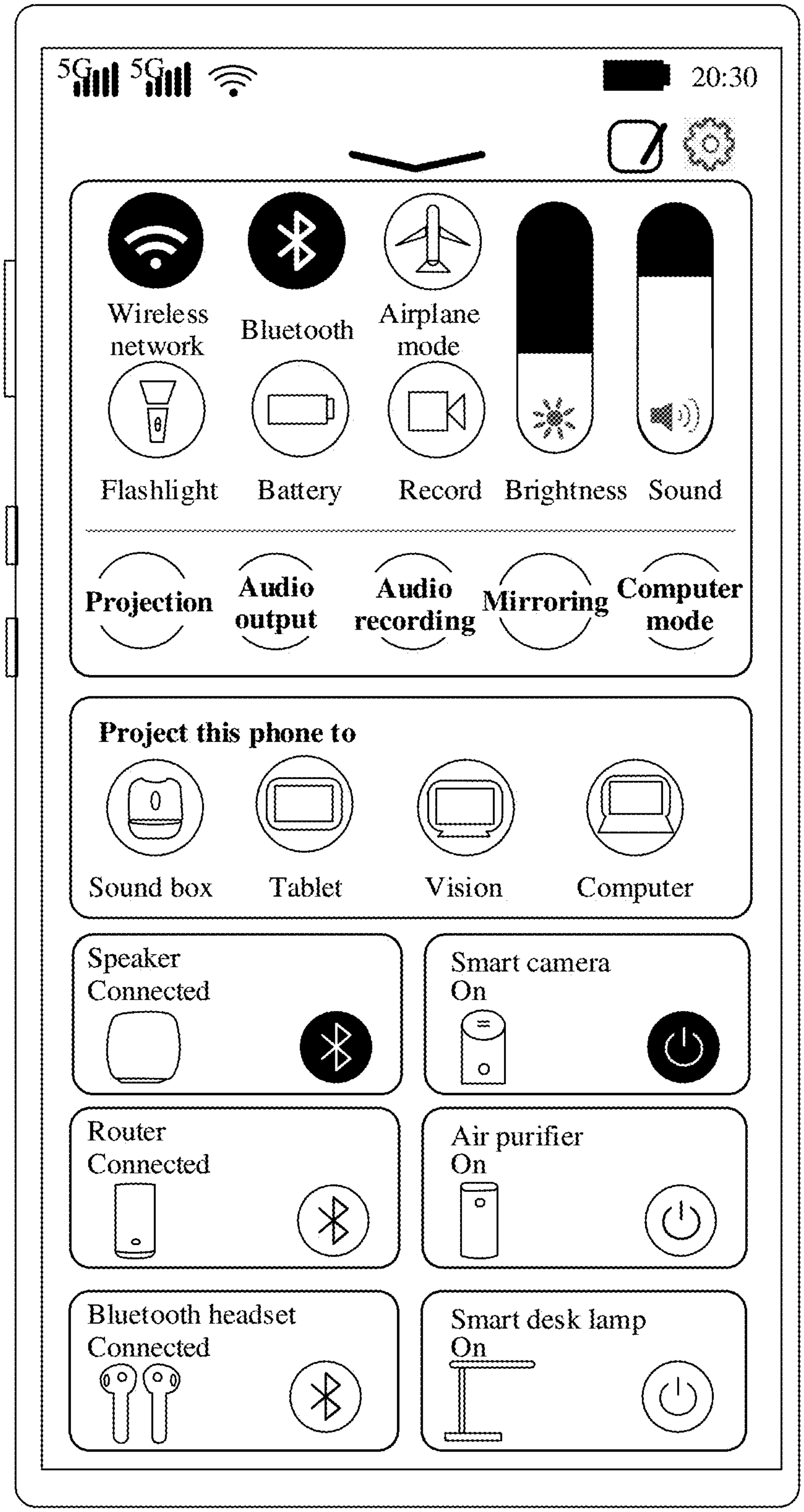

When the control device displays both the hardware switching entry and the software switching entry in the software/hardware switching entry area, an optional manner is as follows: Because the software switching entry implements switching based on the hardware switching entry, for example, for the software switching entry "computer mode", the user needs to select the hardware switching entry "projection" to project content displayed by the control device to the nearby device, so that a function of using the computer mode can be implemented by using the software switching entry "computer mode". In the multi-device control center interface shown in FIG. 24, in the software/hardware switching entry area, a software switching entry is placed under a corresponding hardware switching entry. The user may tap an expand button corresponding to the hardware switching entry, to trigger display of the software switching entry corresponding to the hardware switching entry. Software switching entries corresponding to the hardware switching entry "projection" are shown in a dashed box in FIG. 24. In another optional manner, the hardware switching entry and the software switching entry are respectively displayed in different sub-areas in the software/hardware switching entry area of the multi-device control center interface. For example, as shown in FIG. 25, the hardware switching entry is displayed in an area A, and the software switching entry is displayed in an area B. In still another optional manner, the hardware switching entry and the software switching entry are displayed in the software/hardware switching entry area of the multi-device control center interface at the same time. For example, as shown in FIG. 26, after the software switching entry and the hardware switching entry are sorted, the software switching entry and the hardware switching entry are displayed in a same area.

Figure 27:
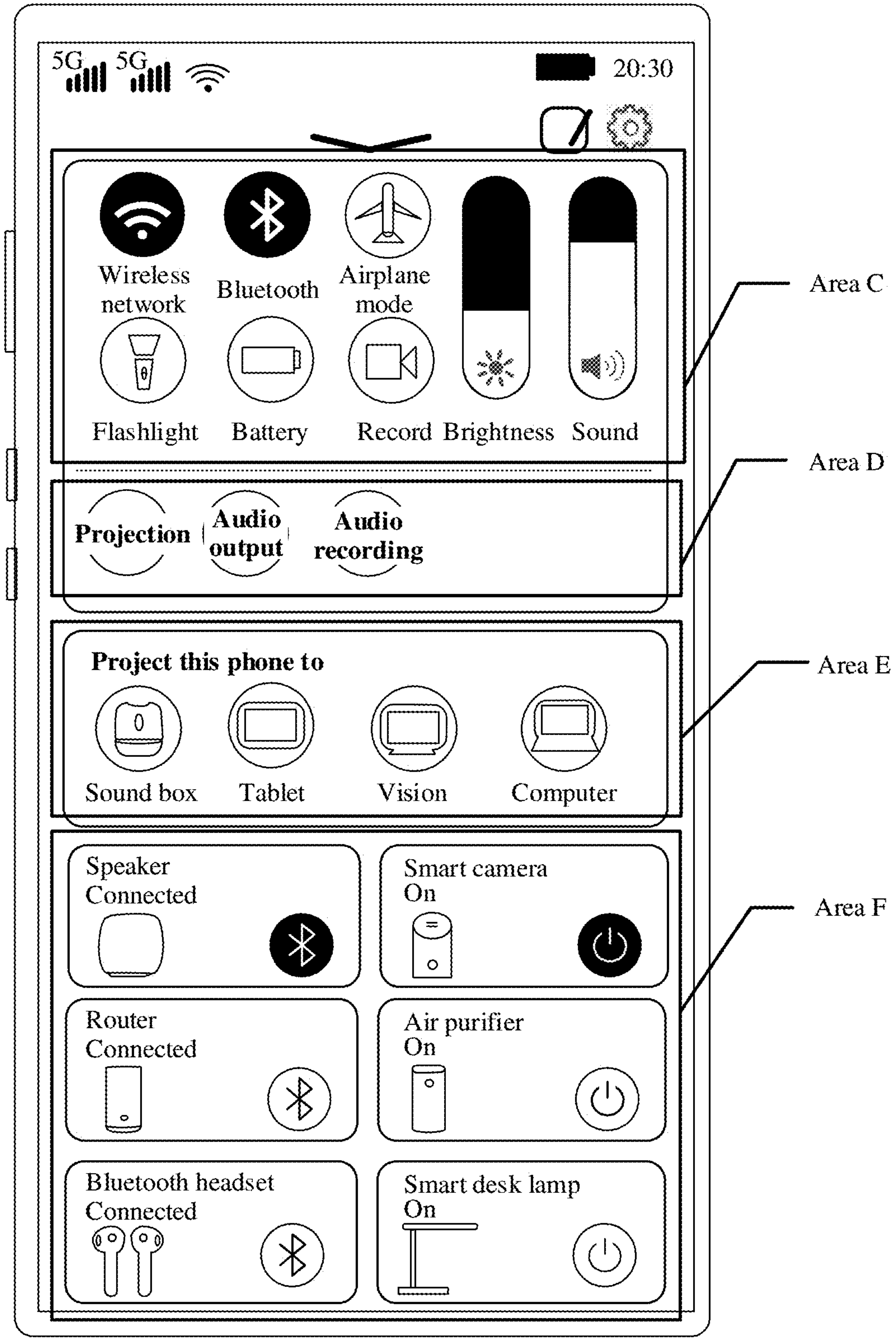
FIG. 27 to FIG. 30(*c*) are schematic diagrams of different display styles of a multi-device control center interface according to an embodiment of this application.

Embodiments of this application further provide a plurality of display styles of a multi-device control center interface. A design concept of the multi-device control center interface in embodiments of this application is described by using a style 1 shown in FIG. 27. An area C in FIG. 27 is a control device function area, and a user can set as control device by using a shortcut entry of this area. An area D is a software/hardware switching entry area, and is used to display a hardware switching entry and a software switching entry of the control device. Buttons displayed in the control device function area and the software/hardware switching entry area are buttons corresponding to functions of the control device, and reflect the control center, namely, a function of the control device, of the all-scenario smart life that is indicated by "1" in the "1+8+N" concept of the all-scenario smart life. For the eight types of nearby devices that are used as auxiliary entries in the "1+8+N" concept, the control device displays identifiers of currently detected nearby devices in an area E, and the user can slide left or right to view or select a nearby device. For the N peripheral devices in the "1+8+N" concept, the control device displays identifiers of currently detected peripheral devices in an area F, and the user can slide up or down to view or select a peripheral device. By using the multi-device control center, the control device is used as the control center of the all-scenario smart life, to coordinate and control nearby devices. In addition, a software/hardware capability of the nearby device can be conveniently and quickly used, thereby improving user experience.

Figure 28A:
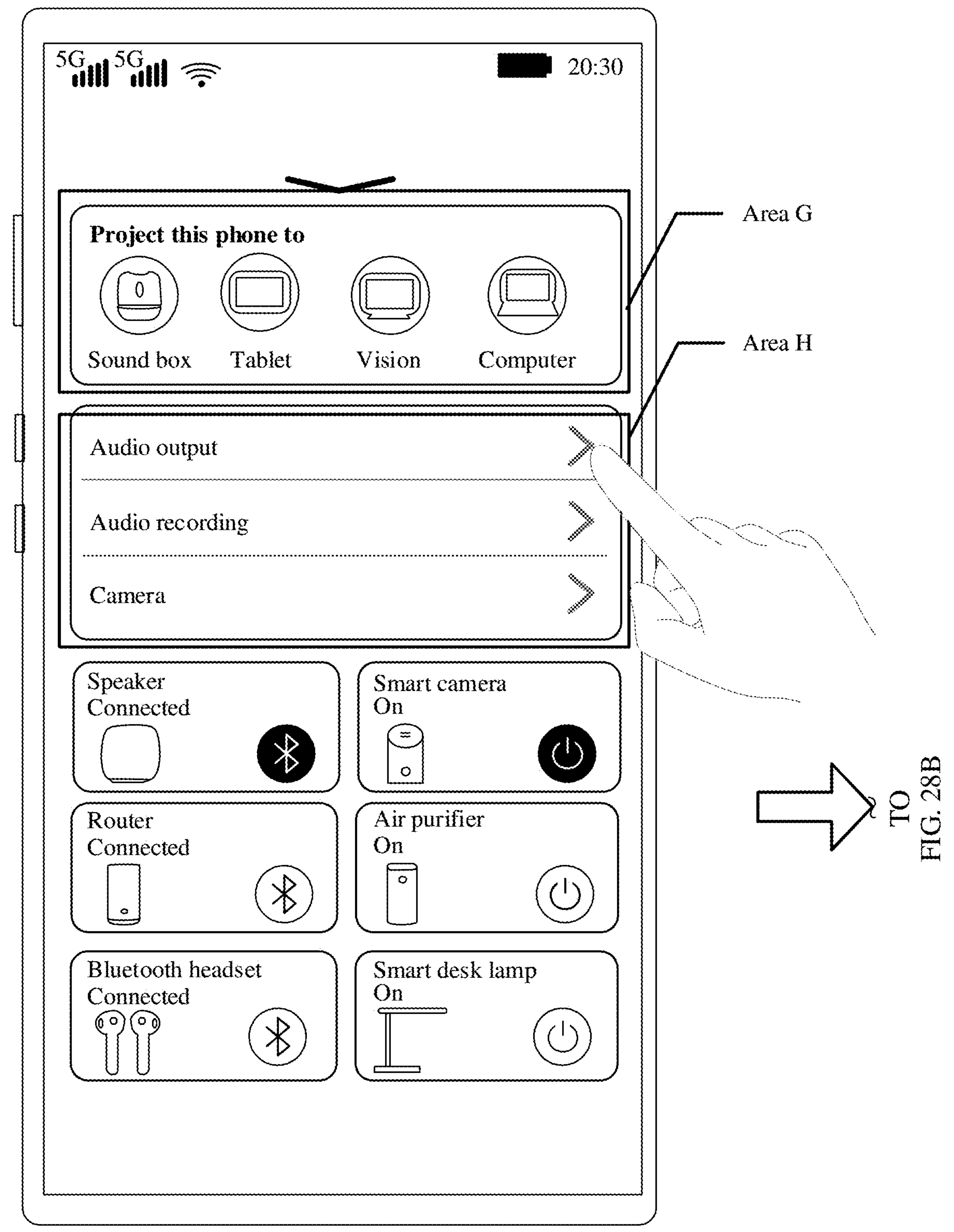
Figure 28B:
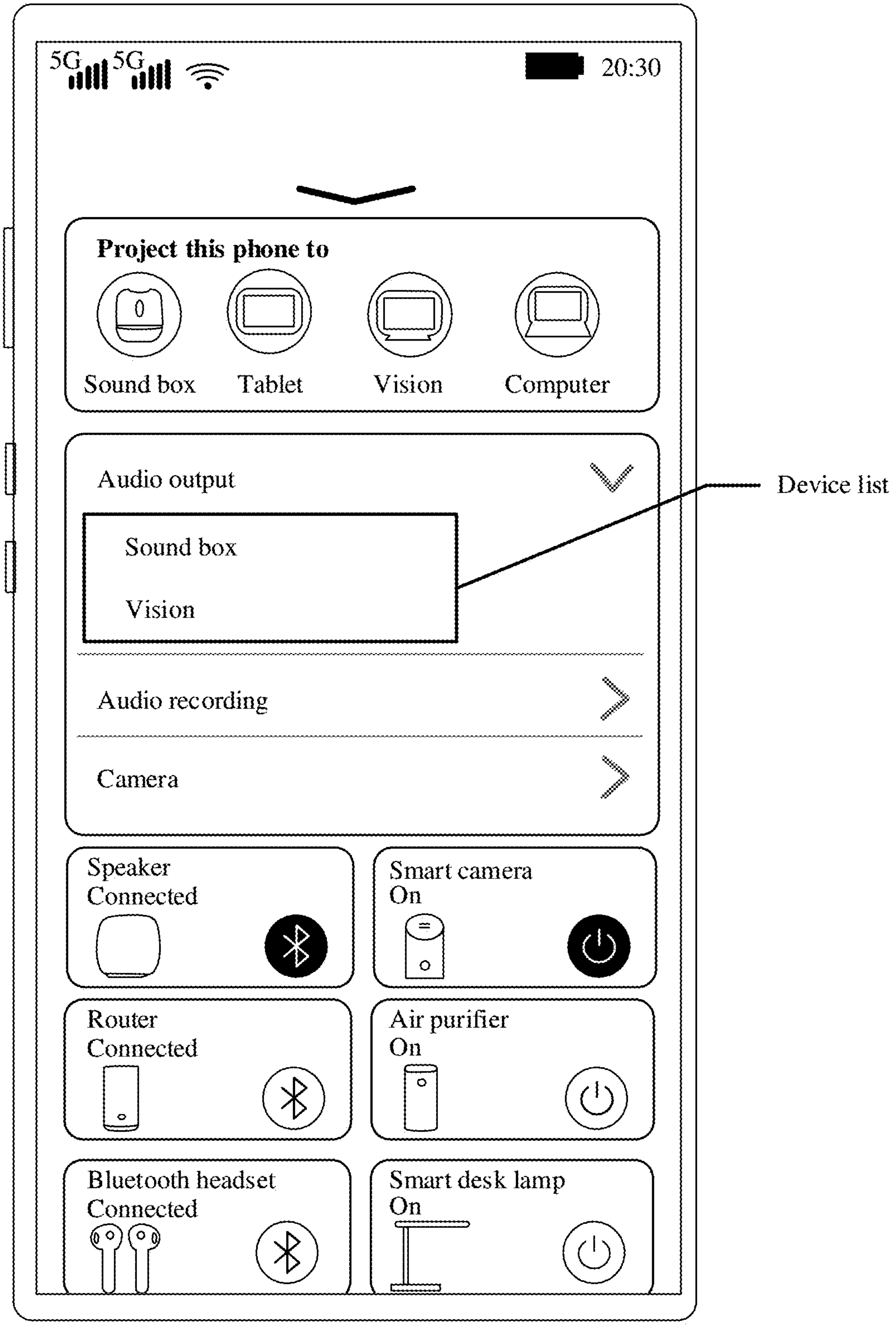

In a style 2 shown in FIG. 28A and FIG. 28B, the control device displays identifiers of nearby devices in an area G in the multi-device control center interface, and displays a software/hardware switching entry in an area H. Each software/hardware switching entry corresponds to an expand button. After the user taps the expand button, a device list shown in FIG. 28B is triggered to be displayed. The device list includes a nearby device that has a software/hardware capability of a software/hardware switching entry corresponding to the current expand button. For example, when the user taps an expand button corresponding to a hardware switching entry "audio output", a displayed device list is a list of nearby devices that support audio output. If the user selects a target nearby device from the device list displayed on a touch display to trigger a target switching instruction, and the control device determines that the target switching instruction is to implement an audio output function of the control device by using the target nearby device, the control device uses the target nearby device selected by the user as the audio output device of the control device.

Figure 29:
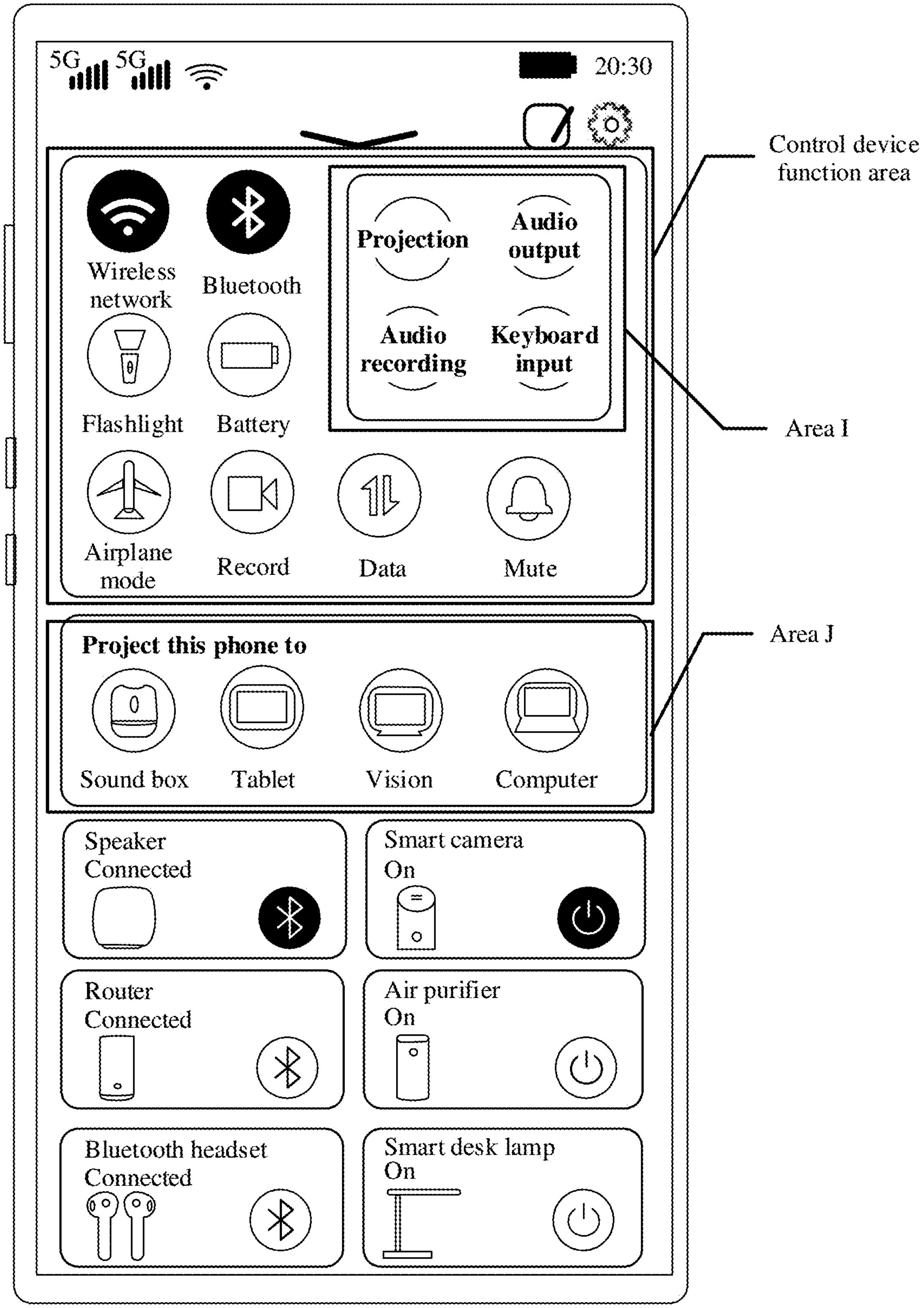

In a style 3 shown in FIG. 29, an area I in the multi-device control center interface is a software/hardware switching entry area, the area I is located in a control device function area, and an identifier of a nearby device is displayed in an area J.

Figure 30A:
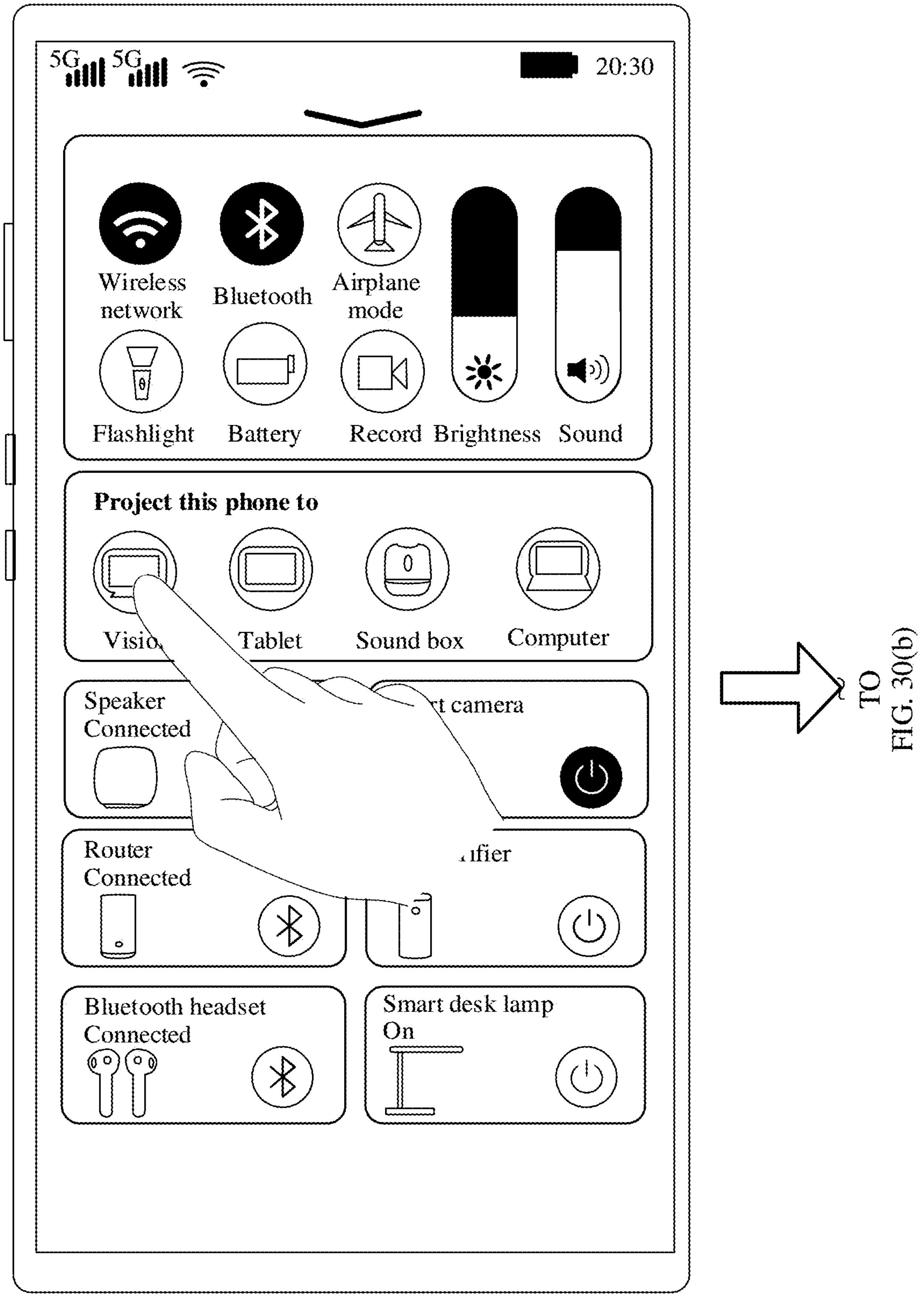
Figure 30B:
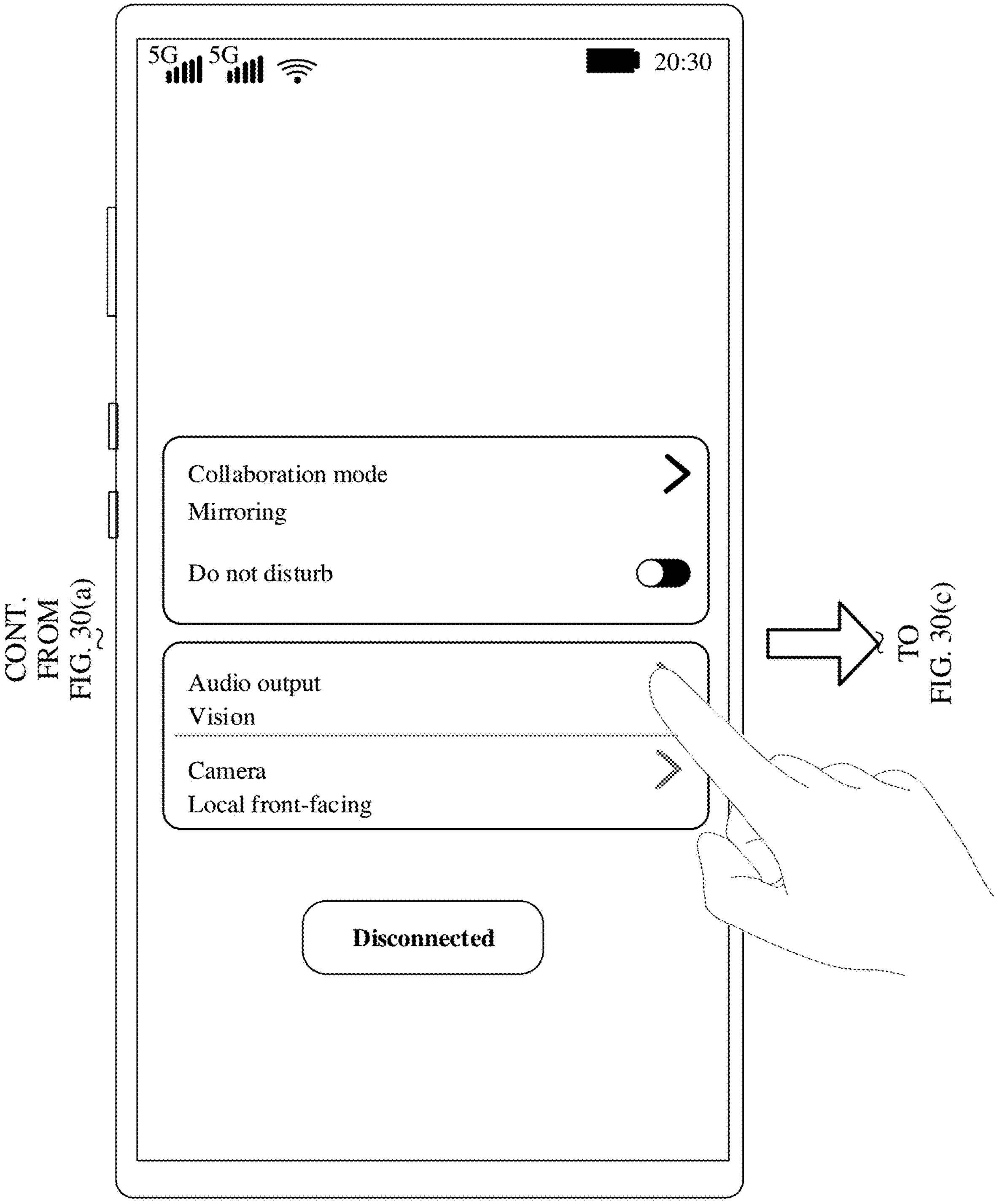
Figure 30C:
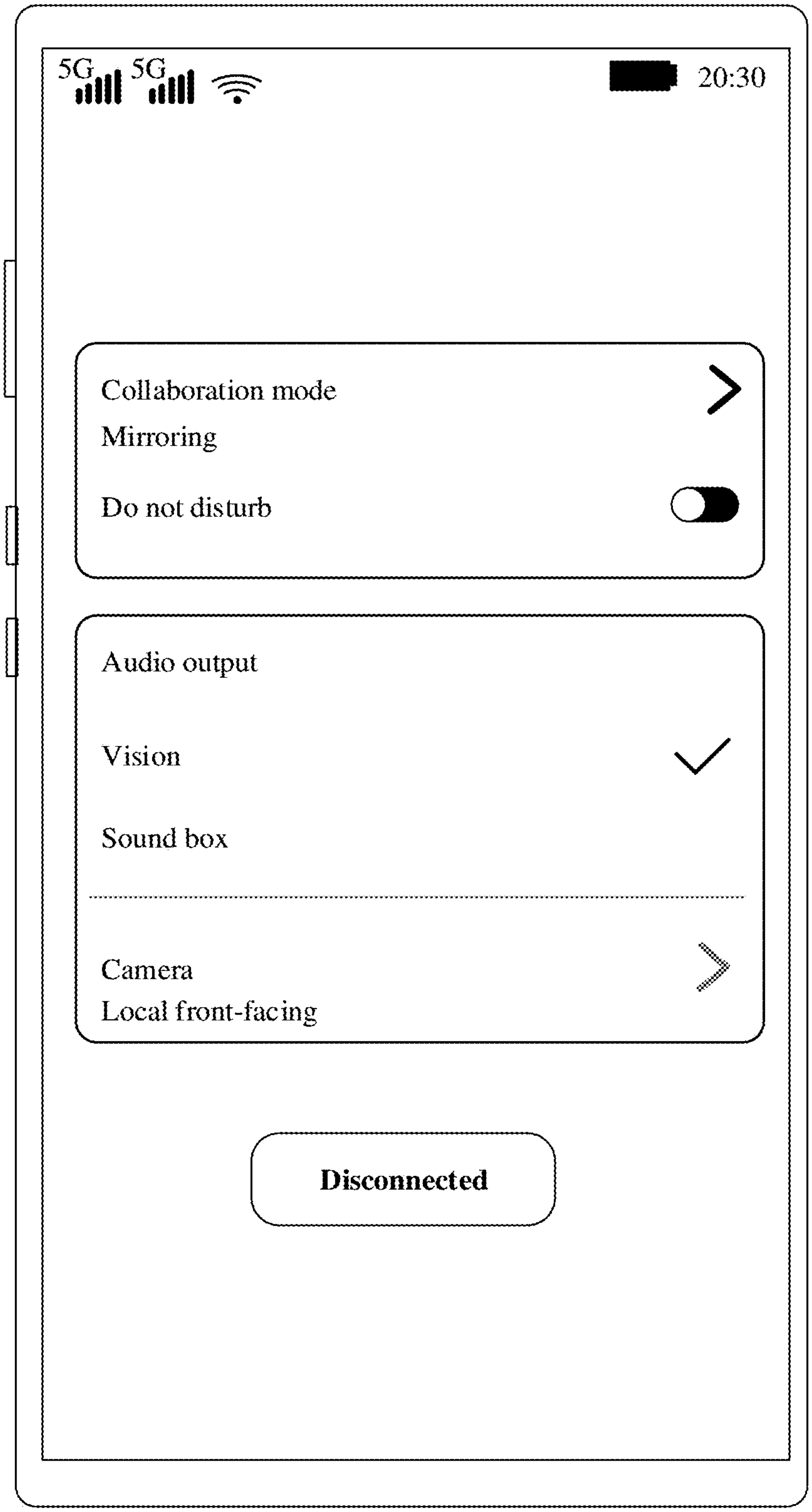

In a style 4 shown in FIG. 30(*a*), FIG. 30(*b*), and FIG. 30(*c*), an identifier of a nearby device is displayed in the multi-device control center interface shown in FIG. 30(*a*). After the user presses and holds the identifier of the nearby device, display of a software/hardware switching entry interface shown in FIG. 30(*b*) is triggered. After the user taps an expand button corresponding to a hardware switching entry in the software/hardware switching entry interface displayed on a touch display, the control device displays the hardware switching entry on the touch display, and a list of nearby devices corresponding to the hardware switching entry is displayed below the hardware switching entry. For example, after the user taps the expand button corresponding to the audio output, a list of nearby devices shown in FIG. 30(*c*) is displayed, and the user can select a nearby device in the list of nearby devices as the audio output device of the control device.

2. Application Level

When a control device runs an application in the foreground, a user triggers, by using a preset button in the application, display of a software/hardware switching interface; and the user sends a software/hardware switching interface display instruction to the control device by tapping the preset button on a touch display, so that the control device displays the software/hardware switching interface in an application interface currently displayed on a display. For example, the user taps a "projection" button in the application interface displayed on the touch display, and the control device displays the software/hardware switching interface on the touch display.

In an optional implementation of this embodiment of this application, after the user triggers the software/hardware switching interface display instruction in the application display interface, the control device detects a current nearby device, and displays an identifier of at least one detected nearby device in the software/hardware switching interface. For example, the control device displays, in the software/hardware switching interface, a name of the at least one nearby device detected by the control device. During specific implementation, the control device uses the same method as that in the foregoing operating system-level embodiment, and details are not described herein again.

In addition, after receiving the software/hardware switching interface display instruction, the control device determines a hardware switching entry and/or a software switching entry displayed in the software/hardware switching interface. During specific implementation, the control device uses the same method as that in the foregoing operating system-level embodiment, and details are not described herein again.

The following describes, with reference to the accompanying drawings, an example of determining, in different manners, a hardware switching entry displayed in a software/hardware switching interface in this embodiment of this application. During specific implementation, the control device may determine, in at least one of the following manners, the hardware switching entry displayed in the software/hardware switching interface.

Manner 1: The control device determines, based on detected hardware capability information of the nearby device, at least one hardware switching entry displayed in the software/hardware switching interface.

Figure 31A:
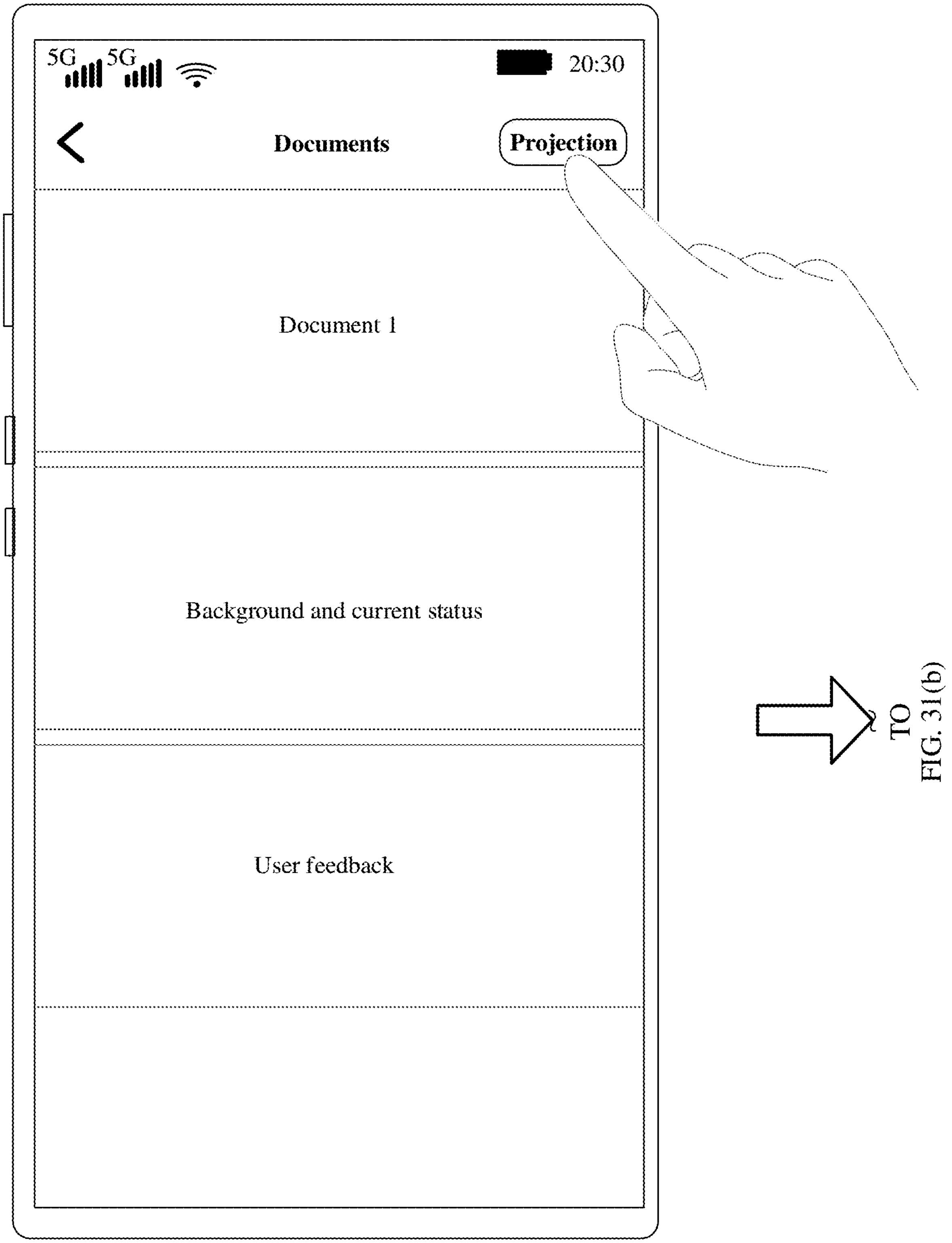
FIG. 31(*a*) to FIG. 37B are schematic diagrams of displaying at least one hardware switching entry in a software/hardware switching interface according to an embodiment of this application.
Figure 31B:
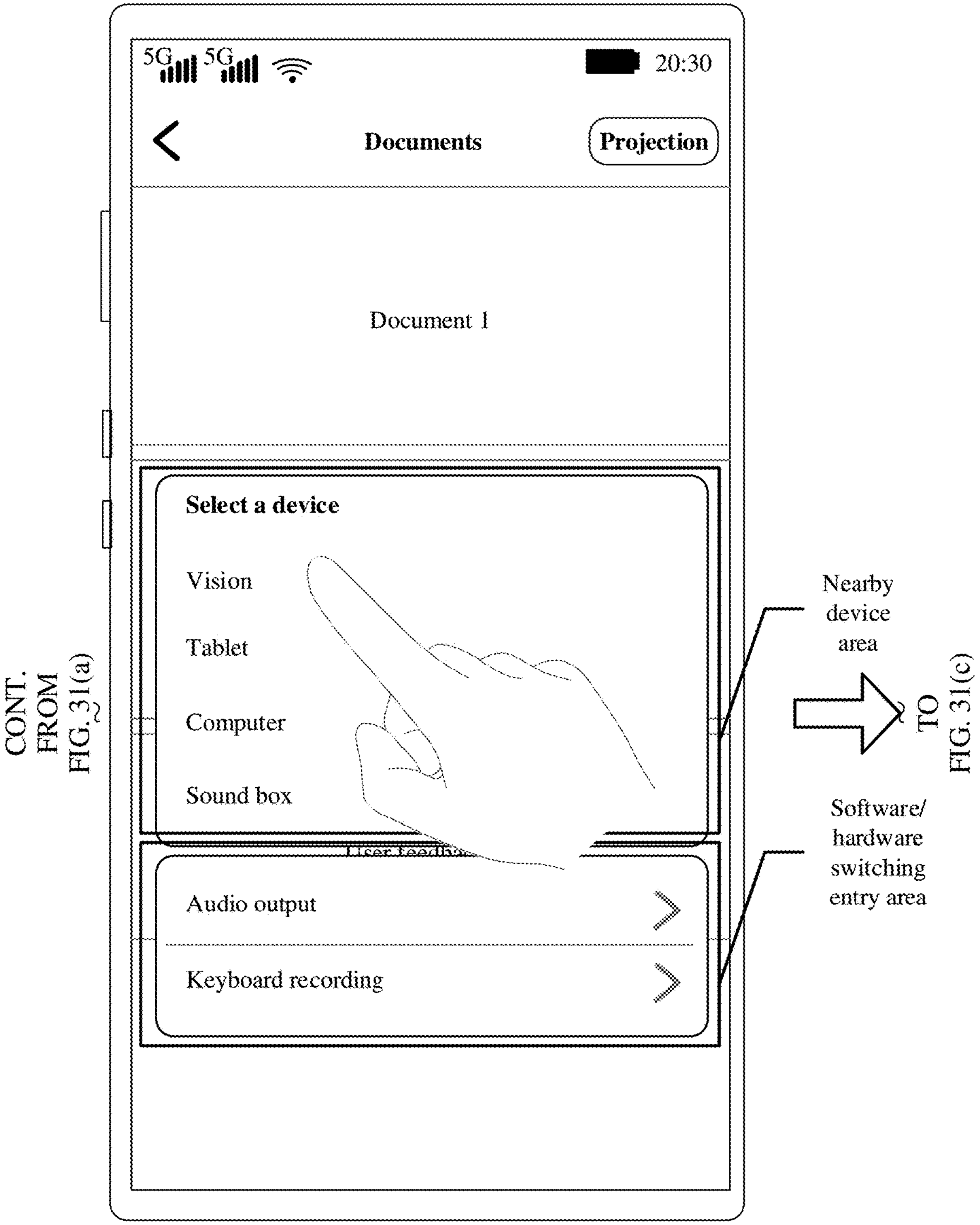
Figure 31C:
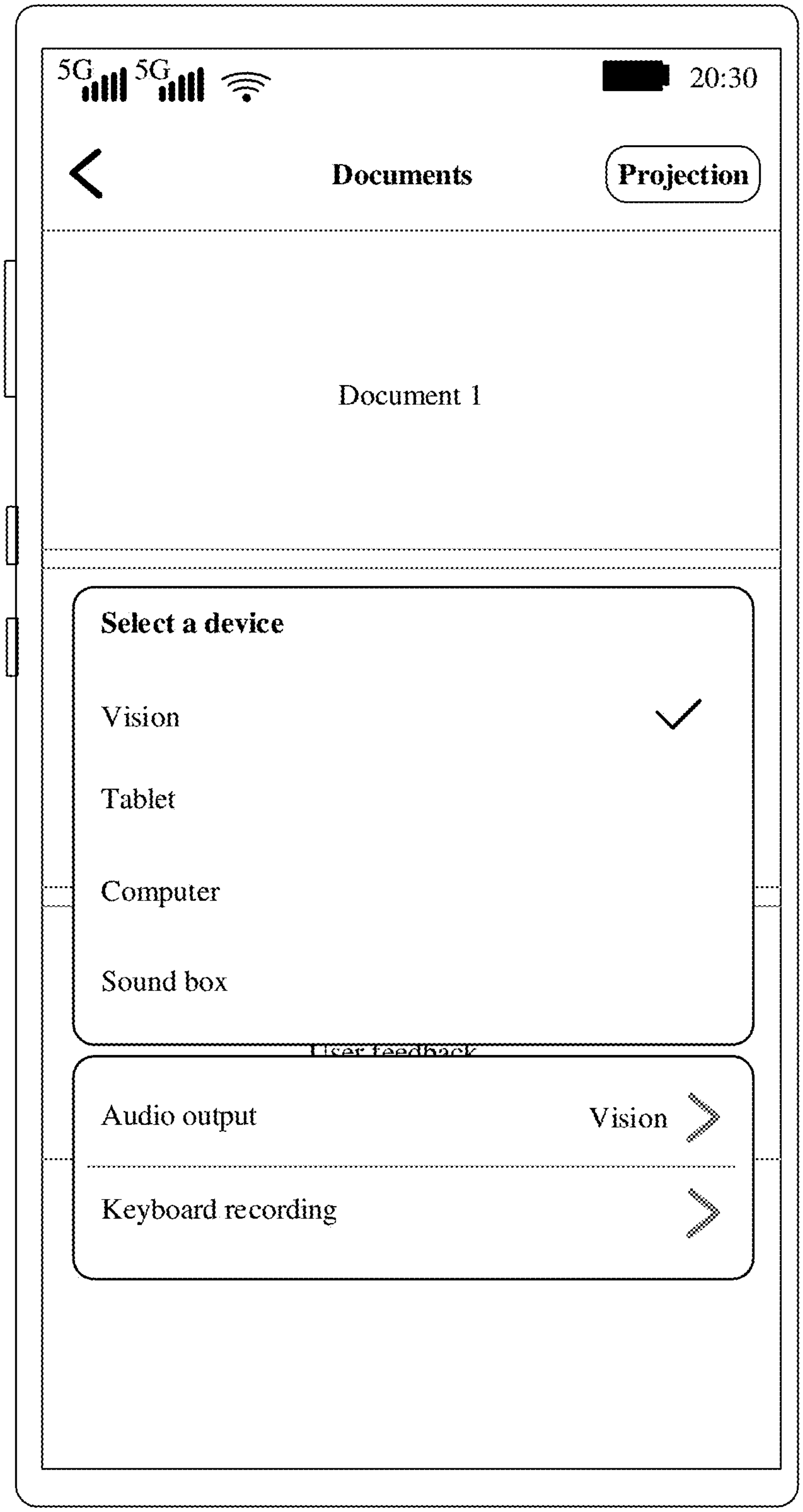

As shown in FIG. 31(*a*), an interface of a document application is displayed on the current touch display of the control device, and the user taps a "projection" button in the interface of the document application displayed on the touch display, to trigger a software/hardware switching interface display instruction. The control device displays, on the touch display, a software/hardware switching interface shown in FIG. 31(*b*), and the control device displays, in a nearby device area of the software/hardware switching interface, names of currently detected nearby devices such as a Vision device, a tablet, a computer, and a sound box. If the control device determines, based on detected hardware capability information of the nearby device, that hardware switching entries are "audio output" and "audio recording", names of the hardware switching entries "audio output" and "audio recording" are displayed in the software/hardware switching entry area of the software/hardware switching interface. As shown in FIG. 31(*c*), the user selects the Vision device in the nearby devices in the software/hardware switching interface displayed on the touch display, the control device projects currently displayed content to the Vision device, and selects the Vision device as an audio output device of the control device by default. The user can also manually change a nearby device for audio output. If the user needs to select a nearby device for audio recording of the control device, the user can tap the hardware switching entry "audio recording" to manually select a nearby device for audio recording.

Manner 2: The control device determines, based on a hardware function requirement of a currently executed task, at least one hardware switching entry displayed in the software/hardware switching interface.

Figure 32A:
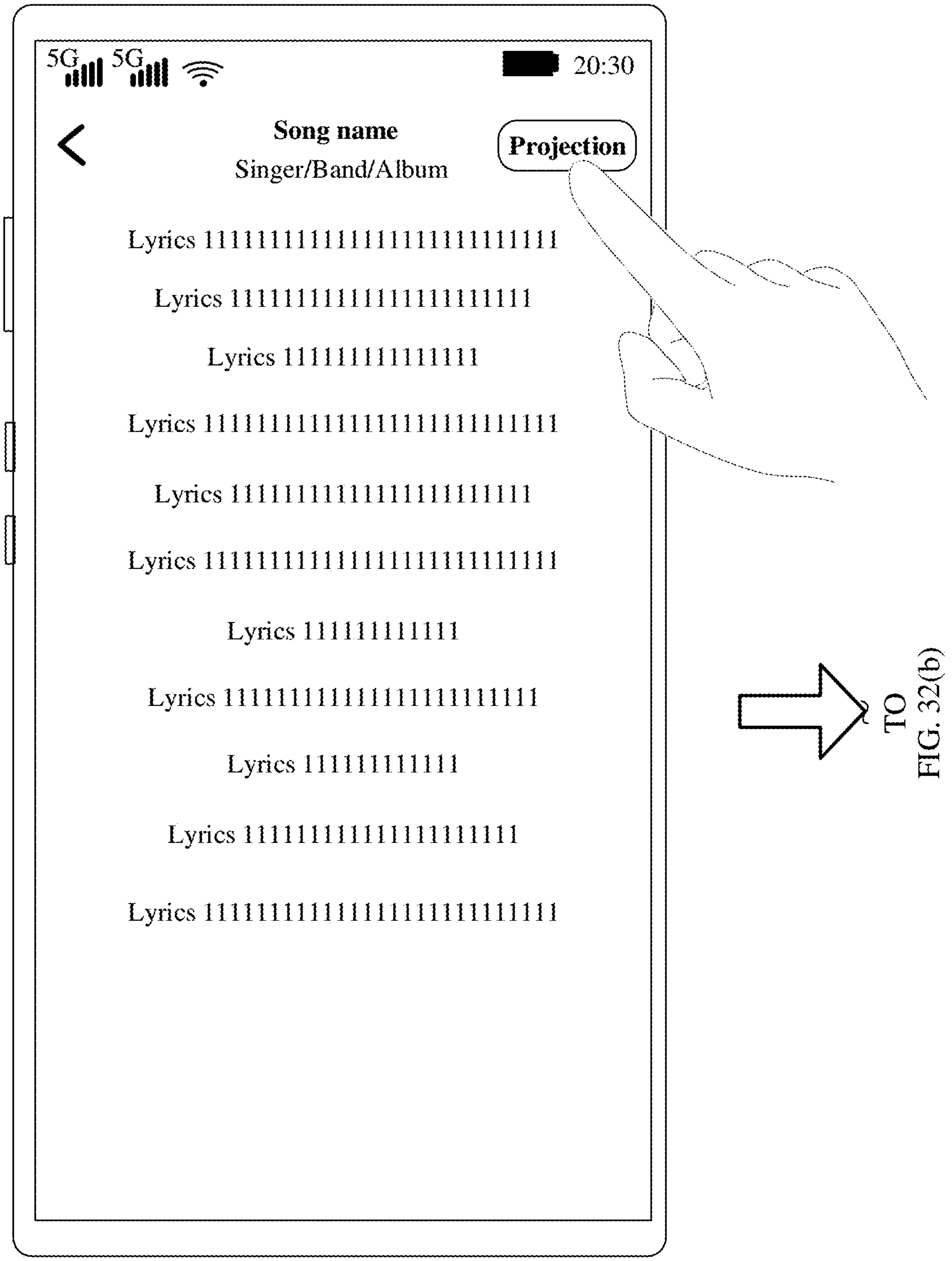
Figure 32B:
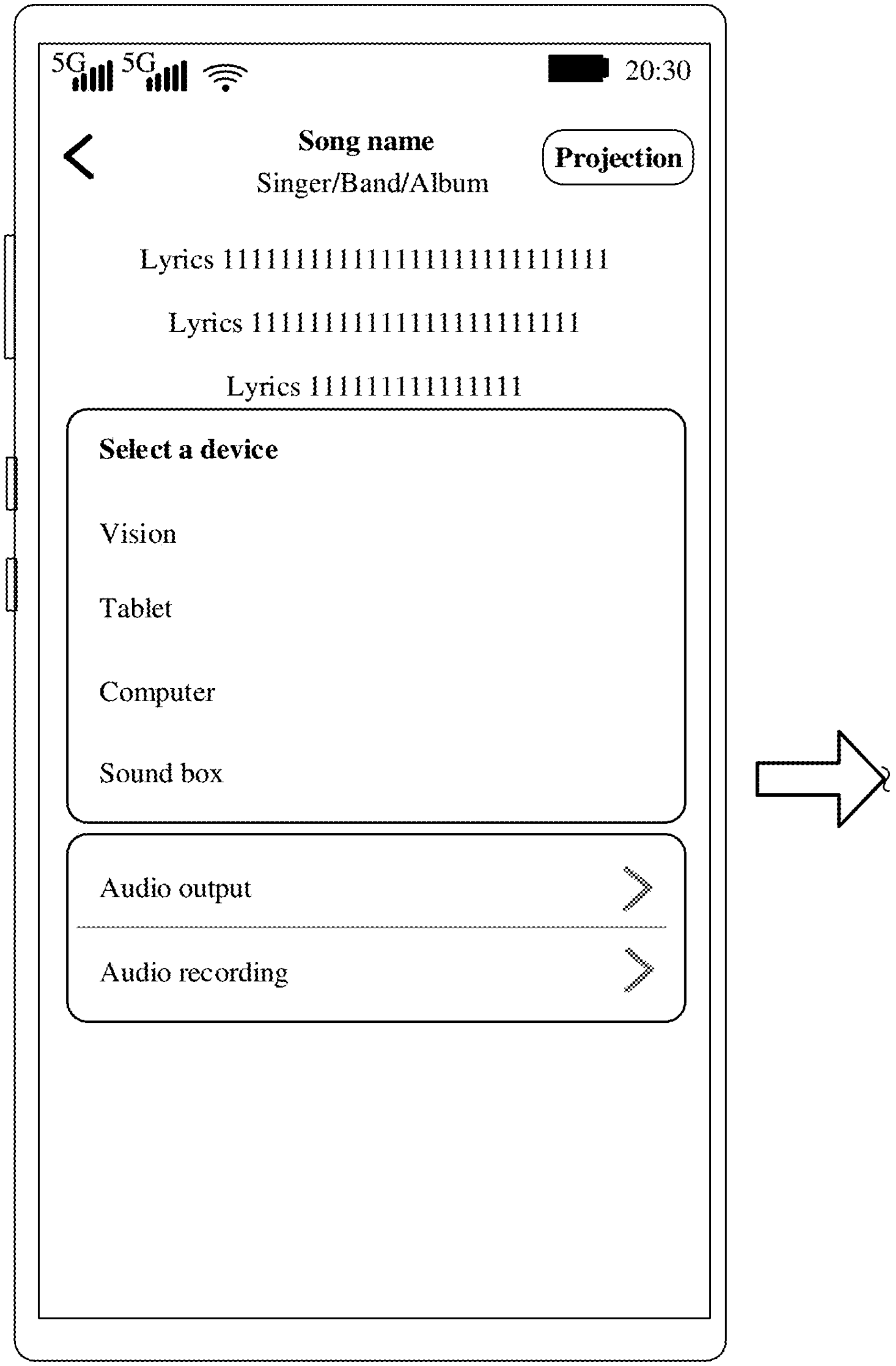
Figure 32C:
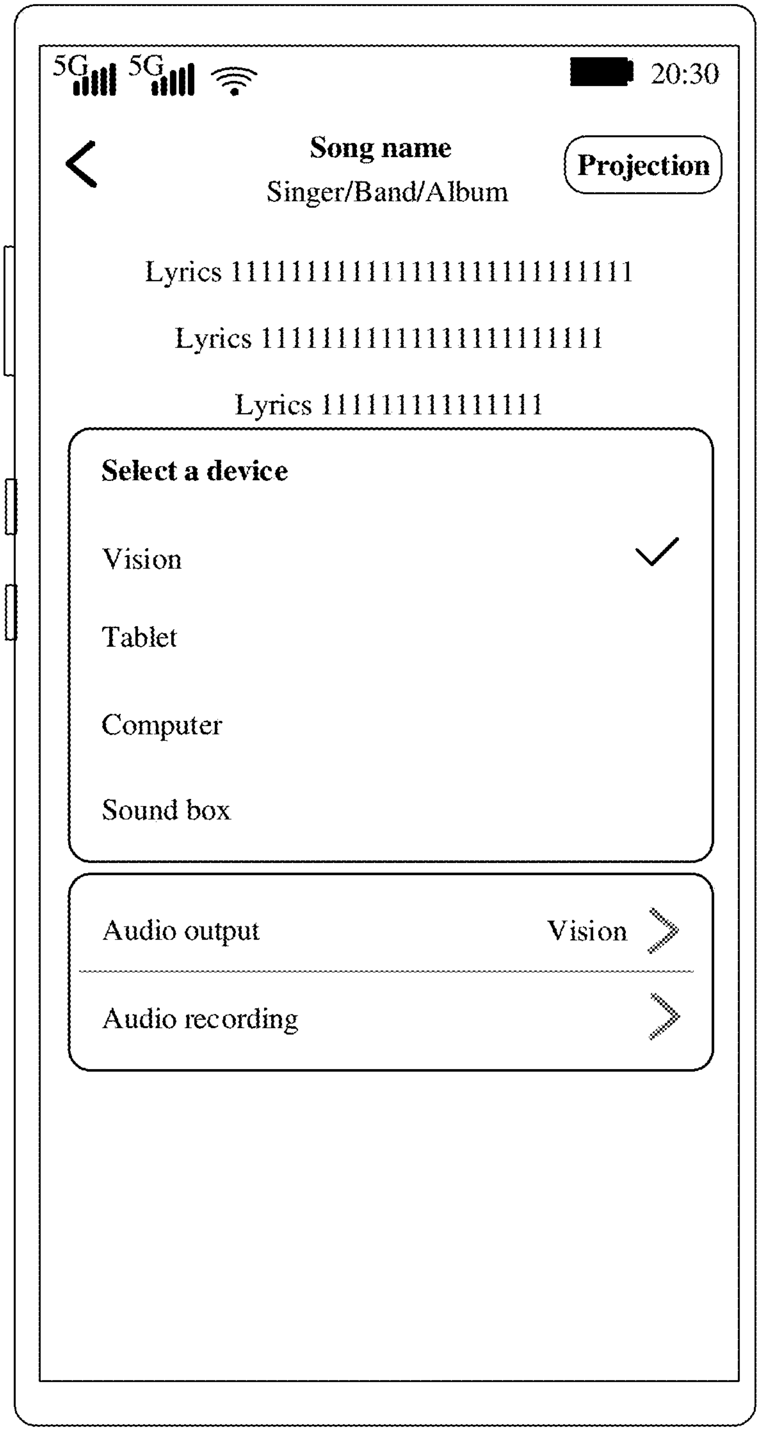
Figure 33A:
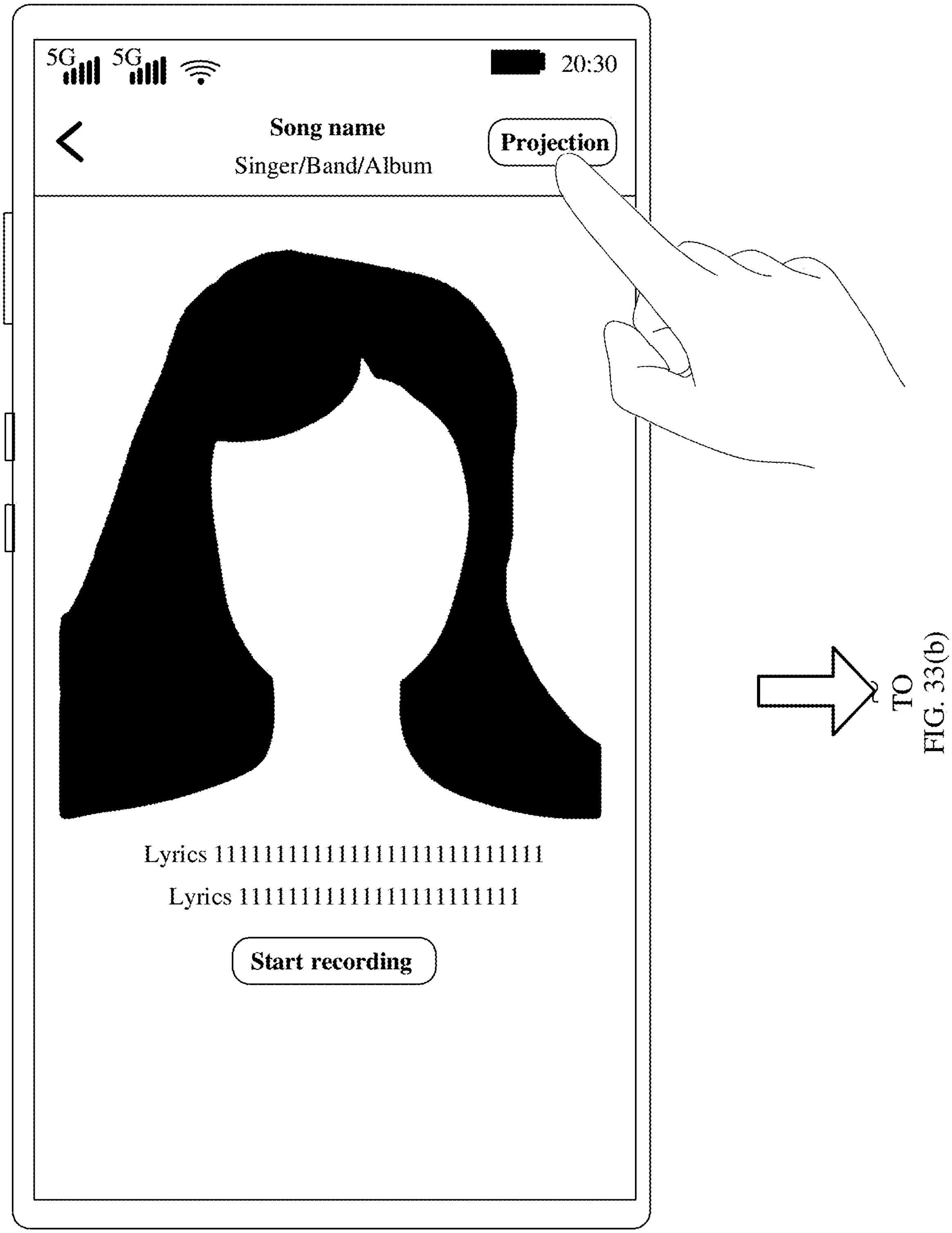
Figure 33B:
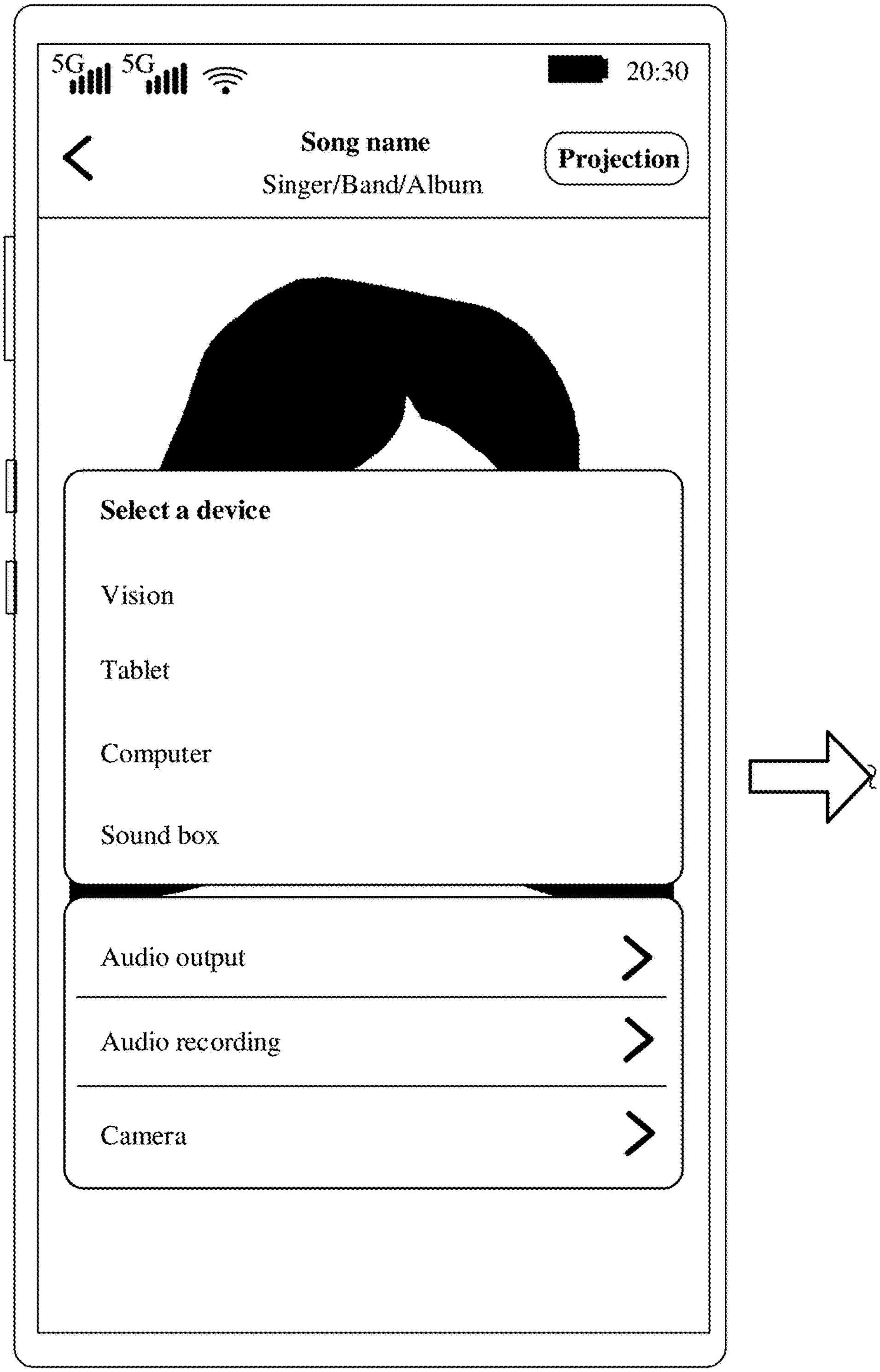
Figure 33C:
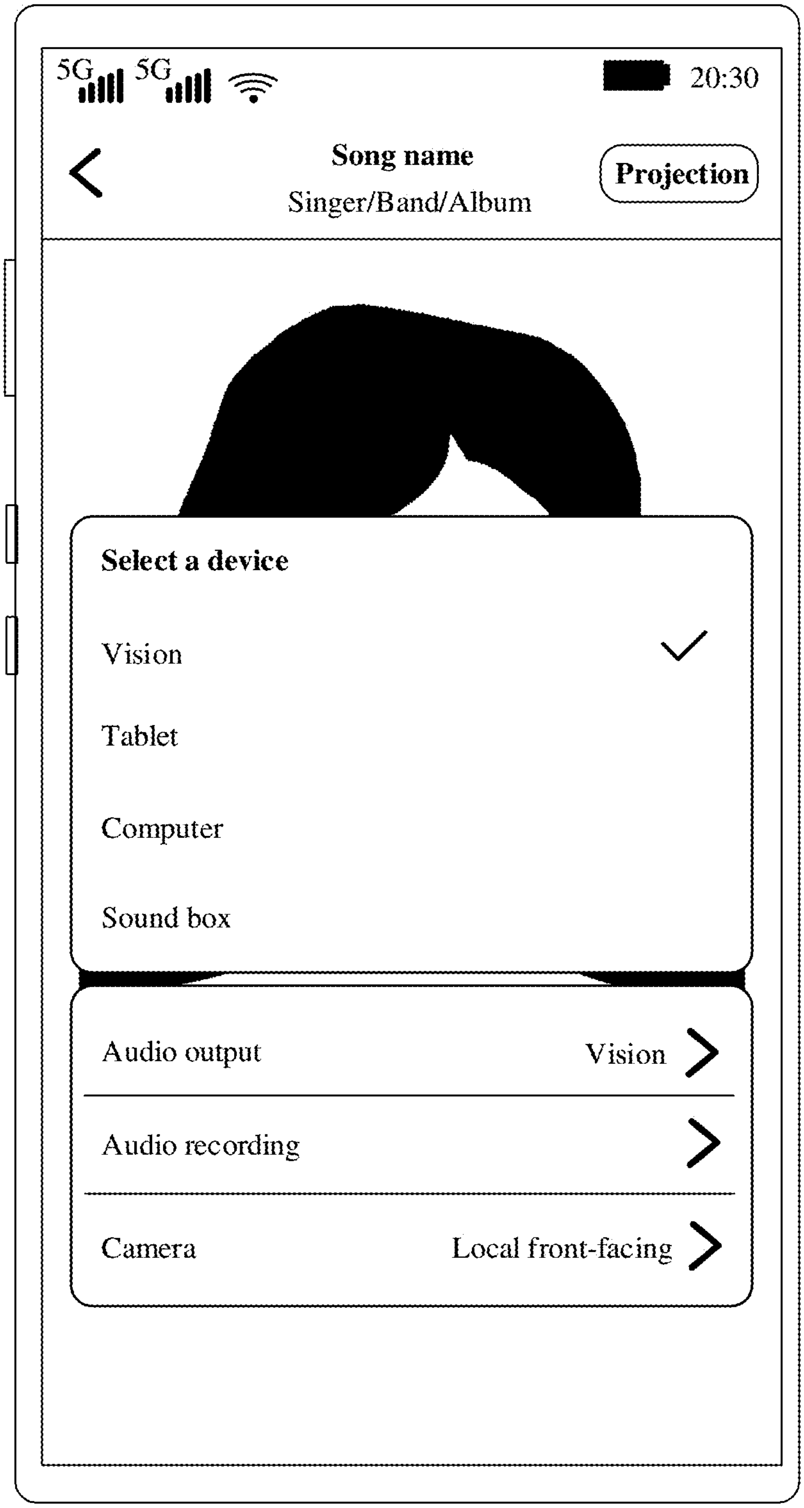
Figure 33D:
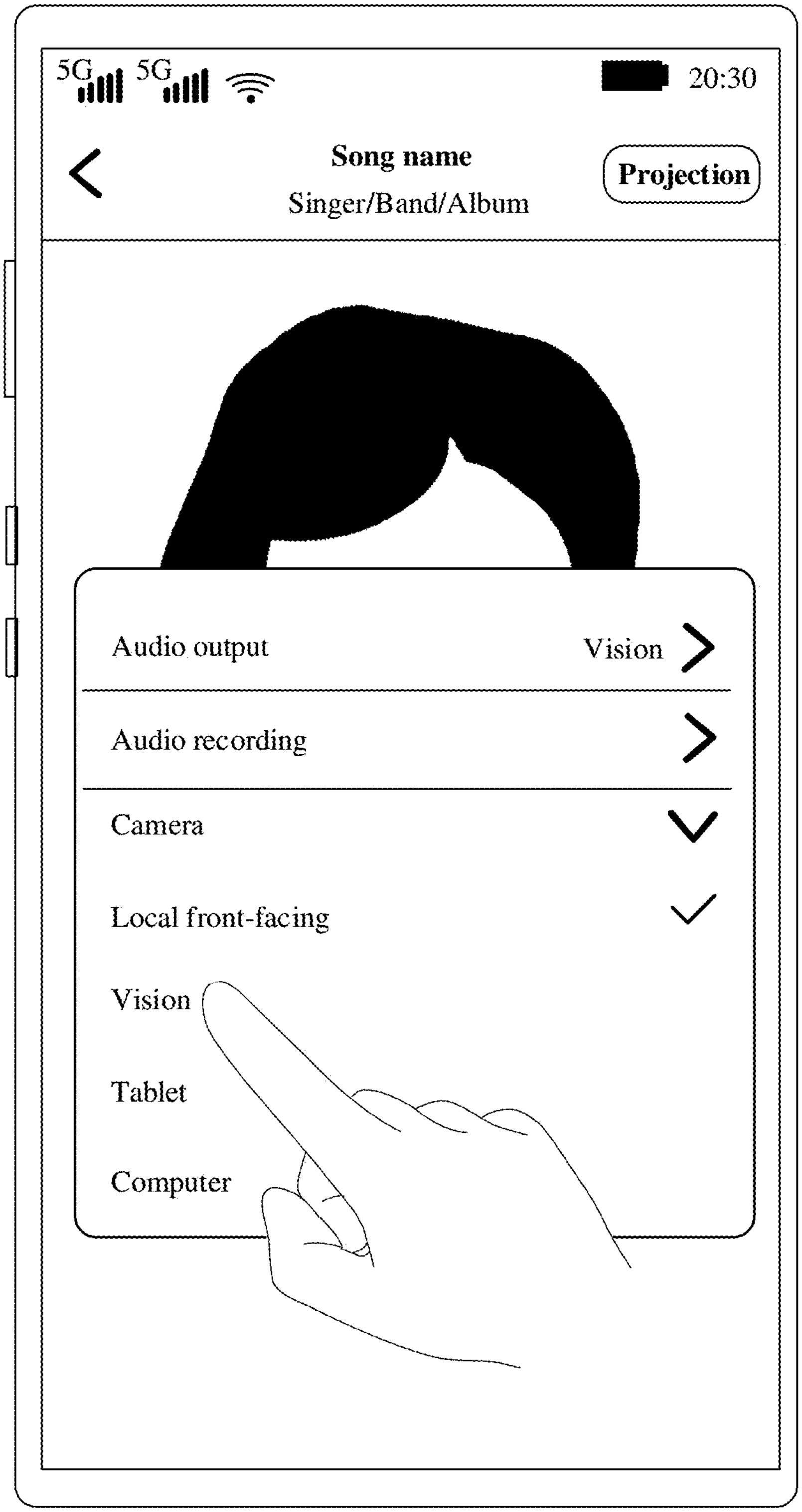
Figure 33E:
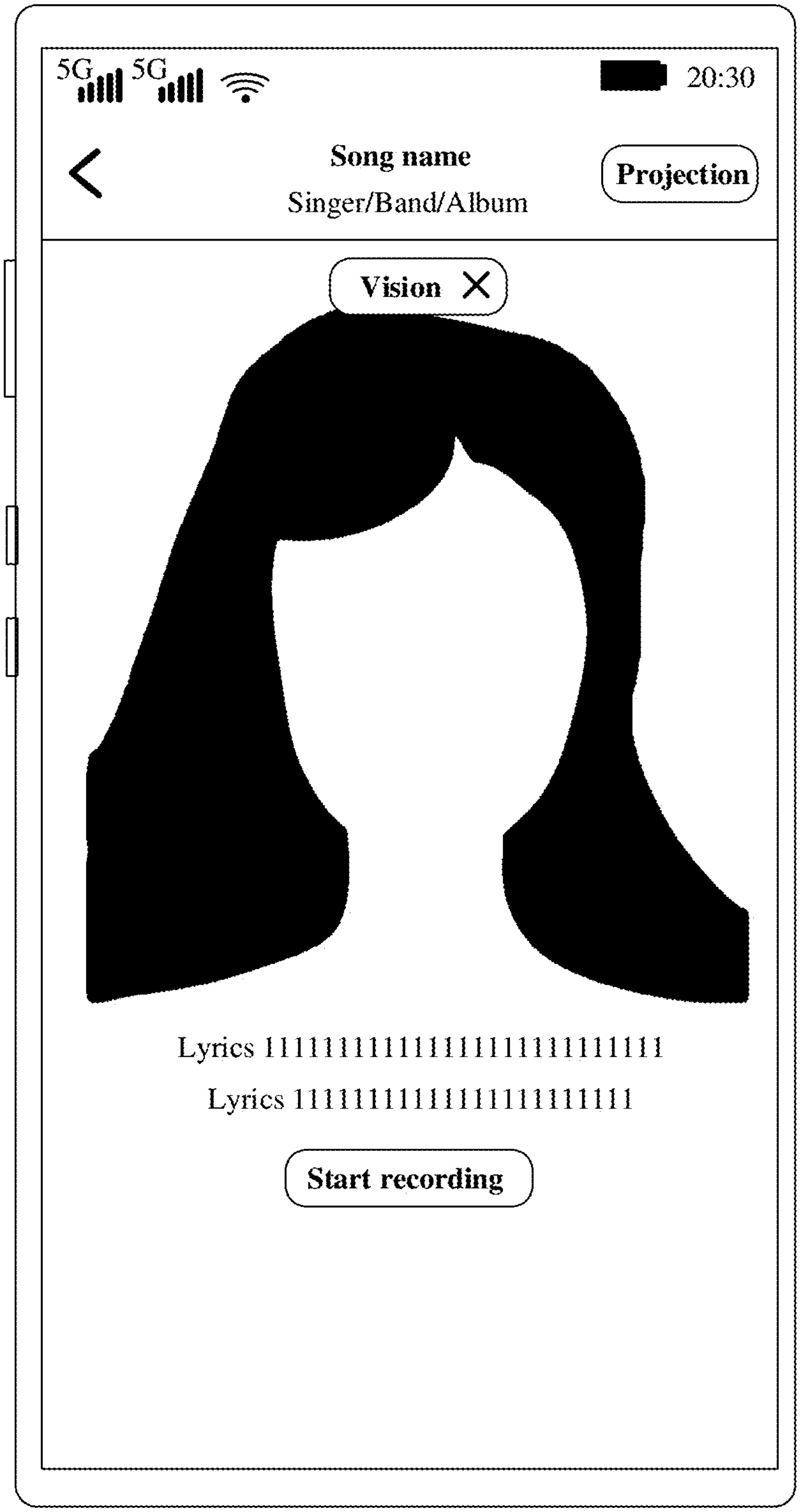

As shown in FIG. 32(*a*), an application currently running in the foreground of the control device is a “Karaoke” application, and a currently executed task is audio recording. The user taps a “projection” button on the touch display to trigger a software/hardware switching interface display instruction, and the control device displays a software/hardware switching interface on the triggered display. As shown in FIG. 32(*b*), the control device displays a name of a detected nearby device in a nearby device area of the software/hardware switching interface. In addition, the hardware switching entry displayed in the software/hardware switching interface is determined based on the currently executed task. For example, if the determined hardware switching entries are “audio output” and “audio recording”, names of “audio output” and “audio recording” are displayed in the software/hardware switching entry area of the software/hardware switching interface shown in FIG. 32(*b*). As shown in FIG. 32(*c*), after the user selects a Vision device from a device list, the Vision device is selected for audio output by default, and the user may manually modify the selection.

As shown in FIG. 33(*a*), an application currently running in the foreground of the control device is a “Karaoke” application, and a currently executed task is singing video recording. The user taps a “projection” button on the touch display to trigger a software/hardware switching interface display instruction, and the control device displays a software/hardware switching interface on the triggered display. As shown in FIG. 33(*b*), the control device displays a name of a detected nearby device in a nearby device area of the software/hardware switching interface. In addition, the hardware switching entry displayed in the software/hardware switching interface is determined based on the currently executed task. For example, if the determined hardware switching entries may be “audio output”, “audio recording”, and “camera”, the hardware switching entries “audio output”, “audio recording”, and “camera” are displayed in the software/hardware switching entry area of the software/hardware switching interface shown in FIG. 33(*b*). As shown in FIG. 33(*c*), after the user selects a Vision device from a device list, the Vision device is selected for audio output by default, and a local front-facing camera of the control device is selected as the camera by default. The user may manually change nearby devices used by the audio output and the camera, for example, as shown in FIG. 33(*d*). The user selects the Vision device from a nearby device list corresponding to the camera displayed on the touch display, and triggers a target switching instruction. The control device switches a currently used camera to a camera of the Vision device, and sends, to the Vision device, request information used to borrow the camera of the Vision device. The control device switches the currently used camera to the camera of the Vision device. After the user completes hardware switching settings, a display instruction for returning to a task interface of the currently executed task of the control device is triggered. The control device displays the task interface on the display, and displays, on the task interface, a device that is currently projected by the control device. As shown in FIG. 33(*e*), when the control device is currently projected to the Vision device, a Vision name is displayed in the task interface. The user may tap a close button behind the Vision name to disconnect the control device from the Vision device.

Figure 34:
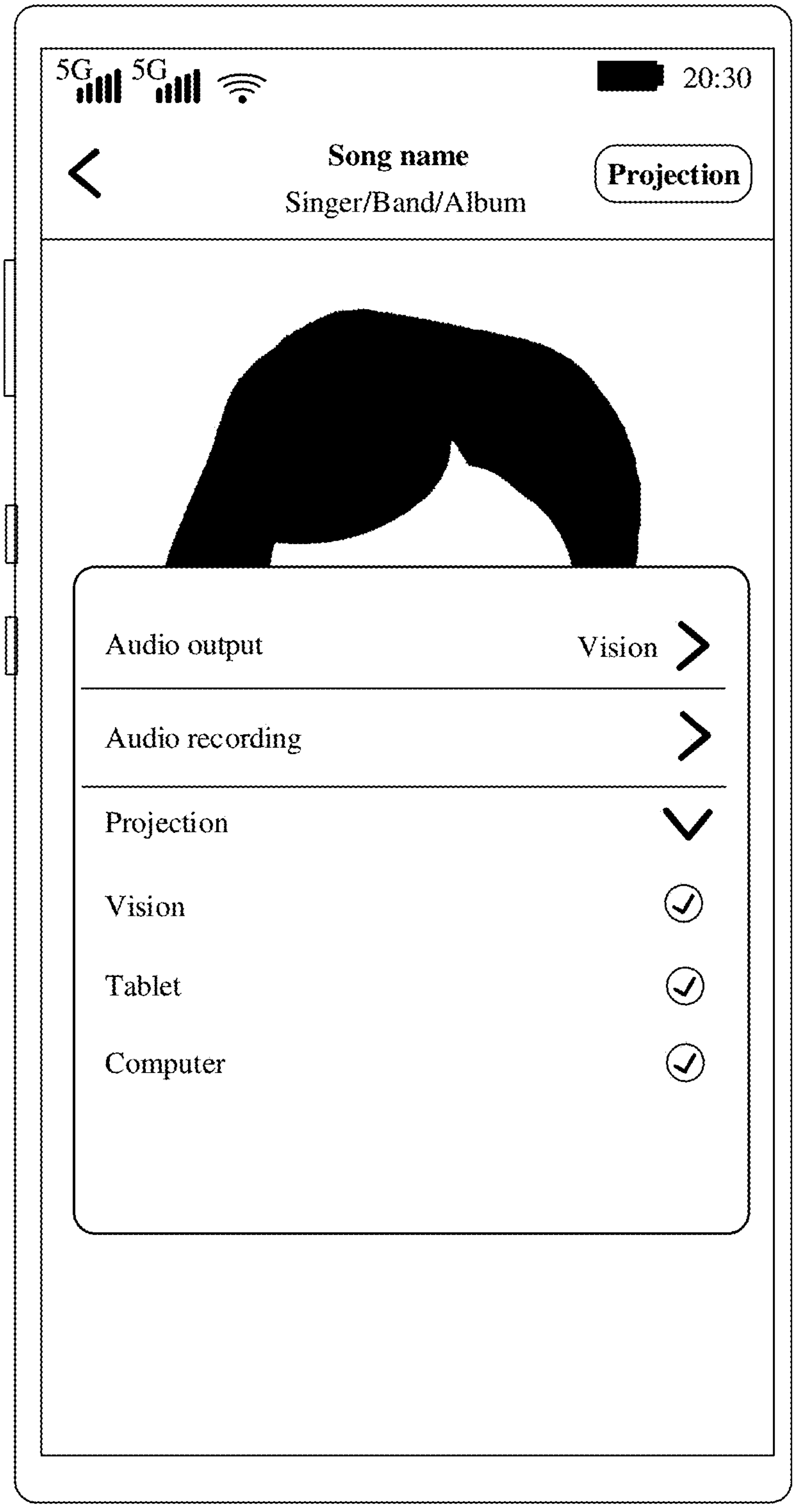
Figure 35:
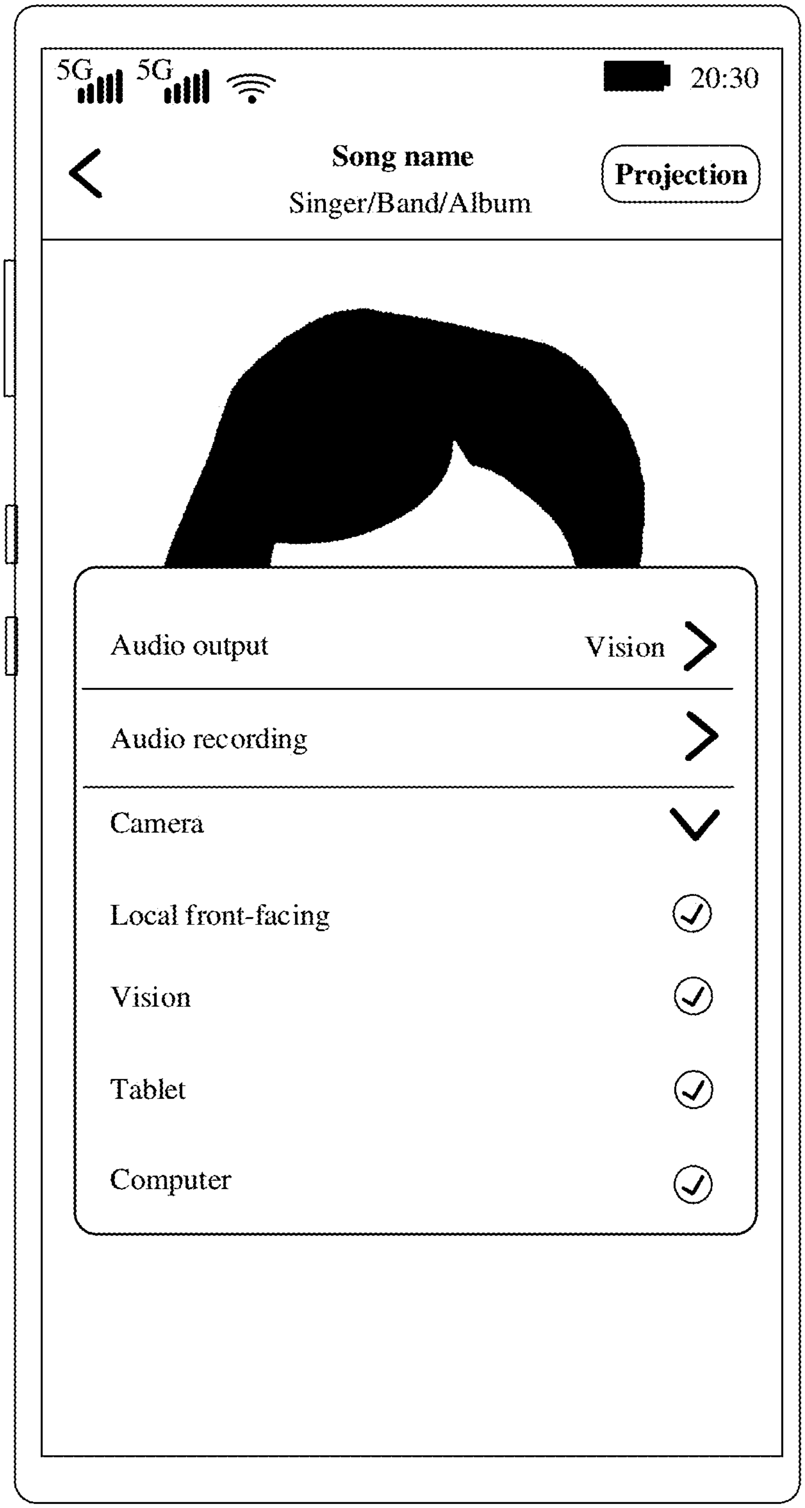
Figure 36A:
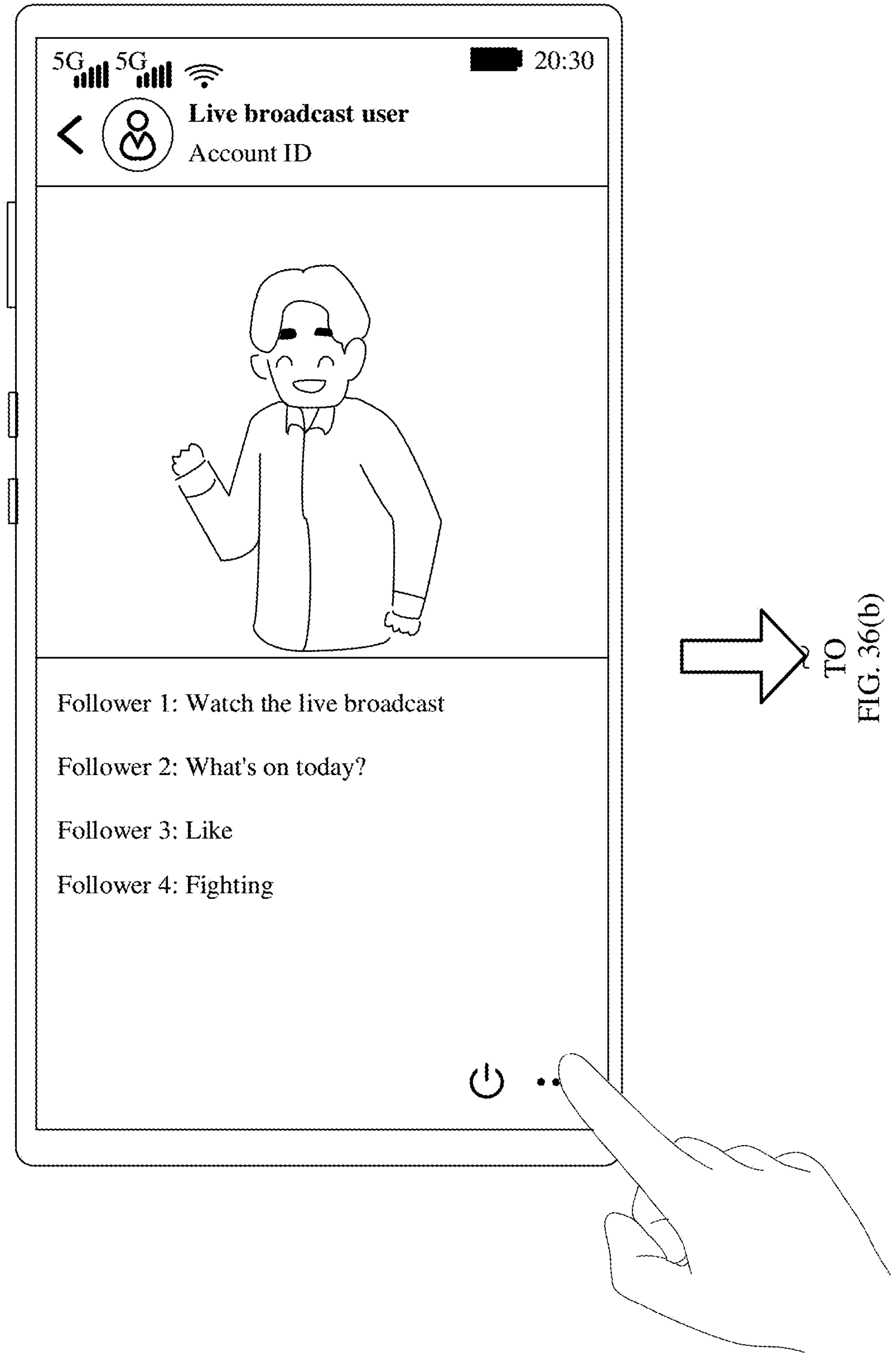
Figure 36B:
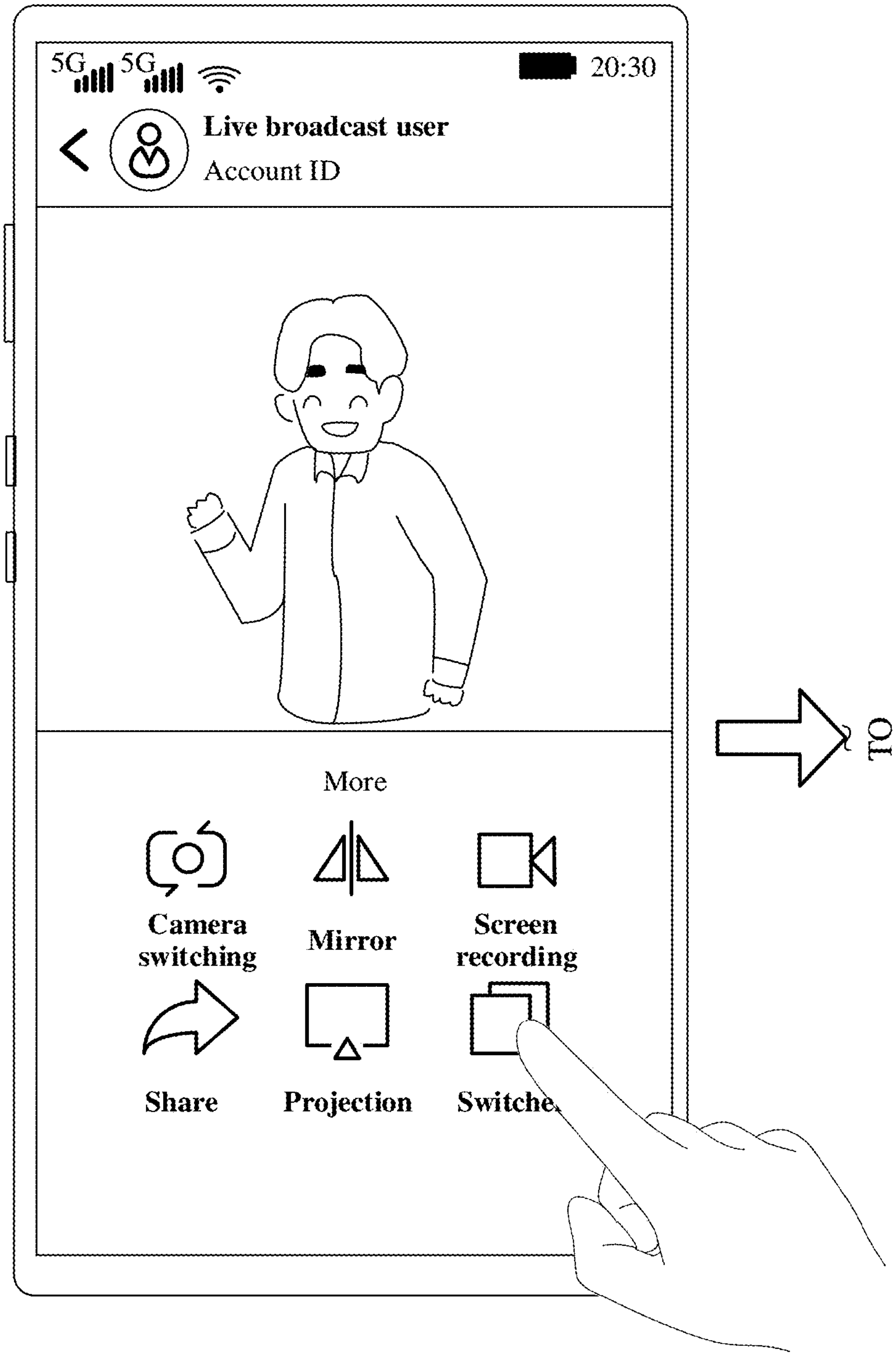
Figure 36C:
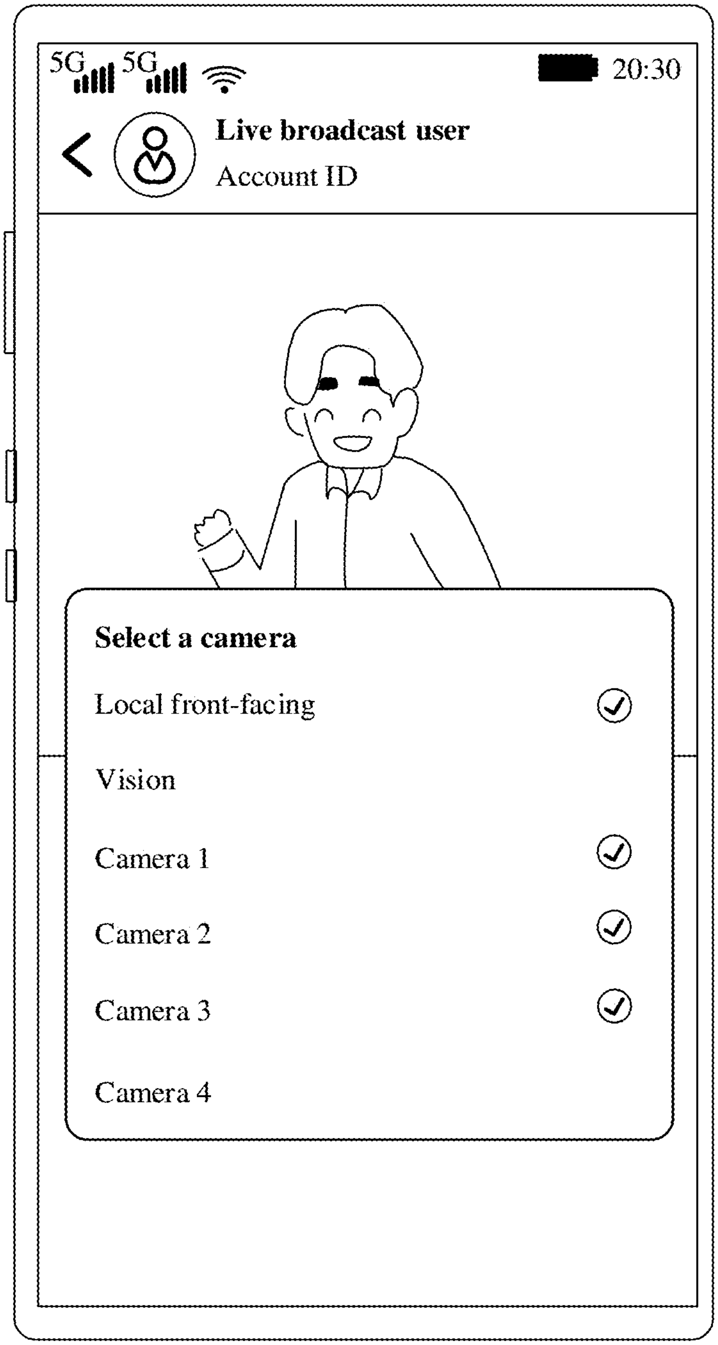
Figure 36D:
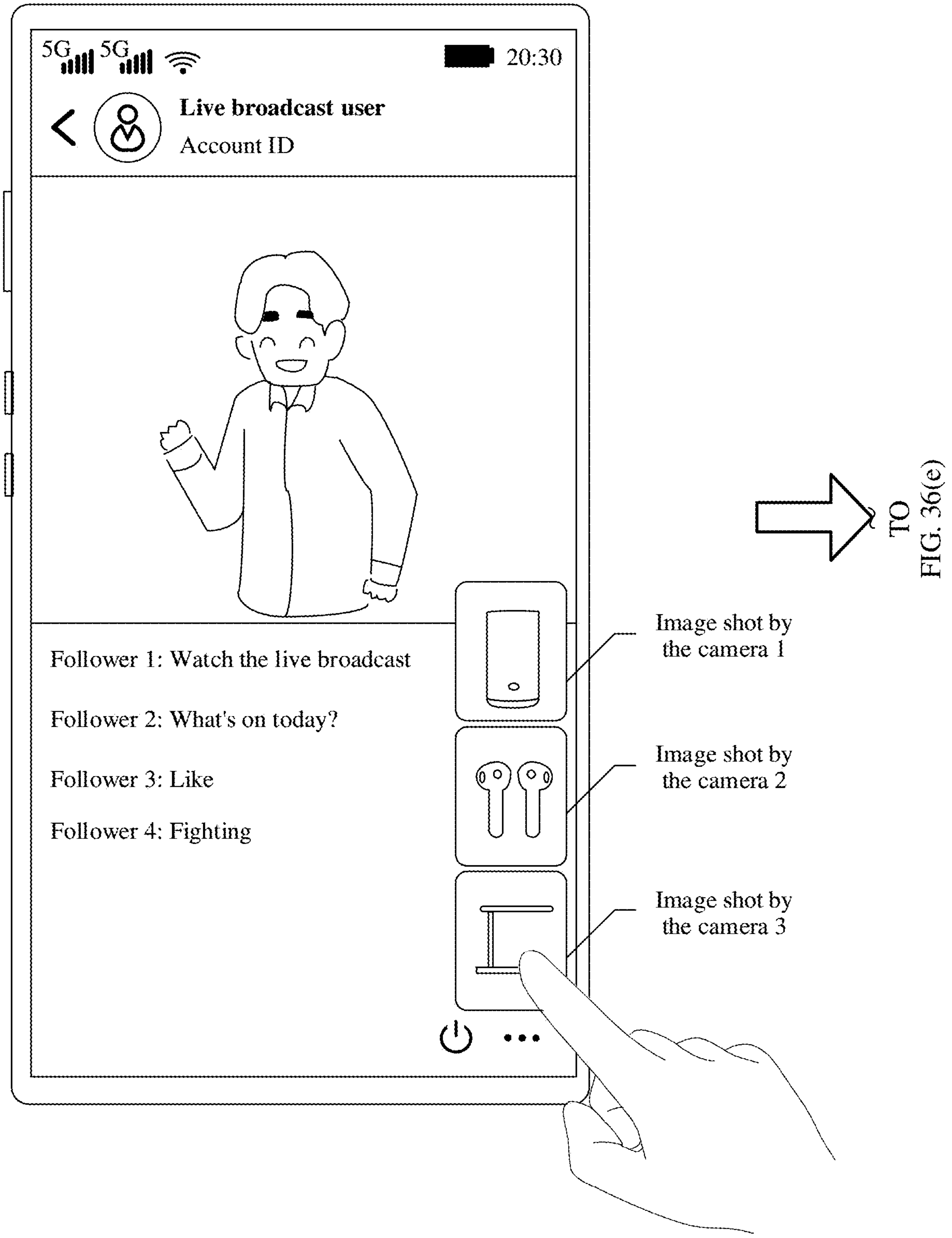
Figure 36E:
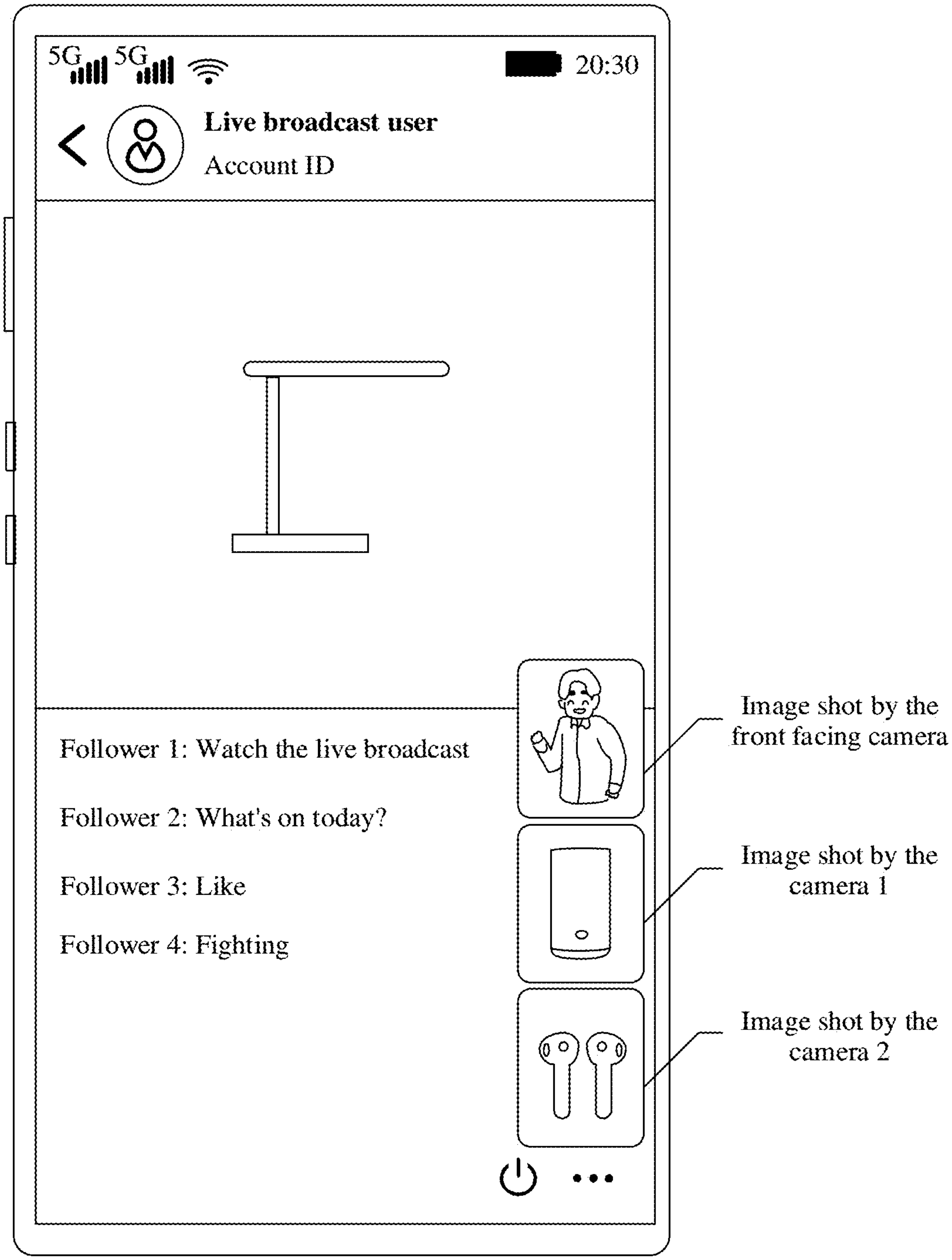

It should be noted that, in this embodiment of this application, the hardware switching entry may select a plurality of nearby devices as input or output devices of the control device. As shown in FIG. 34, a plurality of nearby devices are selected as projection devices of the control device, so that content displayed by the control device can be simultaneously projected to the plurality of nearby devices, thereby improving user viewing experience. Alternatively, as shown in FIG. 35, cameras of a plurality of nearby devices are selected as input of the control device, so that a video can be recorded from a plurality of angles in a same space. The control device synthesizes multi-angle videos to obtain a full-view virtual reality (Virtual Reality, VR) video, thereby improving playability and practicability of the control device.

For example, in a live broadcast scenario, a plurality of cameras are required to perform photographing, so as to form a switcher. As shown in FIG. 36(*a*), a live broadcast user may tap a “more” button on a touch display of a current control device, to trigger display of a “more” interface shown in FIG. 36(*b*), and the user taps a “switcher” button in the “more” interface, to trigger display of a software/hardware switching interface for selecting a camera shown in FIG. 36(*c*). The user may select a plurality of cameras in a device list at the same time. The control device uses videos shot by the plurality of cameras selected by the user as video input of the control device, as shown in FIG. 36(*d*), and displays, on a display interface of the control device in a form of a plurality of small windows, content shot by the plurality of device cameras. The user taps a small window displayed on the touch display, and the control device displays content in the small window corresponding to the tap operation of the user on the touch display in full screen, and zooms out content that is displayed in full screen by default to the small window for display. For example, as shown in FIG. 36(*e*), after the user taps a small window corresponding to an image shot by a camera 3, and displays the image shot by the camera 3 in full screen, the control device zooms out, by default, the image that is shot by a front-facing camera and that is displayed in full screen to the small window for display.

Manner 3: The control device determines, based on hardware capability information of a nearby device that has currently established a connection, at least one hardware switching entry displayed in the software/hardware switching interface.

Figure 37A:
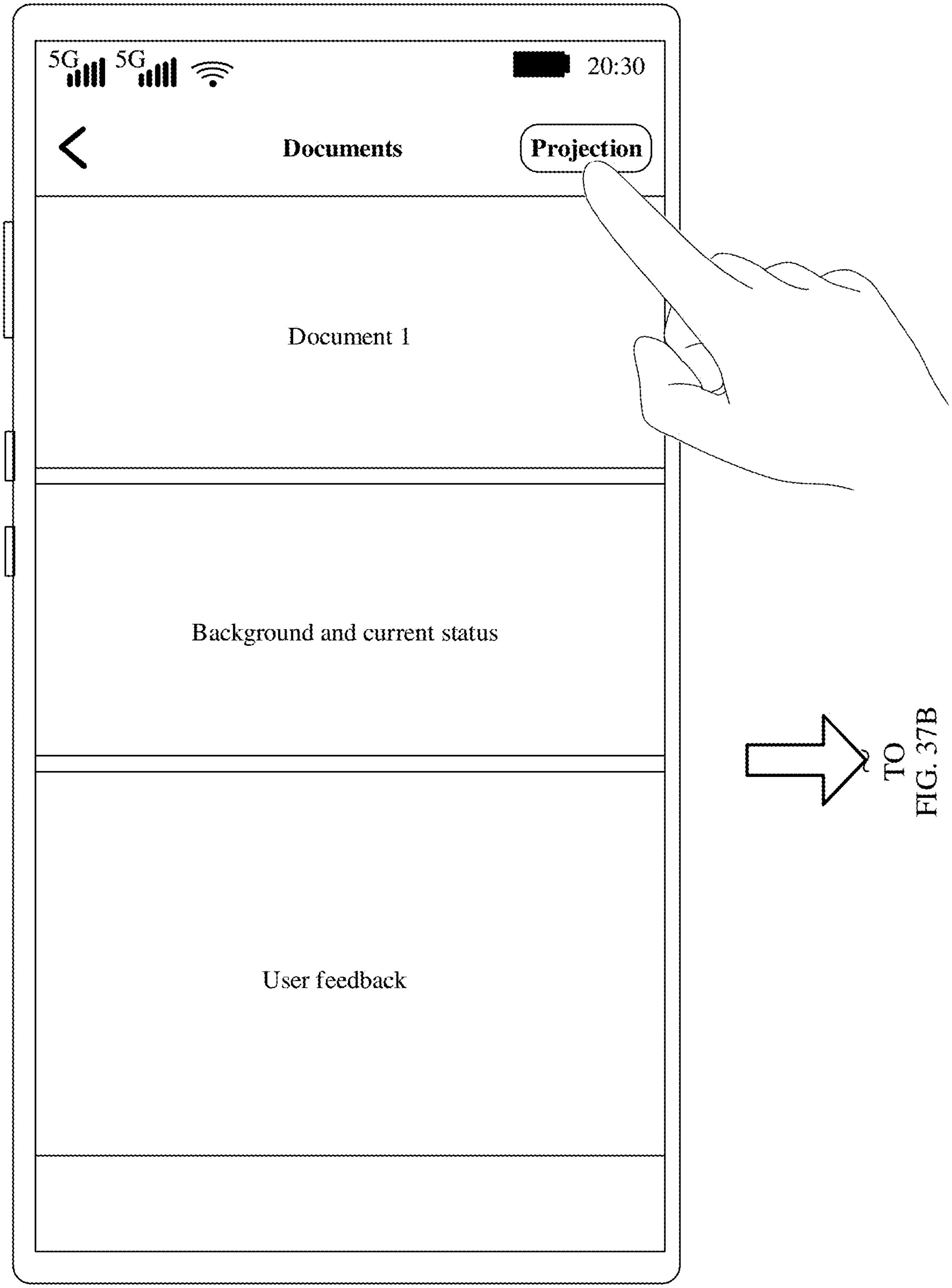
Figure 37B:
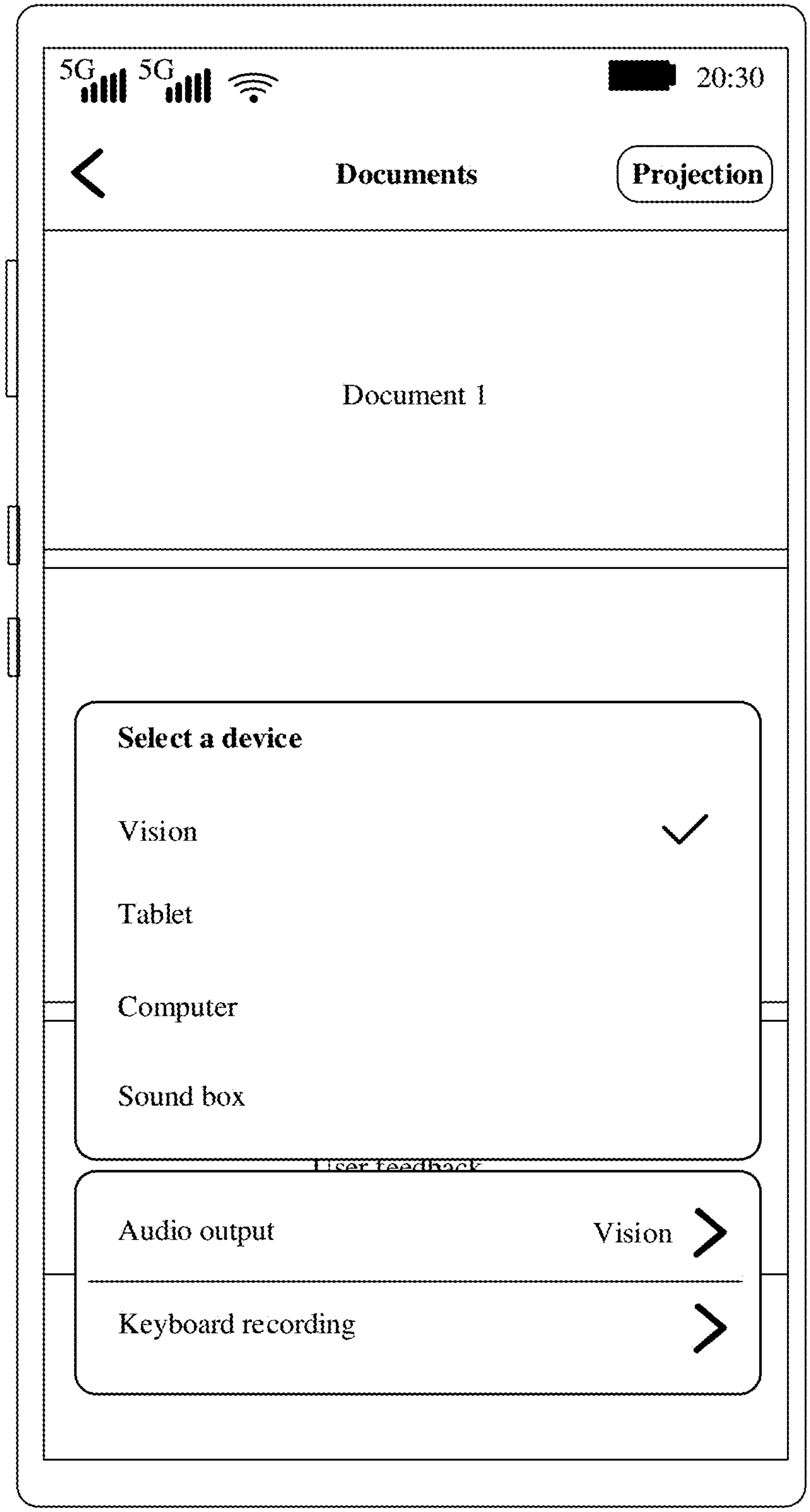

As shown in FIG. 37A and FIG. 37B, an application currently running in the foreground of the control device is a document application. The user triggers a software/hardware switching interface display instruction by using a “projection” button in the application. If the user has selected to project display content of the control device to a Vision device before triggering display of a software/hardware switching interface, the software/hardware switching interface is triggered to be displayed, as shown in a right figure in FIG. 37A and FIG. 37B. The Vision device displays a selected icon, and a hardware switching entry “audio output” displays that the Vision device is selected. The user can select a device other than the Vision device, to change the nearby device for projection, and the user can alternatively manually switch the nearby device for the hardware switching entry.

The following describes, with reference to the accompanying drawings, an example of determining, in different manners, a software switching entry displayed in a software/hardware switching interface in this embodiment of this application. During specific implementation, the control device may determine, in at least one of the following manners, at least one software switching entry displayed in the software/hardware switching interface.

Manner 1: The control device determines, based on software capability information of the nearby device, at least one software switching entry displayed in the software/hardware switching interface.

A manner of determining, by the control device based on the detected software capability information of the nearby device, a software switching entry displayed in the software/hardware switching interface in this embodiment of this application is described by using Embodiment 16 to Embodiment 19.

Figure 38:
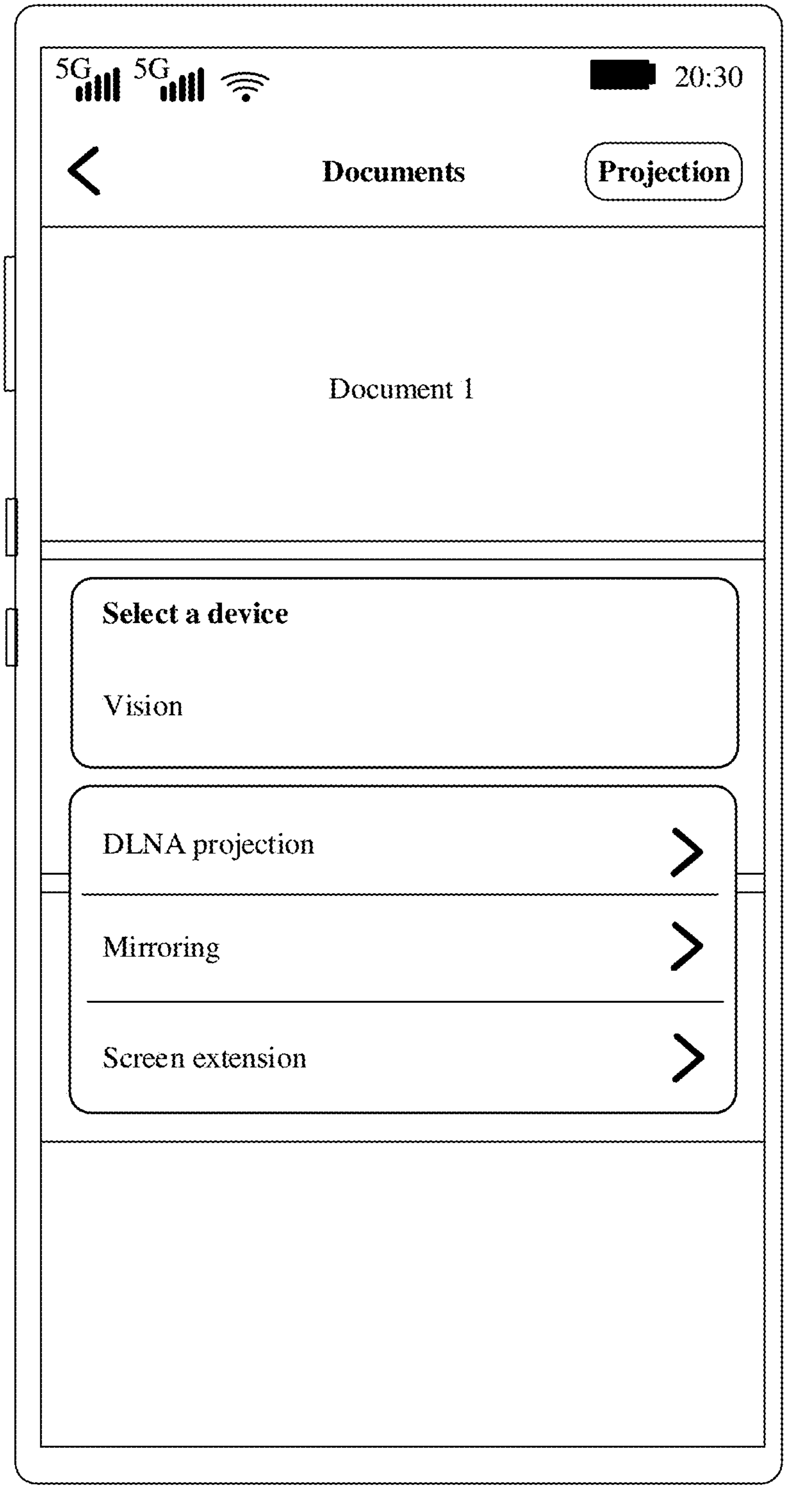
FIG. 38 to FIG. 45B are schematic diagrams of displaying at least one software switching entry in a software/hardware switching interface according to an embodiment of this application.

Embodiment 16: The control device detects that the nearby device has a Vision device, and determines that software capability information of the Vision device is supporting software functions such as DLNA projection, mirroring, and screen extension. As shown in FIG. 38, the control device displays a name of the Vision device in the nearby device area of the software/hardware switching interface, and displays software switching entries "DLNA projection", "mirroring", and "screen extension" in the software/hardware switching entry area.

Figure 39:
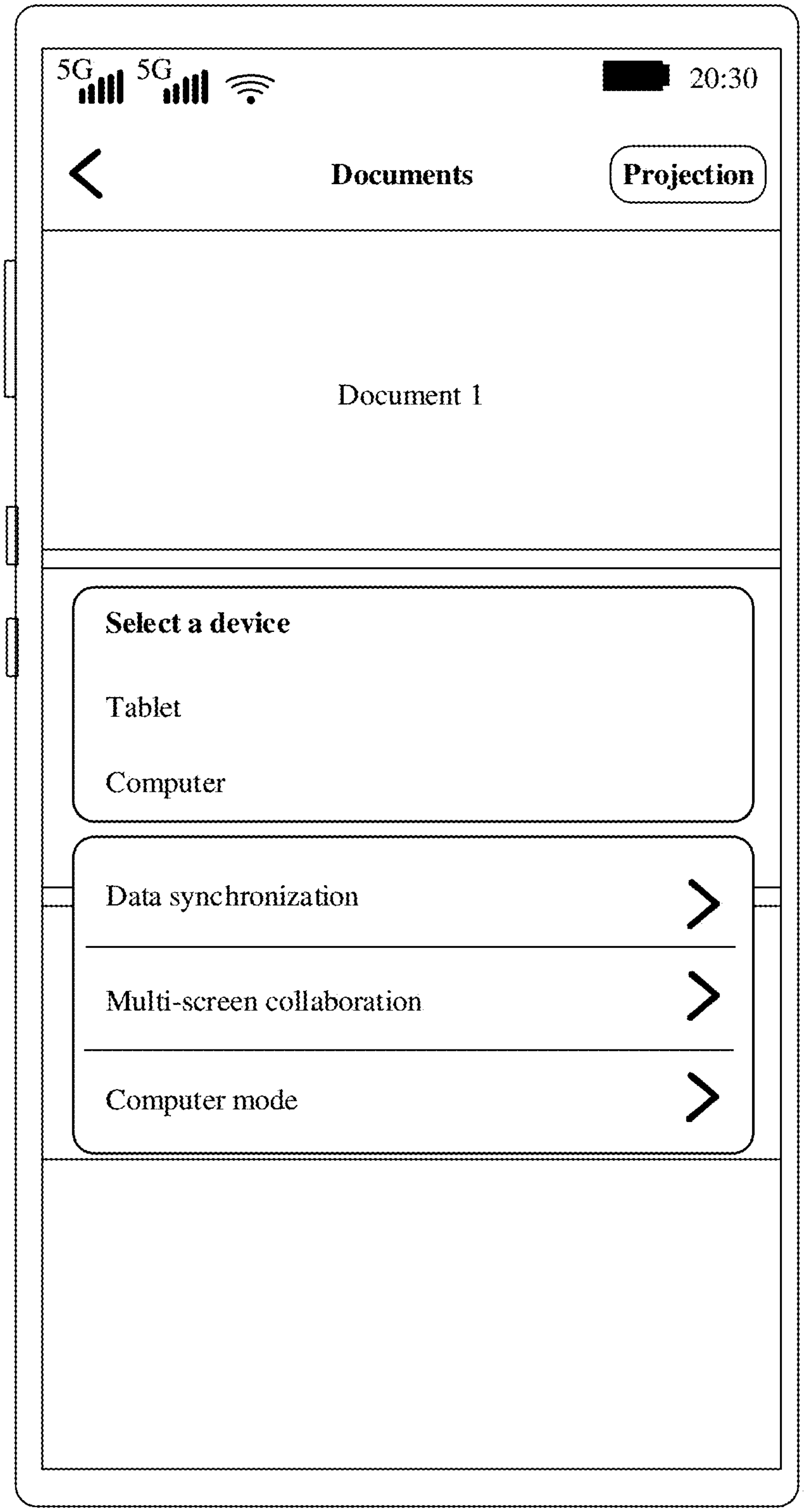

Embodiment 17: The control device detects that the nearby device includes a tablet and a computer, and determines that software capability information of the tablet and the computer is supporting a software function such as task connection or input borrowing. As shown in FIG. 39, the control device displays names of the tablet and the computer in the nearby device area of the software/hardware switching interface, and displays software switching entries "data synchronization", "multi-screen collaboration", and "computer mode" in the software/hardware switching entry area.

Figure 40:
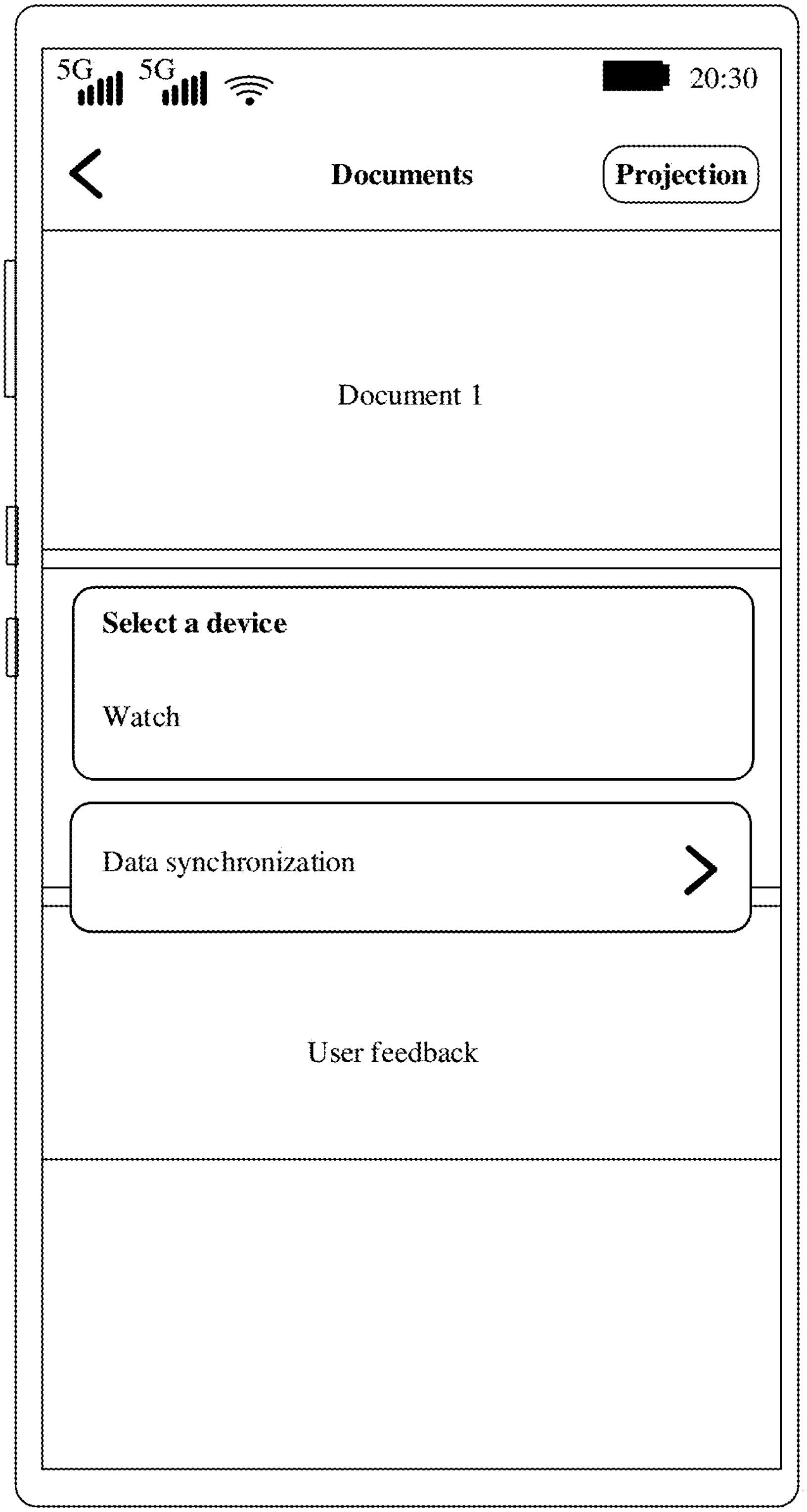

Embodiment 18: The control device detects that the nearby device includes a watch, and determines that software capability information of the watch is supporting a software function such as task connection. As shown in FIG. 40, the control device displays a name of the watch in the nearby device area of the software/hardware switching interface, and displays a software switching entry "data synchronization" in the software/hardware switching entry area of the software/hardware switching interface.

Figure 41:
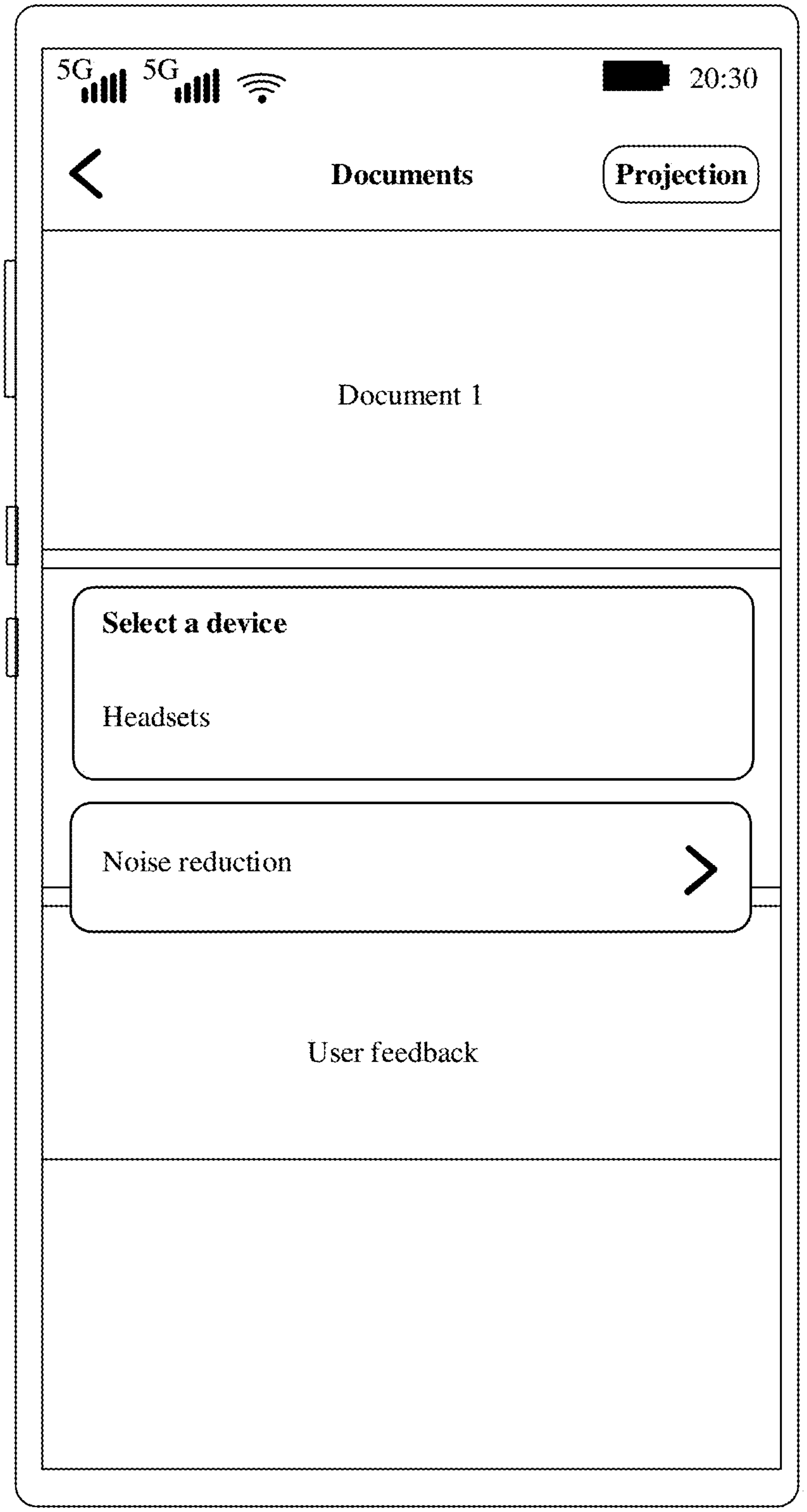

Embodiment 19: The control device detects that the nearby device includes a headset, and determines that software capability information of the headset is that the headset has a noise reduction function. As shown in FIG. 41, the control device displays a name of the headset in the nearby device area of the software/hardware switching interface, and displays a software switching entry "noise reduction" in the software/hardware switching entry area of the software/hardware switching interface.

Manner 2: The control device determines, based on a software function requirement corresponding to a currently executed task, at least one software switching entry displayed in the software/hardware switching interface.

A manner of determining, by the control device based on a software function requirement of a currently executed task, a software switching entry displayed in the software/hardware switching interface in this embodiment of this application is described by using Embodiment 20 to Embodiment 22.

Figure 42A:
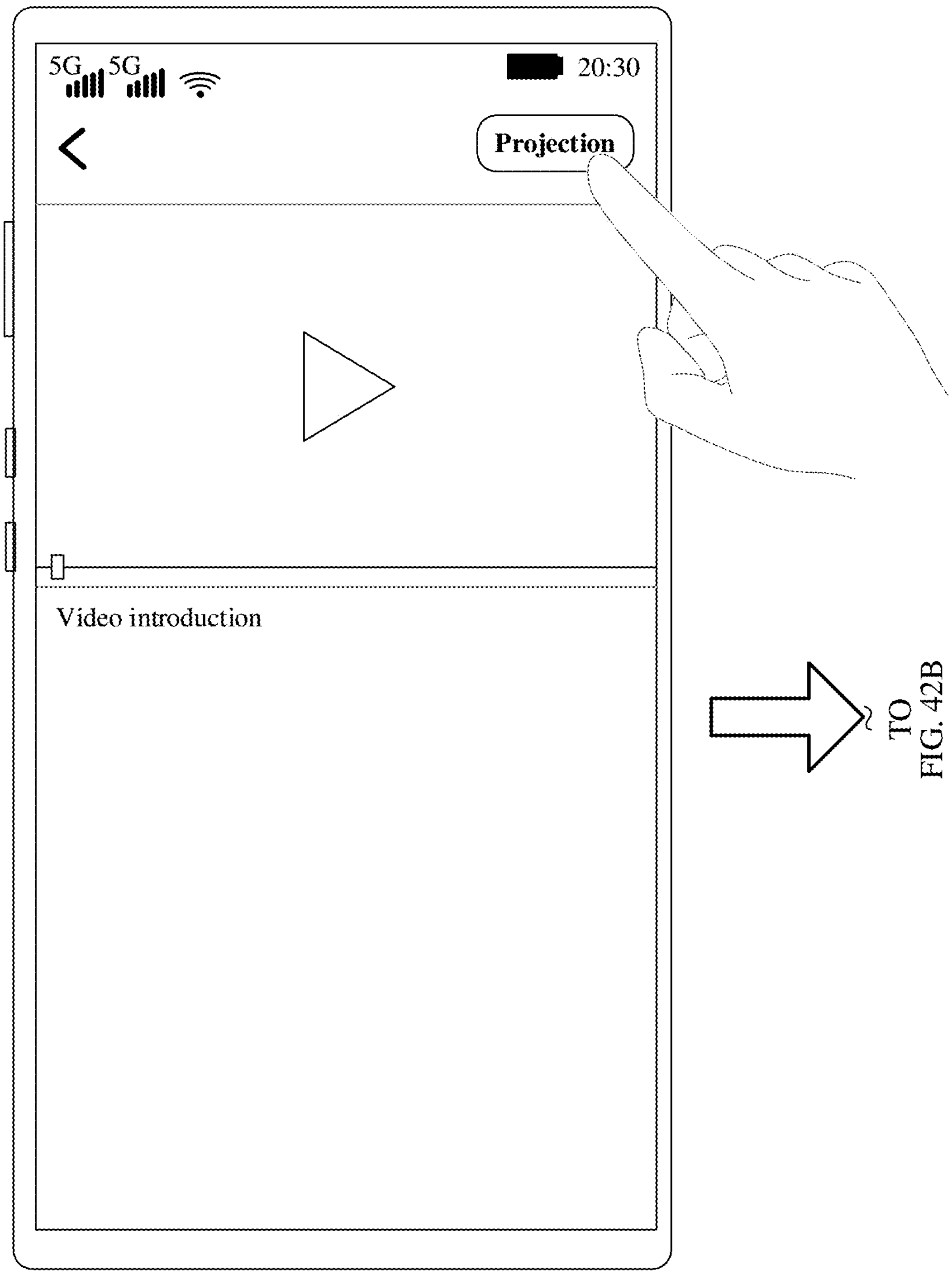
Figure 42B:
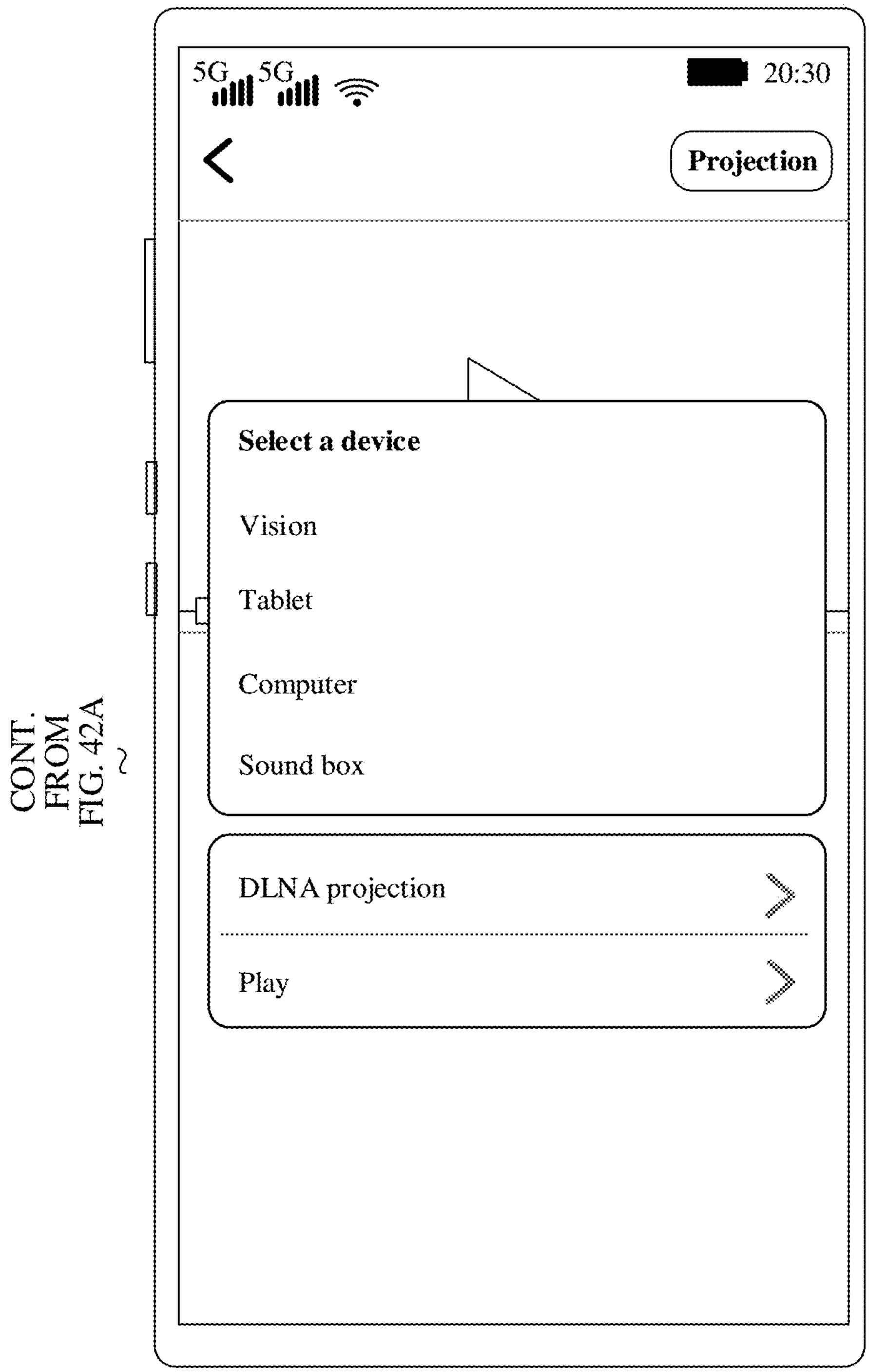

Embodiment 20: As shown in FIG. 42A and FIG. 42B, the currently executed task of the control device is video playback, the user triggers a software/hardware switching interface display instruction on a touch display, the control device determines that software switching entries required by the currently executed video playback task are "DLNA projection" and "play", and the control device displays the software switching entries "DLNA projection" and "play" in the software/hardware switching entry area of the software/hardware switching interface.

Figure 43A:
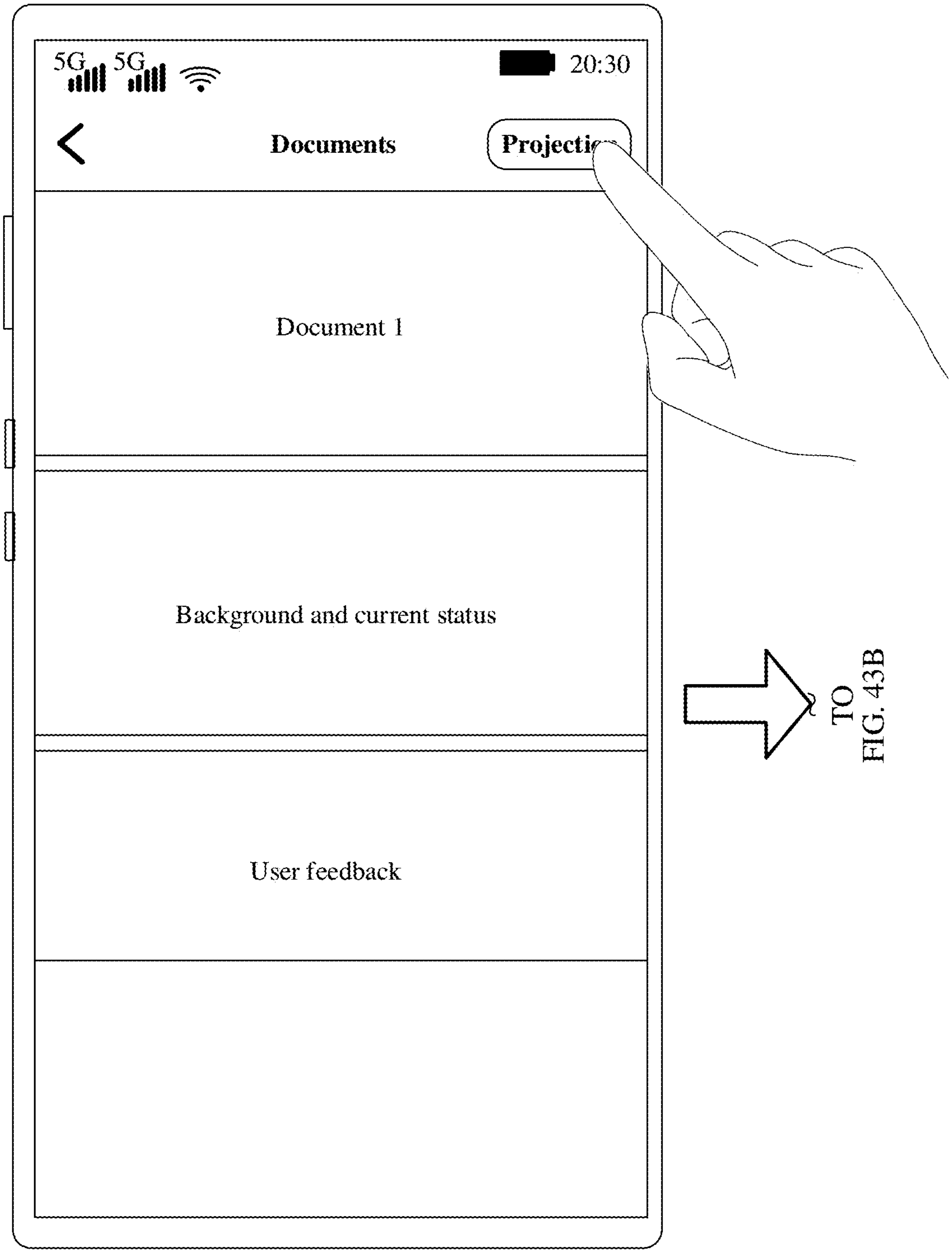
Figure 43B:
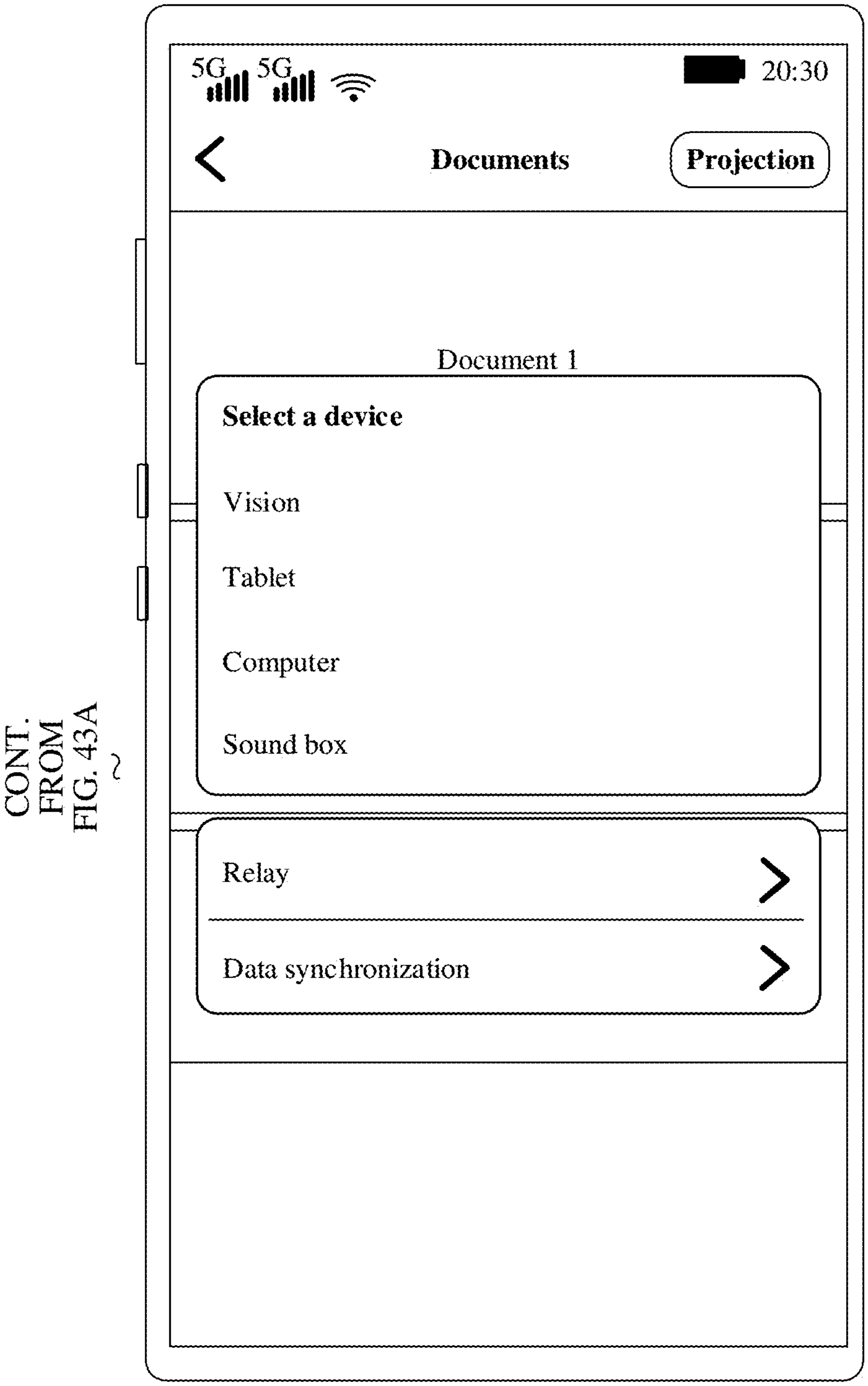

Embodiment 21: As shown in FIG. 43A and FIG. 43B, the currently executed task of the control device is document editing, the user triggers a software/hardware switching interface display instruction on a touch display, the control device determines that software switching entries required by the currently executed document editing task are "relay" and "data synchronization", and the control device displays the software switching entries "relay" and "data synchronization" in the software/hardware switching entry area of the software/hardware switching interface.

Figure 44A:
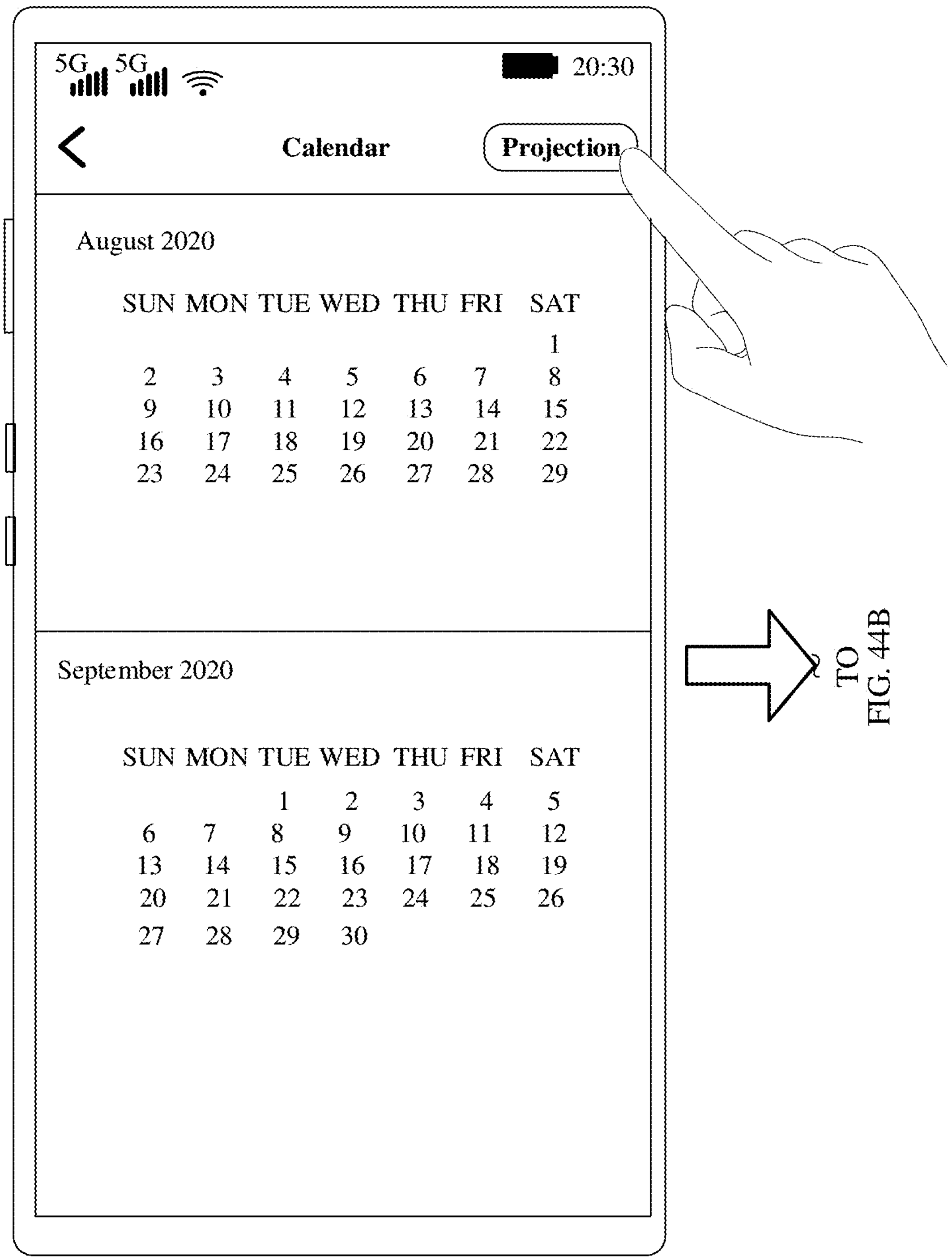
Figure 44B:
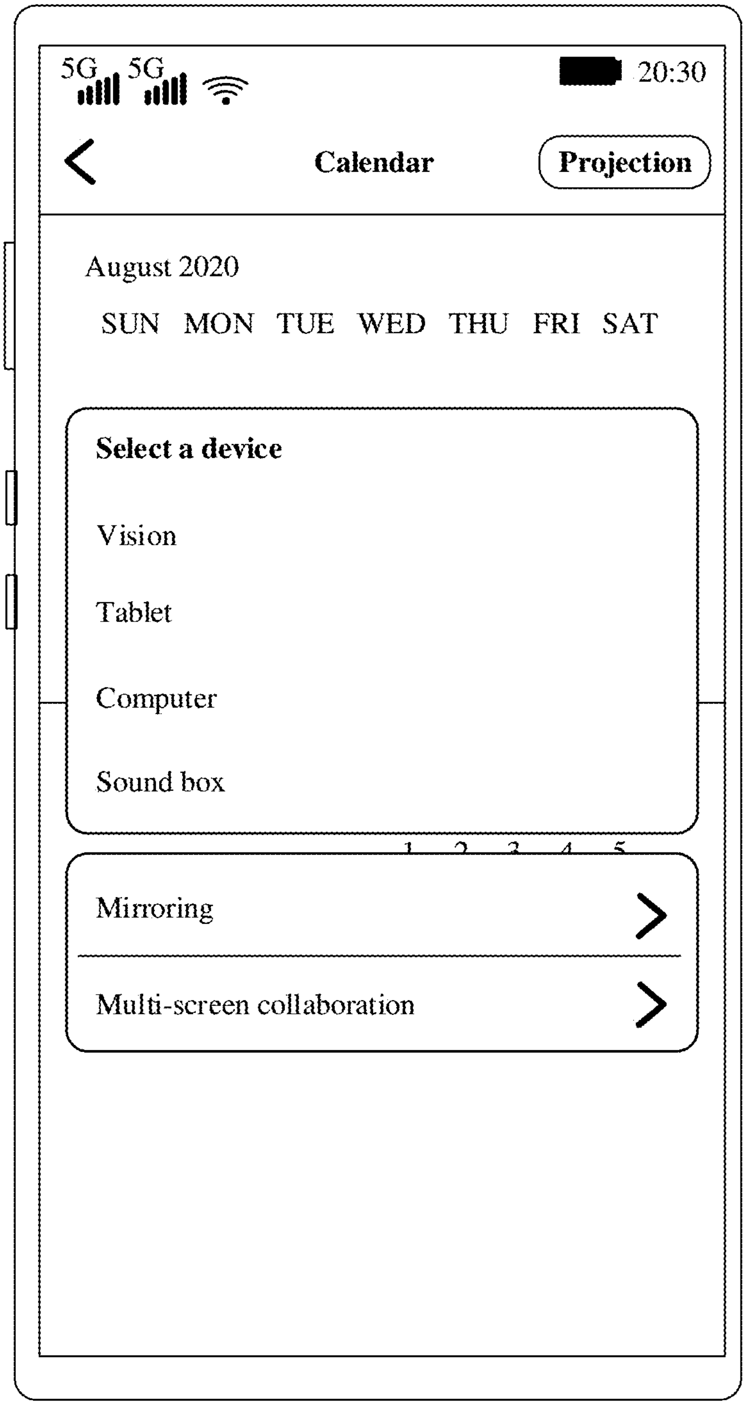

Embodiment 22: As shown in FIG. 44A and FIG. 44B, the currently executed task of the control device is calendar displaying, the user triggers a software/hardware switching interface display instruction on a touch display, the control device determines that software switching entries required by the currently executed calendar displaying task is "mirroring" and "multi-screen collaboration", and the control device displays the software switching entries "mirroring" and "multi-screen collaboration" in the software/hardware switching entry area of the software/hardware switching interface.

Manner 3: The control device determines, based on software capability information of a nearby device that has currently established a connection, at least one software switching entry displayed in the multi-device control center interface.

Figure 45A:
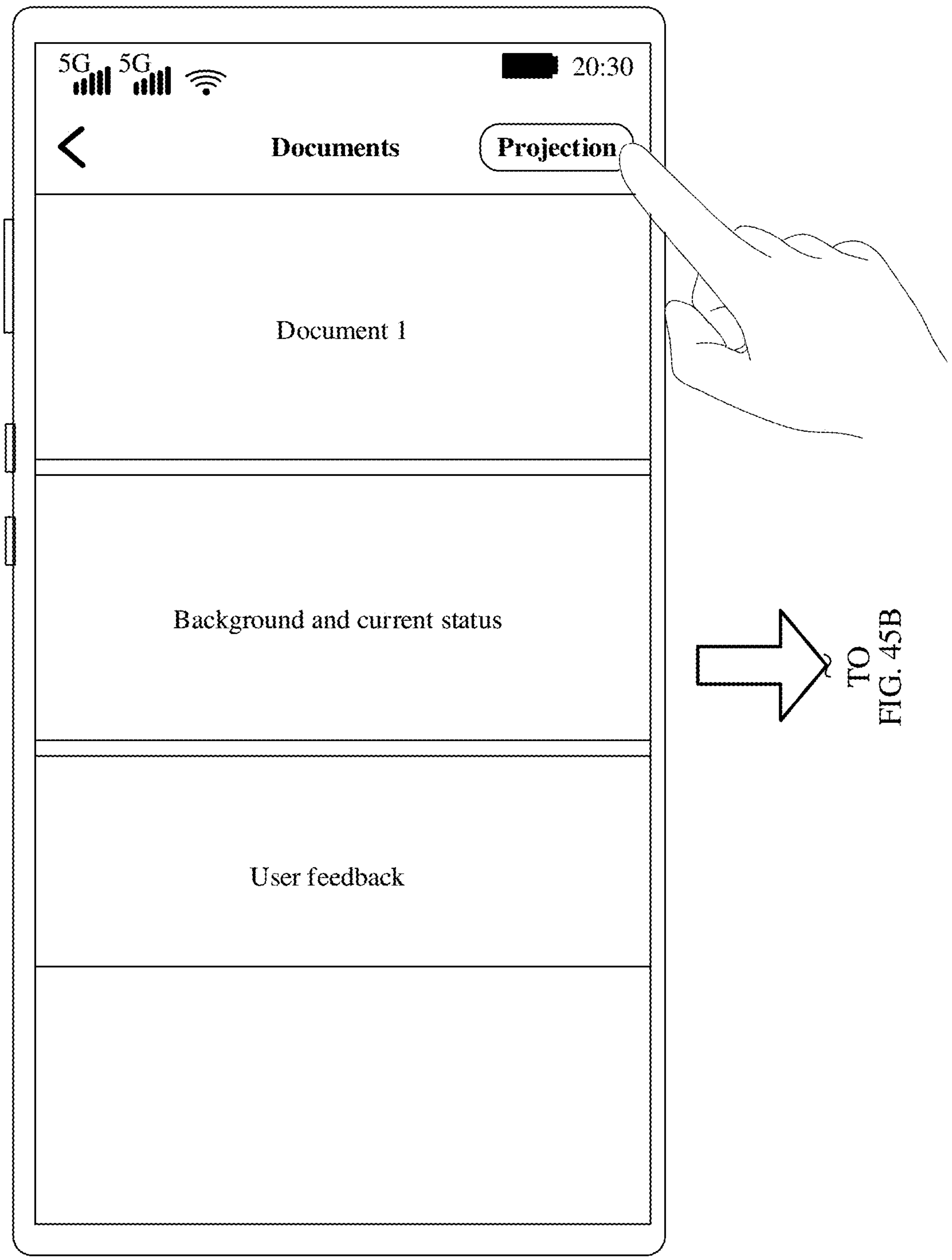
Figure 45B:
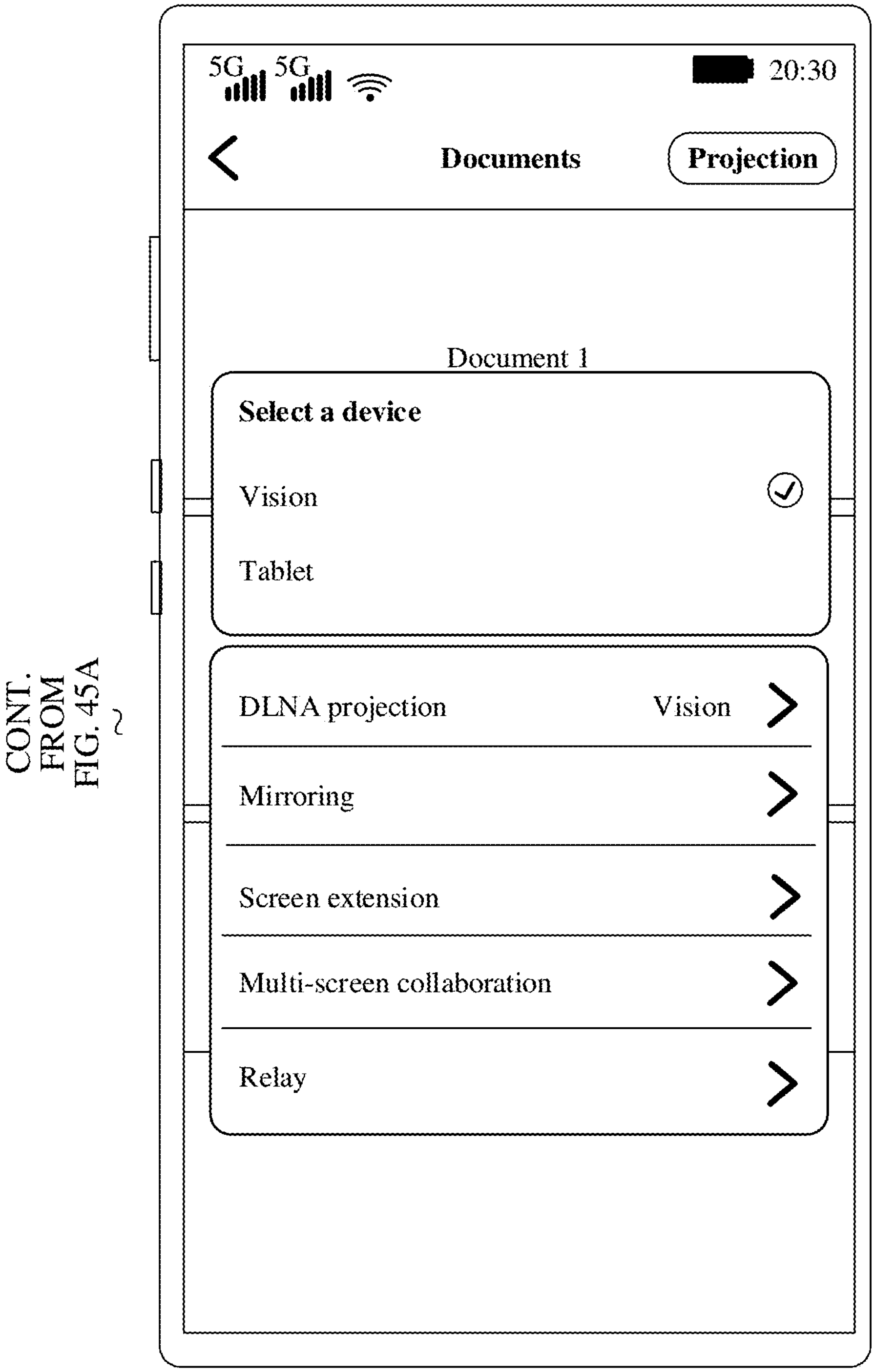

As shown in FIG. 45A, the currently executed task of the control device is document viewing. The user triggers a software/hardware switching interface display instruction on a touch display. The control device determines that the control device has currently established a connection to the Vision device, and the software/hardware switching interface displayed by the control device is shown in FIG. 45B. In the nearby device area, an icon indicating that the Vision device has been selected is displayed, and a name of another nearby device such as a table that is currently detected is also displayed. In the software/hardware switching entry area, software switching entries "DLNA projection", "mirroring", and "screen extension" corresponding to the Vision device are displayed in the front, and software switching entries "multi-screen collaboration" and "relay" corresponding to the table are displayed in the rear.

After the software/hardware switching entry of the control device is determined, the control device displays the software/hardware switching interface. This embodiment of this application provides the following four display styles of the software/hardware switching interface.

Style 1: After the user triggers display of the software/hardware switching interface, a list of nearby devices detected by the control device is displayed. After the user selects a device from the list of nearby devices, display of a plurality of software/hardware switching entries is triggered.

Figure 46A:
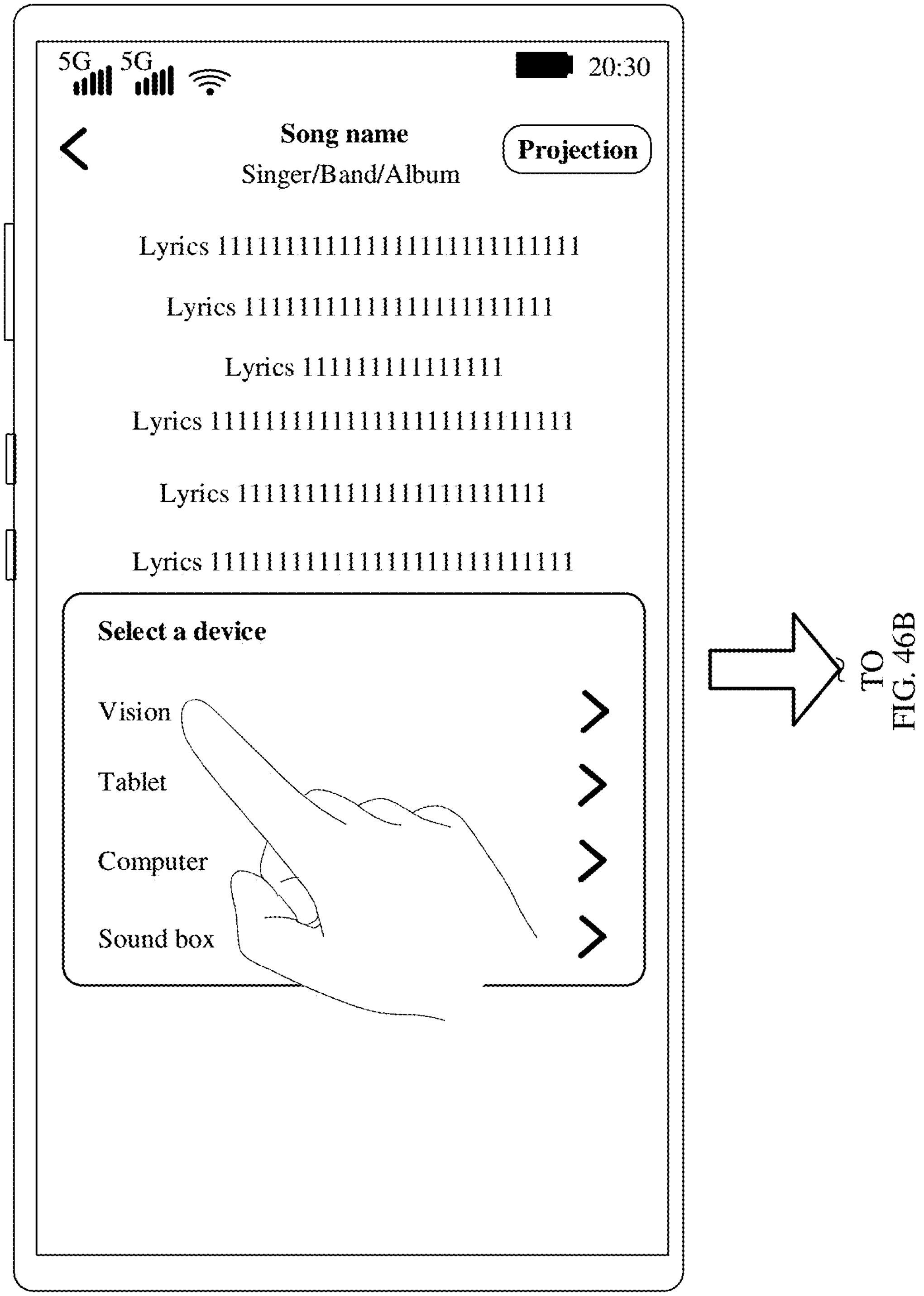
FIG. 46A to FIG. 49B are schematic diagrams of different display styles of a software/hardware switching interface according to an embodiment of this application.
Figure 46B:
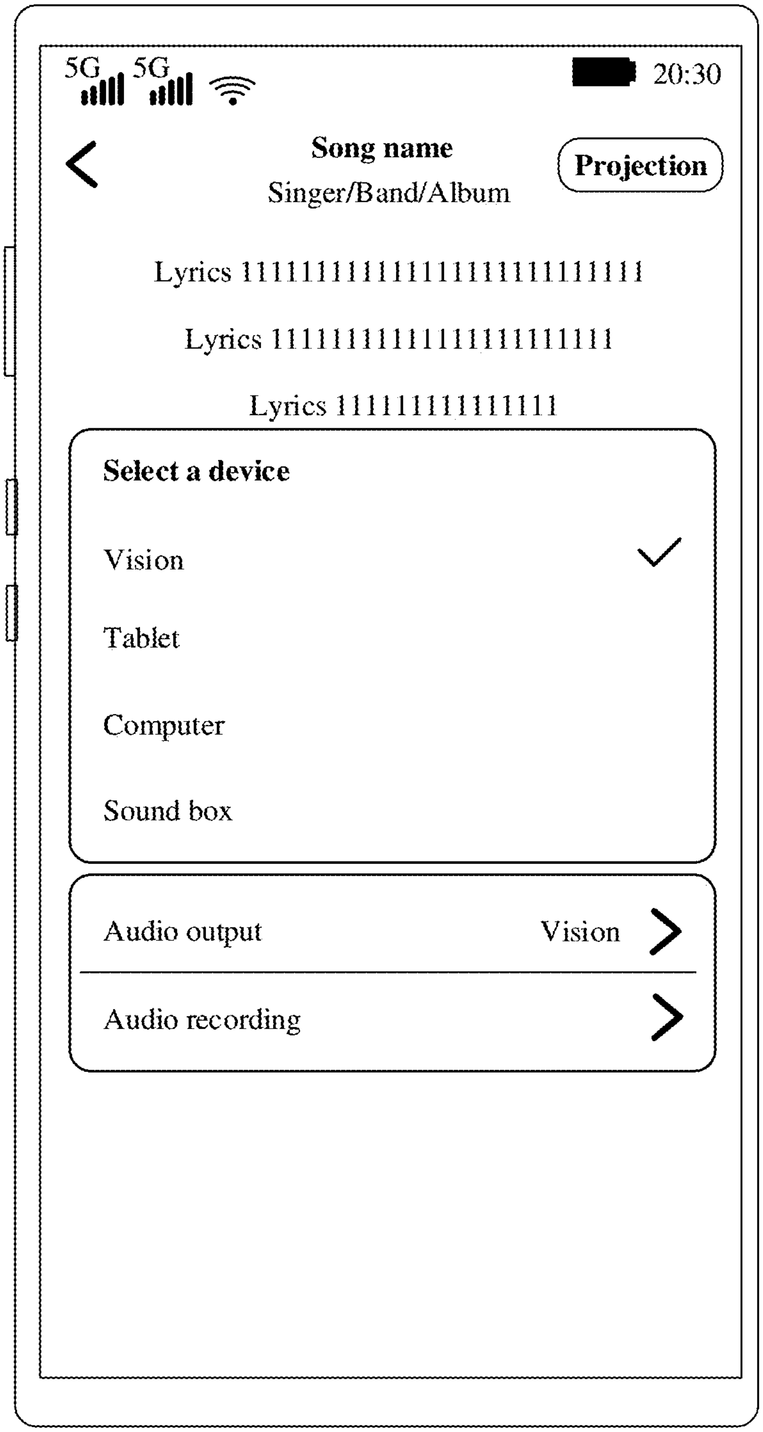

For example, the user triggers, by using a "projection" button in an application, display of the list of nearby devices, where the list of nearby devices is shown in FIG. 46A. After selecting a Vision device from the list of nearby devices, the user triggers display of a plurality of software/hardware switching entries shown in FIG. 46B.

Style 2: After the user triggers display of the hardware switching interface, a list of nearby devices detected by the control device and a plurality of software/hardware switching entries are displayed at the same time.

Figure 47:
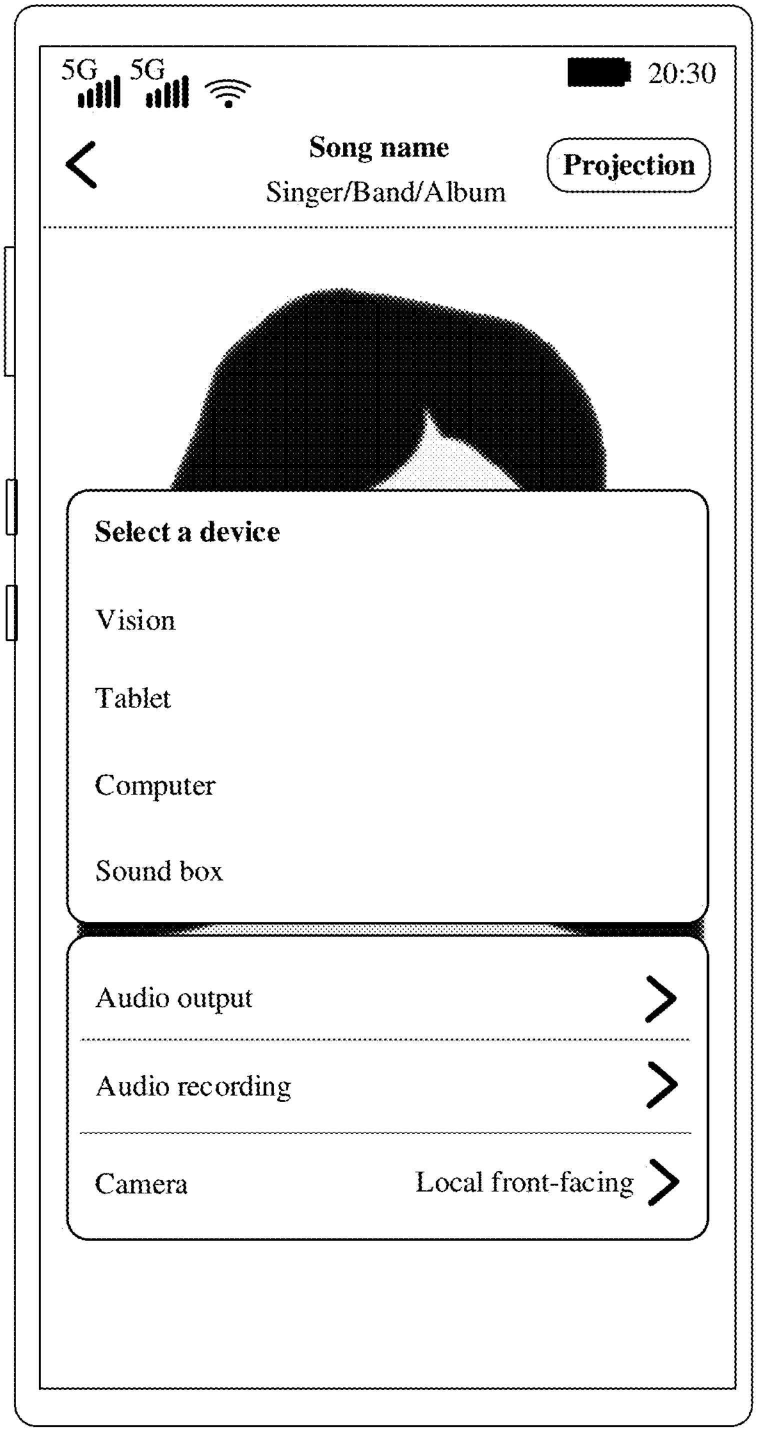

For example, after the user triggers, by using a "projection" button in an application, display of the list of nearby devices, the control device displays the software/hardware switching interface shown in FIG. 47, including the list of nearby devices currently detected by the control device and a plurality of software/hardware switching entries.

Style 3: After the user triggers display of the hardware switching interface, at least one software/hardware switching entry is displayed, where each software/hardware switching entry corresponds to one expand button. After the user triggers the expand button corresponding to the software/hardware switching entry, a list of devices that can provide a software and hardware function corresponding to the software/hardware switching entry is displayed.

Figure 48A:
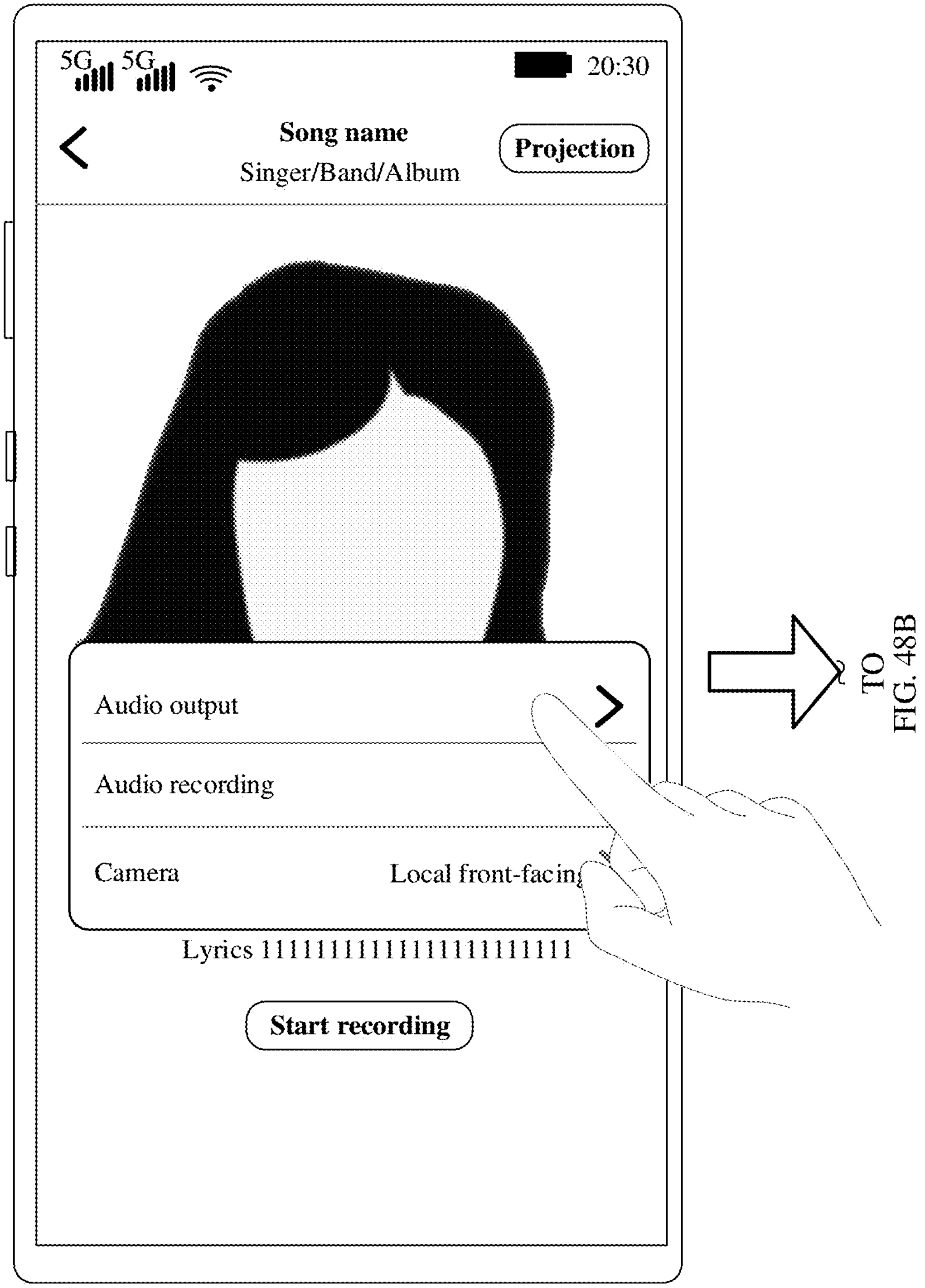
Figure 48B:
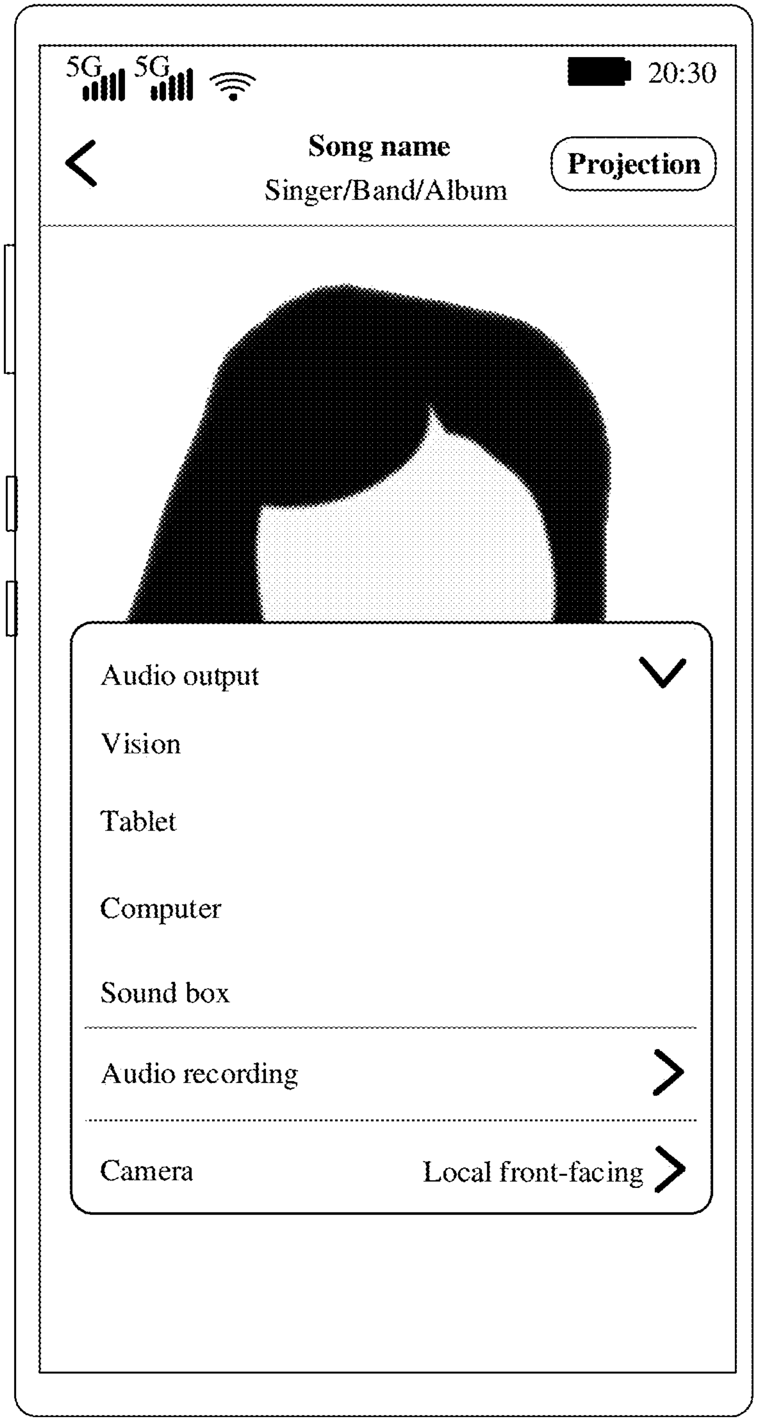

For example, the user triggers, by using a "projection" button in an application, display of a software/hardware switching entry interface shown in FIG. 48A. After the user taps an expand button corresponding to audio output, a device list shown in FIG. 48B is displayed. The user selects a Vision device from the device list, and triggers a target switching instruction. The control device uses the Vision device as an audio output device of the control device. In addition, when the user does not select a device used by the hardware switching entry, the hardware switching entry corresponds to a default option. As shown in FIG. 48A, a default option corresponding to a camera is a local front-facing camera. The user may also tap a display button corresponding to the camera to display the device list, and after the user selects a device, the user uses a video recorded by a camera of the selected device as a video input of the control device.

Figure 49A:
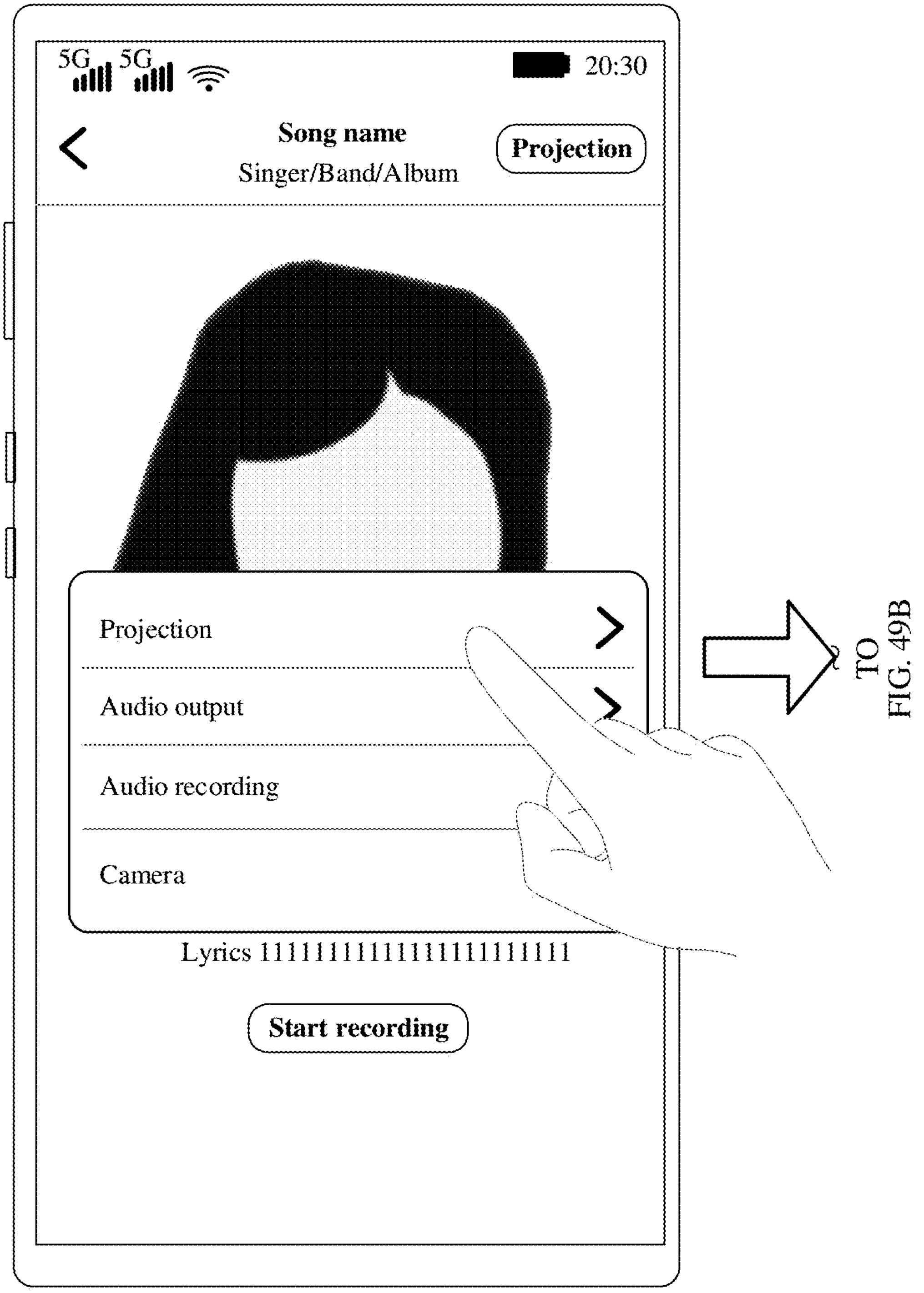
Figure 49B:
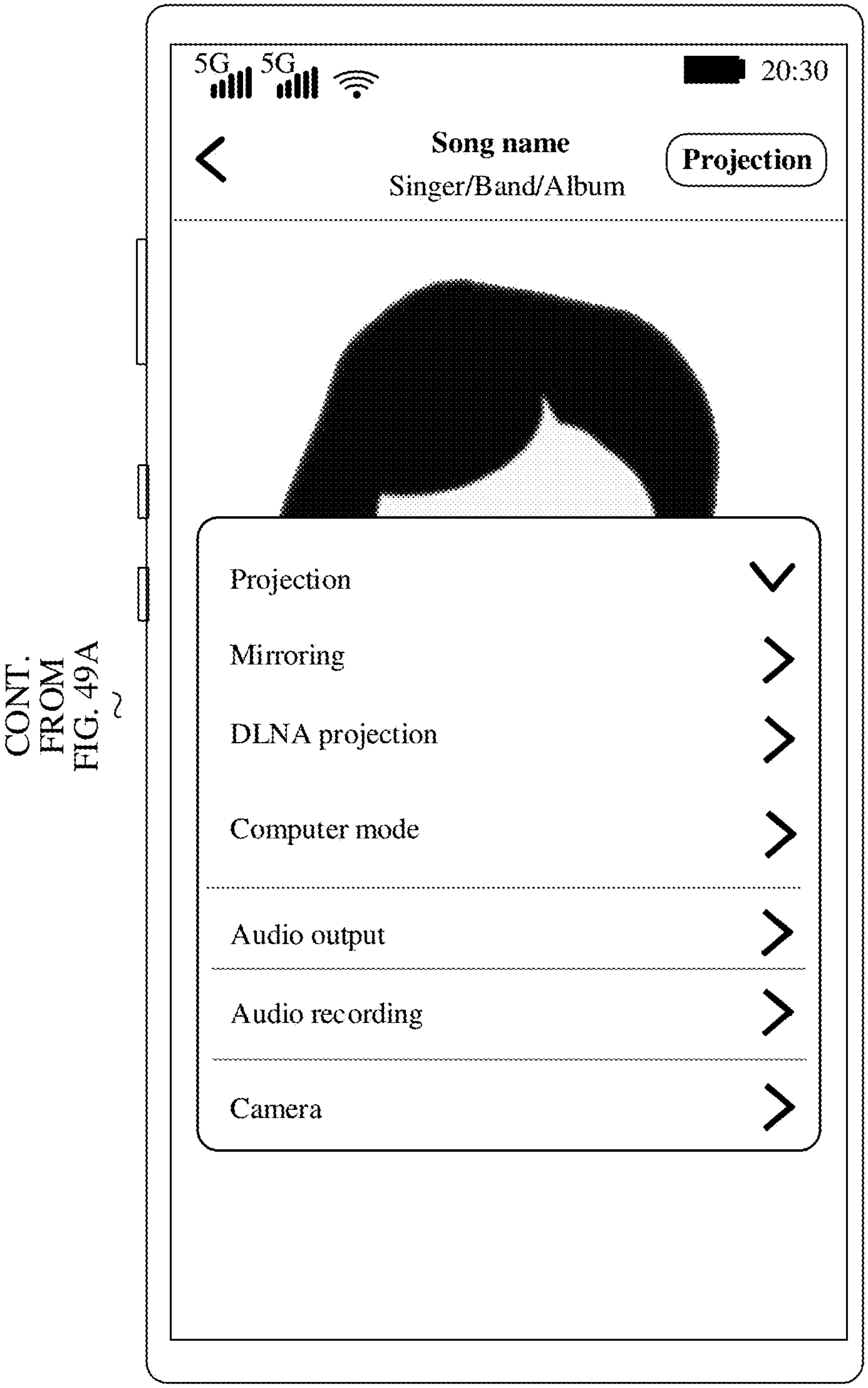

Style 4: After the user triggers display of the hardware switching interface, a hardware switching entry is displayed in the manner shown in the style 1 to the style 3. The user taps the hardware switching entry, and triggers display of a software switching entry corresponding to the hardware switching entry, as shown in FIG. 49A. The user taps the "projection" hardware switching entry, to trigger display of software switching entries "mirroring", "DLNA projection", and "computer mode" corresponding to "projection" shown in FIG. 49B.

In an optional implementation of this embodiment of this application, after the control device displays the multi-device control center interface or the software/hardware switching interface, the user triggers a target switching instruction, and the control device determines a target function corresponding to the target switching instruction, and implements the target function of the control device by using a target nearby device. During specific implementation, the target function corresponding to the target switching instruction has the following several cases:

1. The target function is a preset hardware function or software function.

After receiving the target switching instruction triggered by the user, the control device uses the preset hardware function or software function as the target function. For example, the user taps a "projection" button on an application display interface on a touch display, and the control device displays a device list on the touch display. The user selects "Vision" to trigger the target switching instruction, and the control device projects currently displayed content to the Vision device. In this scenario, the control device performs a projection function by using the "projection" button in the application. In this case, the target function corresponding to the target switching instruction is the preset projection hardware function.

2. The target function is a hardware function or a software function determined by the control device based on a hardware capability or a software capability of the target nearby device.

After the user taps a preset button in an application interface on the touch display, the control device displays a nearby device list on the touch display, and after the user selects a target nearby device, the target switching instruction is triggered. If the control device determines that the target nearby device does not have a hardware capability corresponding to the preset button, the control device determines a hardware capability of the target nearby device, and uses the hardware capability of the target nearby device as the target function.

For example, the user taps a "projection" button on an application display interface on a touch display, and the control device displays a device list on the touch display. The user selects a "sound box". The control device determines that the sound box does not have screen hardware, and a hardware capability provided by the sound box is audio output, so that the control device automatically uses the sound box as an audio output device of the control device. In this scenario, the control device performs an audio output function by using the "projection" button in the application. In this case, the target function corresponding to the target switching instruction is the audio output hardware function determined based on the hardware capability of the target peripheral device.

3. The target function is a hardware function or a software function determined by the control device based on a currently executed task.

After the user taps a preset button in an application interface on the touch display, the control device displays a nearby device list on the touch display. After the user selects a target device, a target switching instruction is triggered. The control device analyzes a currently executed task, and determines a hardware function required by the currently executed task. If the hardware function required by the currently executed task is different from the preset hardware function corresponding to the target switching instruction, the control device uses the hardware function required by the currently executed task as the target function.

Figure 50A:
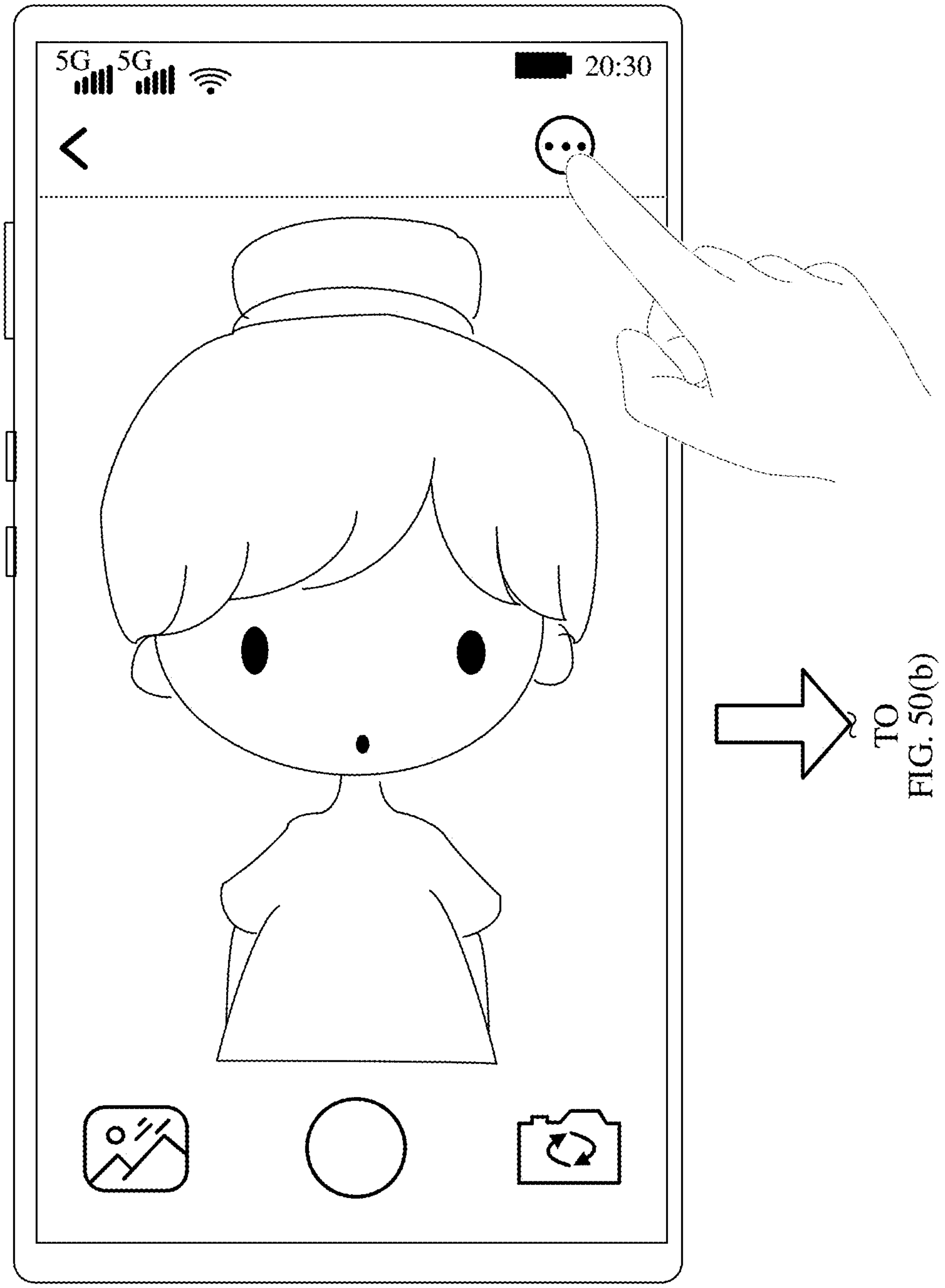
FIG. 50(*a*), FIG. 50(*b*), and FIG. 50(*c*) are schematic diagrams of a software/hardware switching interface triggered by a user to display when a control device performs a photographing task according to an embodiment of this application.
Figure 50B:
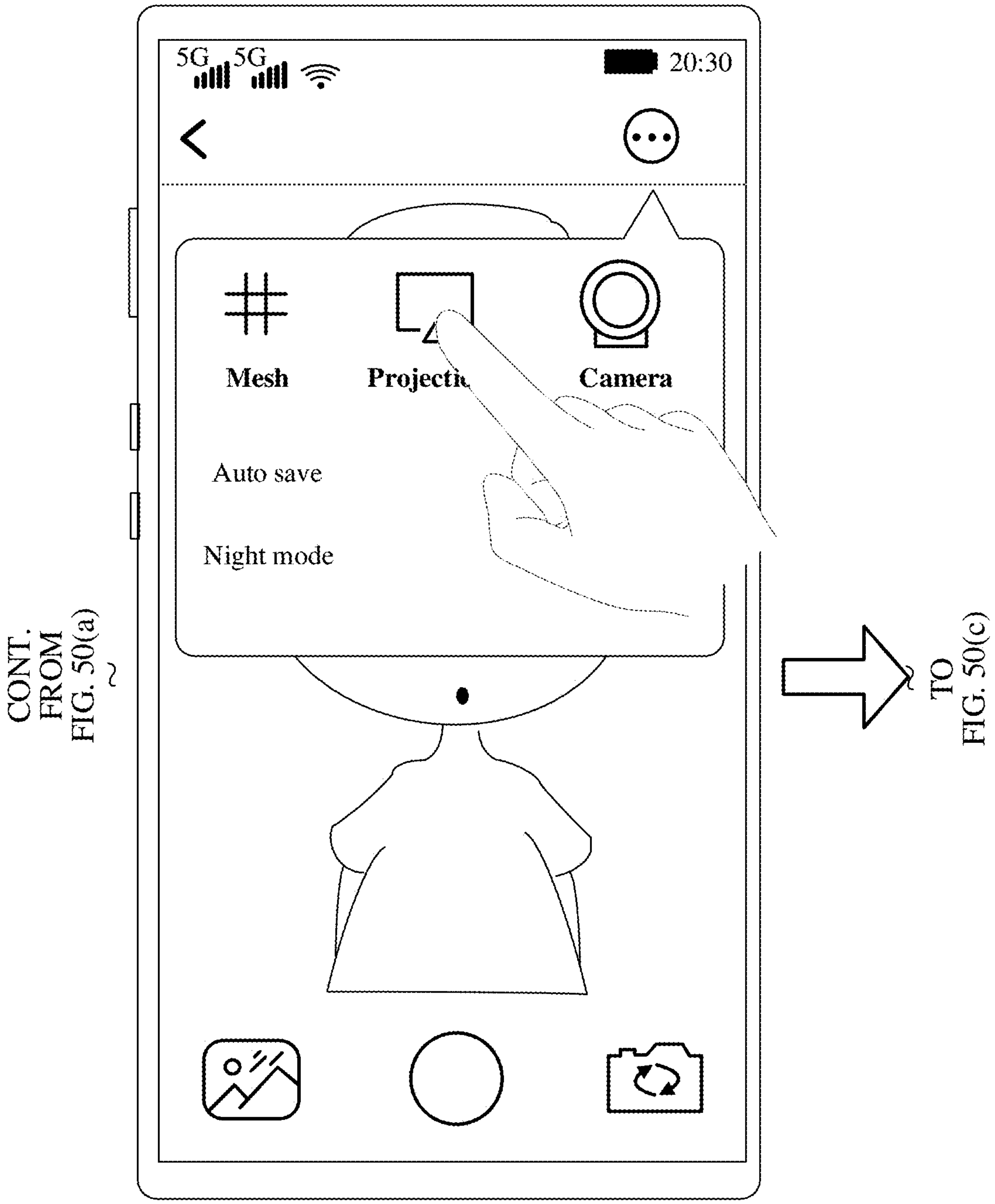
Figure 50C:
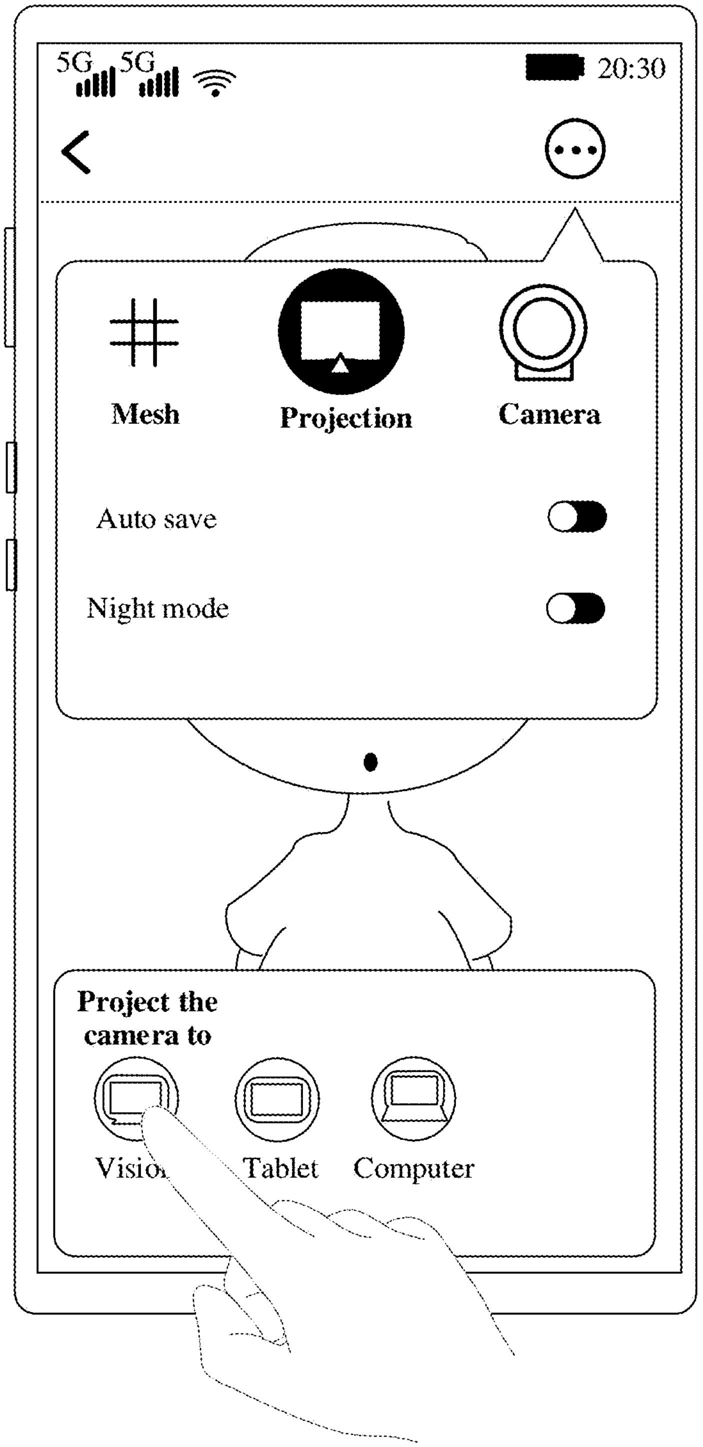
Figure 51:
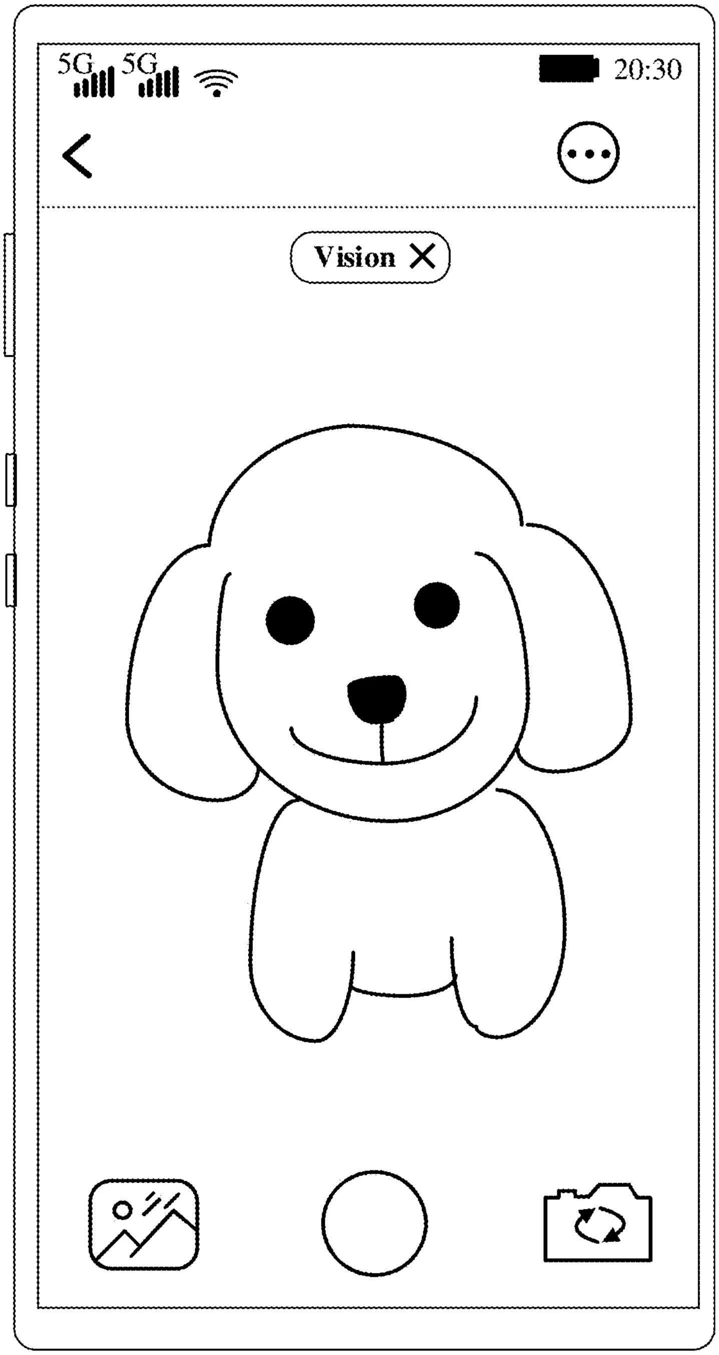
FIG. 51 is a schematic diagram of a display interface of a control device after a user triggers a target switching instruction when the control device performs a photographing task according to an embodiment of this application.
Figure 52:
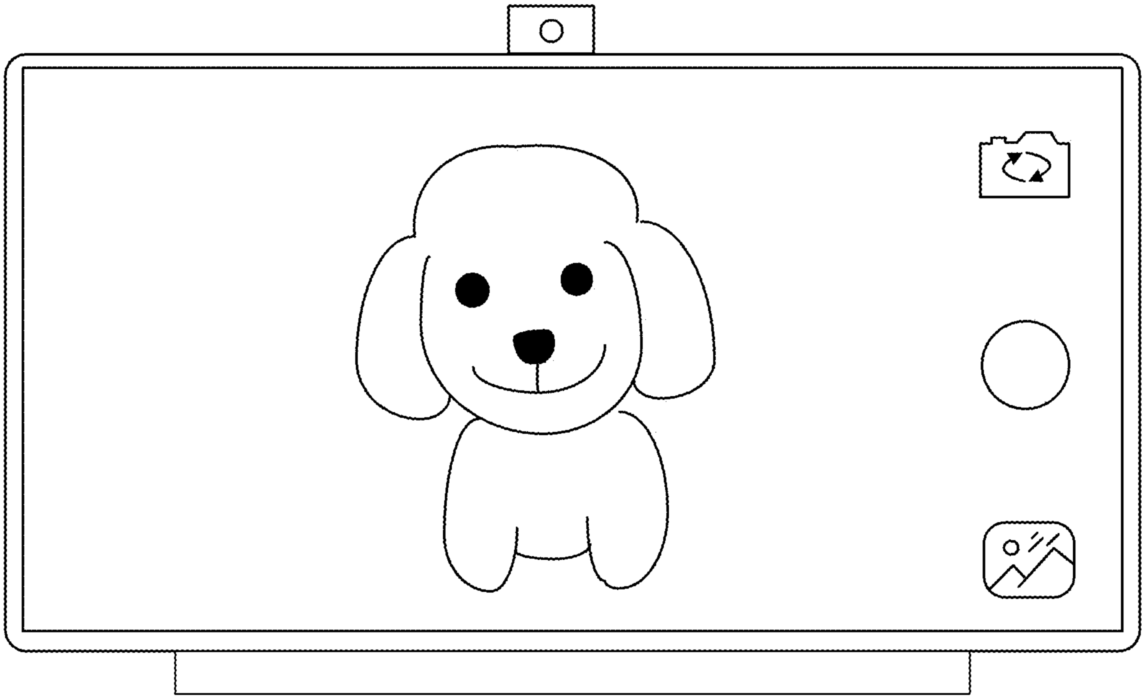
FIG. 52 is a schematic diagram of a display interface of a Vision device after a user triggers a target switching instruction when a control device performs a photographing task according to an embodiment of this application.

For example, the control device currently runs a camera application, and a photographing interface shown in FIG. 50(*a*) is displayed on the touch display of the control device. The user triggers, by using a button corresponding to a more option in the photographing interface, display of a function list shown in FIG. 50(*b*). The user selects a "projection" button from the function list displayed on the touch display, to trigger display of a hardware switching interface shown in FIG. 50(*c*). After the user chooses to project the camera application currently running on the control device to the Vision device to trigger the target switching instruction, the control device analyzes a currently executed photographing task, and determines that a hardware function required by the currently executed photographing task is a camera photographing function. In this case, the control device uses a camera of the Vision device by default to perform photographing. As shown in FIG. 51, a camera application interface is displayed on a touch display of a control device, but content displayed in the camera application interface is a video file shot by a camera of a Vision device, and the control device projects the camera application interface to the Vision device by using a projection function. As shown in FIG. 52, content displayed in the camera application interface displayed on the Vision device is also a video file shot by a local camera of the Vision device.

In addition, after the control device projects the camera application interface to the Vision device, the user may tap a button corresponding to a software function of the camera application on the control device to trigger the control device to invoke the software function of the camera application, for example, tap a button corresponding to a software function such as "add a filter" or "beauty" of the camera application. Alternatively, the user may select, by using a controller of the Vision device, in a somatosensory control manner, or the like, a button corresponding to a software function of the camera application displayed on the Vision device, to trigger the target switching instruction. After the user triggers the target switching instruction for invoking the software function of the camera application, processing may be performed in the following manners:

Manner 1: The control device performs processing.

A processor of the control device invokes an algorithm corresponding to the software function of the camera application, to perform image processing on a video file or an image that is shot by a camera of the Vision device and that is sent by the Vision device, and displays a video file or an image obtained after the image processing on the touch display. In addition, the control device projects content currently displayed on the touch display to the Vision device, and the Vision device displays the video file or the image obtained after the image processing.

Manner 2: The Vision device performs processing.

After the control device projects the camera application interface to the Vision device, the control device sends an algorithm corresponding to the software function of the camera application to the Vision device, and the Vision device stores the received algorithm corresponding to the software function of the camera application into a memory of the Vision device. After detecting that the user triggers an instruction for invoking the software function of the camera application, the Vision device invokes the algorithm corresponding to the software function of the camera application to perform image processing on a video file or an image shot by a camera of the Vision device, and displays a processed video file or image on the Vision device. In addition, the Vision device sends the video file or image obtained after image processing to the control device, and the control device displays the received video file or image on the touch display of the control device.

Figure 53:
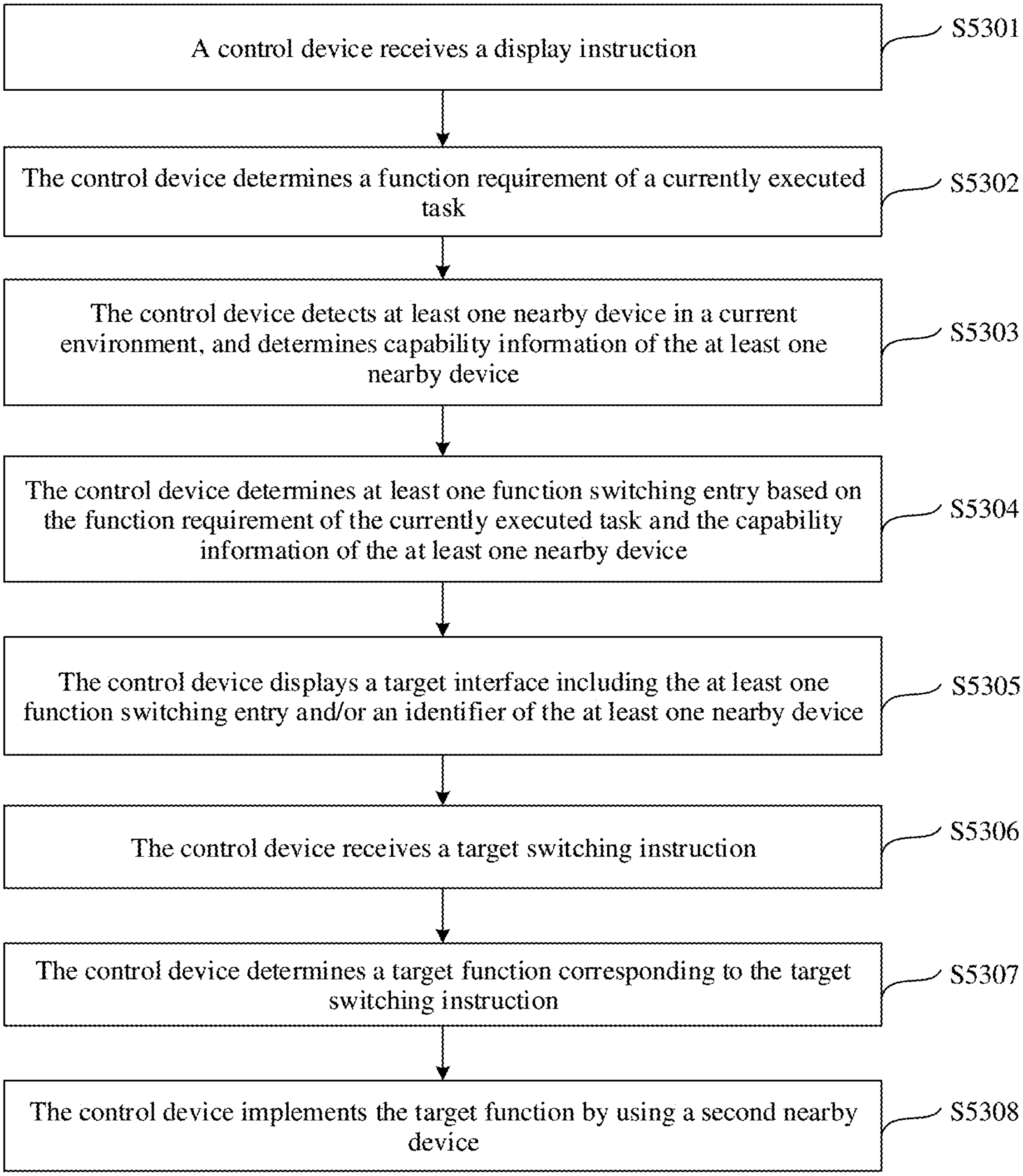
FIG. 53 is a schematic flowchart of a function switching entry determining method according to an embodiment of this application.

FIG. 53 is a schematic flowchart of a function switching entry determining method according to an embodiment of this application. The method includes the following steps.

Step S5301: A control device receives a display instruction.

Step S5302: The control device determines a function requirement of a currently executed task.

It should be noted that the currently executed task of the control device may be running an application, displaying a system interface, or the like. For example, the currently executed task of the control device is playing a video. If the control device currently displays a video pause interface in this case, the currently executed task of the control device is still video playing.

During specific implementation, for a method for determining, by the control device, the function requirement of the currently executed task, refer to the method in Embodiment 4 to Embodiment 7 or Embodiment 12 to Embodiment 14 of this application. Details are not described herein again.

Step S5303: The control device detects at least one nearby device in a current environment, and determines capability information of the at least one nearby device.

Capability information of a nearby device is a software capability or a hardware capability of the nearby device. For example, if the nearby device includes a sound box, capability information of the sound box is supporting functions such as audio output, audio recording, and intelligent volume adjustment.

It should be noted that, during specific implementation, if the control device has determined, before receiving the display instruction, at least one nearby device in a current network, the control device may directly determine capability information of the at least one nearby device, and does not need to detect nearby devices in the current network.

During specific implementation, for a method for determining, by the control device, capability information of a nearby device, refer to the methods in Embodiment 1 to Embodiment 3 or Embodiment 8 to Embodiment 11 of this application. Details are not described herein again.

Step S5304: The control device determines at least one function switching entry based on the function requirement of the currently executed task and the capability information of the at least one nearby device.

Step S5305: The control device displays a target interface including at least one function switching entry and/or an identifier of the at least one nearby device.

Step S5306: The control device receives a target switching instruction.

It should be noted that the target switching instruction may be an instruction triggered by the user in the target interface, and is used to instruct the control device to map a target function to a target nearby device.

Step S5307: The control device determines the target function corresponding to the target switching instruction.

During specific implementation, for a manner in which the control device determines the target function corresponding to the switching instruction, refer to the implementation of determining the target function corresponding to the target switching instruction in the foregoing embodiments. Details are not described herein again.

Step S5308: The control device implements the target function by using a second nearby device.

Figure 54:
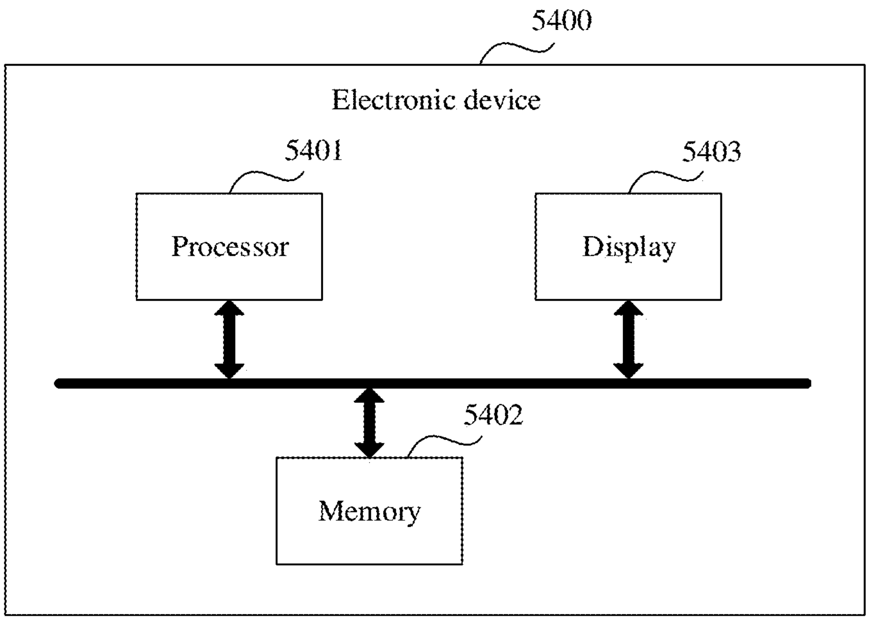
FIG. 54 is a schematic diagram of a structure of another electronic device according to an embodiment of this application.

Based on the foregoing embodiments, an embodiment of this application further provides an electronic device. The electronic device is configured to implement the function switching entry determining method according to the foregoing embodiments. As shown in FIG. 54, the electronic device 5400 includes a processor 5401, a memory 5402, and a display 5403, and certainly may further include peripheral or internal hardware shown in FIG. 1.

The memory 5402 and the processor 5401 are connected to each other. Optionally, the processor 5401 and the memory 5402 may be connected to each other by using a bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 54, but this does not mean that there is only one bus or only one type of bus.

Specifically, the memory 5402 is configured to store program instructions. Specifically, the program instructions may include program code, and the program code includes computer operation instructions. The memory 5402 may include a random access memory (random access memory, RAM), or may be a nonvolatile memory (nonvolatile memory), for example, at least one magnetic disk memory. The processor 5401 executes the instruction stored in the memory 5402, so that the electronic device 5400 performs the following operations: determining a function requirement of a currently executed task; detecting at least one first nearby device in a current environment, and determining capability information of the at least one first nearby device; and determining at least one first function switching entry based on the function requirement of the currently executed task and the capability information of the at least one first nearby device. The first function switching entry is used to map a function corresponding to the first function switching entry to the at least one first nearby device, and the function corresponding to the first function switching entry is some or all of functions in the function requirement of the currently executed task. The display 5403 is configured to display the at least one first function switching entry.

In an implementation, when the computer program is executed by the processor 5401, the electronic device is enabled to further perform the following operations: receiving a display instruction before determining the function requirement of the currently executed task, where the display instruction is used to instruct the electronic device 5400 to display a target interface; and displaying the target interface on the display 5403 after the at least one first function switching entry is determined based on the function requirement of the currently executed task and the capability information of the at least one first nearby device. The target interface includes the at least one first function switching entry and/or an identifier of the at least one first nearby device.

In an implementation, the target interface is a multi-device control center interface, and the display instruction is triggered by the user by using an operating system-level button or a preset gesture; or the target interface is a software/hardware switching interface, and the display instruction is triggered by the user by using a preset button in an application interface.

In an implementation, the at least one first function switching entry includes: at least one hardware switching entry and/or at least one software switching entry. When the computer program is executed by the processor 5401, the electronic device 5400 is enabled to specifically perform the following operations: determining the at least one hardware switching entry based on a hardware function requirement of the currently executed task and hardware capability information of the at least one first nearby device; and/or determining the at least one software switching entry based on a software function requirement of the currently executed task and software capability information of the at least one first nearby device.

In an implementation, when the computer program is executed by the processor 5401, the electronic device 5400 is enabled to further perform the following operations: determining capability information of a second nearby device that currently establishes a connection to the electronic device 5400; and determining at least one second function switching entry based on the capability information of the second nearby device, where the second function switching entry is configured to map a function corresponding to the second function switching entry to the second nearby device, and the function corresponding to the second function switching entry is some or all of the functions in the function requirement of the currently executed task.

In an implementation, when the computer program is executed by the processor 5401, the electronic device 5400 is enabled to further perform the following operation: after the display displays the target interface, receiving a target switching instruction, where the target switching instruction is used to instruct the electronic device 5400 to map a target function to a target nearby device; and in response to the target switching instruction, implementing the target function by using the target nearby device.

In an implementation, the target function is a preset hardware function or software function; or the target function is a hardware function or a software function that is determined by the electronic device 5400 based on a hardware capability or a software capability of the target nearby device; or the target function is a hardware function or a software function that is determined by the electronic device 5400 based on the currently executed task.

In an implementation, the currently executed task of the control device is playing a video, and the first nearby device in the current network connection is a Vision device; and when the computer program is executed by the processor 5401, the electronic device 5400 is enabled to specifically perform the following operations: determining that the function requirement of the currently executed task is video output, determining that capability information of the Vision device is supporting audio and video playing, and determining that the first function switching entry is projection; or the currently executed task of the control device is playing audio, and the first nearby device in the current network connection is a sound box; and when the computer program is executed by the processor 5401, the electronic device 5400 is enabled to specifically perform the following operations: determining that the function requirement of the currently executed task is audio output, determining that capability information of the sound box is supporting audio playing, and determining that the first function switching entry is audio output; or the currently executed task of the control device is Karaoke, and the first nearby device in the current network connection is a Vision device and a sound box; and when the computer program is executed by the processor 5401, the electronic device 5400 is enabled to specifically perform the following operations: determining that the function requirement of the currently executed task is video output, audio output, and audio recording, determining that capability information of the Vision device is supporting audio and video playing, determining that capability information of the sound box is supporting audio playing and audio recording, and determining that the first function switching entry is projection, audio output, and audio recording.

Figure 55:
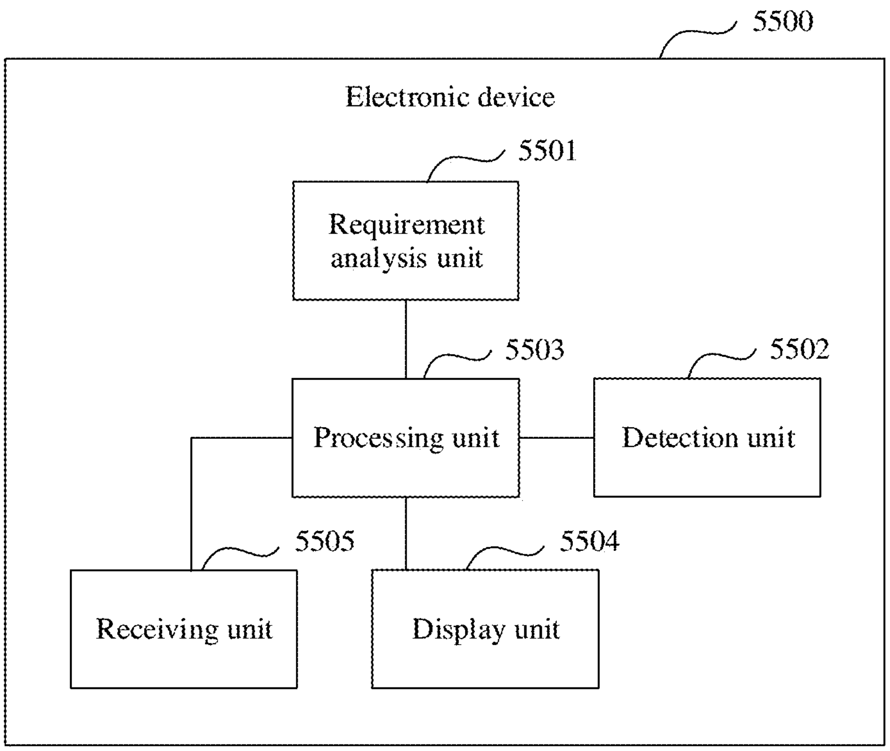
FIG. 55 is a schematic diagram of a structure of another electronic device according to an embodiment of this application.

Based on the foregoing embodiments, this application further provides an electronic device. The electronic device is configured to implement the function switching entry determining method in the foregoing embodiments. As shown in FIG. 55, the electronic device 5500 includes a requirement analysis unit 5501, a detection unit 5502, and a processing unit 5503. The following describes functions of each unit.

The requirement analysis unit 5501 is configured to determine a function requirement of a currently executed task.

The detection unit 5502 is configured to detect at least one first nearby device in a current environment, and determine capability information of the at least one first nearby device.

The processing unit 5503 is configured to determine at least one first function switching entry based on the function requirement of the currently executed task and the capability information of the at least one first nearby device. The first function switching entry is used to map a function corresponding to the first function switching entry to the at least one first nearby device, and the function corresponding to the first function switching entry is some or all of functions in the function requirement of the currently executed task.

A display unit 5504 is configured to display the at least one first function switching entry.

In an implementation, the terminal device 5500 further includes a receiving unit 5505. The receiving unit 5505 is configured to receive a display instruction. The display unit 5504 is further configured to display a target interface. The target interface includes the at least one first function switching entry and/or an identifier of the at least one first nearby device.

In an implementation, the target interface is a multi-device control center interface, and the display instruction is triggered by the user by using an operating system-level button or a preset gesture; or the target interface is a software/hardware switching interface, and the display instruction is triggered by the user by using a preset button in an application interface.

In an implementation, the at least one first function switching entry includes: at least one hardware switching entry and/or at least one software switching entry. The processing unit 5503 is specifically configured to: determine the at least one hardware switching entry based on a hardware function requirement of the currently executed task and hardware capability information of the at least one first nearby device; and/or determine the at least one software switching entry based on a software function requirement of the currently executed task and software capability information of the at least one first nearby device.

In an implementation, the processing unit 5503 is further configured to: determine capability information of a second nearby device that currently establishes a connection to the electronic device 5500; and determine at least one second function switching entry based on the capability information of the second nearby device. The second function switching entry is used to map a function corresponding to the second function switching entry to the second nearby device, and the function corresponding to the second function switching entry is some or all of the functions in the function requirement of the currently executed task.

In an implementation, the receiving unit 5505 is further configured to receive a target switching instruction. The processing unit 5503 is further configured to: in response to the target switching instruction, implement the target function by using the target nearby device.

In an implementation, the target function is a preset hardware function or software function; or the target function is a hardware function or a software function that is determined by the electronic device 5500 based on a hardware capability or a software capability of the target nearby device; or the target function is a hardware function or a software function that is determined by the electronic device 5500 based on the currently executed task.

In an implementation, the currently executed task of the control device is playing a video, and the first nearby device in the current network connection is a Vision device; the requirement analysis unit 5501 is configured to determine that the function requirement of the currently executed task is video output; the detection unit 5502 is configured to determine that capability information of the Vision device is supporting audio and video playing; and the processing unit 5503 is configured to determine that the first function switching entry is projection; or the currently executed task of the control device is playing audio, and the first nearby device in the current network connection is a sound box; the requirement analysis unit 5501 is configured to determine that the function requirement of the currently executed task is audio output; the detection unit 5502 is configured to determine that capability information of the sound box is supporting audio playing; and the processing unit 5503 is configured to determine that the first function switching entry is audio output; or the currently executed task of the control device is Karaoke, and the first nearby device in the current network connection is a Vision device and a sound box; the requirement analysis unit 5501 is configured to determine that the function requirement of the currently executed task is video output, audio output, and audio recording; the detection unit 5502 is configured to determine that capability information of the Vision device is supporting audio and video playing, and determine that capability information of the sound box is supporting audio playing and audio recording; and the processing unit 5503 is configured to determine that the first function switching entry is projection, audio output, and audio recording.

Based on the foregoing embodiments, an embodiment of this application further provides a computer storage medium. The computer storage medium stores a computer program. When the computer program is executed by a computer, the computer is enabled to perform the method provided in the foregoing embodiments.

Based on the foregoing embodiments, an embodiment of this application further provides a chip. The chip is configured to read a computer program stored in a memory, to implement the method provided in the foregoing embodiments.

Based on the foregoing embodiments, an embodiment of this application further provides a chip system. The chip system includes a processor, configured to support a computer apparatus in implementing functions related to a control device in the method provided in the foregoing embodiments. In a possible design, the chip system further includes a memory, and the memory is configured to store a program and data that are necessary for the computer apparatus. The chip system may include a chip, or may include a chip and another discrete component.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that, a person skilled in the art can make various modifications and variations to this application without departing from the scope of this application. This application is intended to cover these modifications and variations of this application provided that they fall within the scope of the claims of this application and their equivalent technologies.

What is claimed is:

1. A method comprising:

displaying, by a first electronic device, an interface of an application, wherein the application comprises a first function and a second function, wherein the first function is associated with a first hardware requirement of a task to be executed, and wherein the second function is associated with a second hardware requirement of the task to be executed;

detecting, by the first electronic device, a first operation of a user;

displaying, by the first electronic device, a switching interface in response to the first operation of the user, wherein the switching interface comprises a first entry corresponding to the first function, a second entry corresponding to the second function, a first list corresponding to the first entry, and a second list corresponding to the second entry;

detecting, by the first electronic device, a second operation performed by the user on a first identifier in the first list, wherein the first identifier instructs to invoke first hardware of a second electronic device to handle the first function of the task;

in response to the second operation, invoking, by the first electronic device, the first hardware of the second electronic device;

detecting, by the first electronic device, a third operation performed by the user on a second identifier in the second list, wherein the third operation on the second identifier instructs to invoke second hardware of the second electronic device to handle the second function of the task;

in response to the third operation, invoking, by the first electronic device, the second hardware of the second electronic device; and performing, after the invoking, by the first electronic device, the second hardware of the second electronic device:

detecting, by the first electronic device, a fourth operation performed by the user on a first button corresponding to a software function of a second application, the second application corresponding to the second hardware; and invoking, by the first electronic device, the software function of the second application corresponding to the second hardware.

2. The method according to claim 1, wherein the method further comprises:

determining a function requirement of a task currently executed by the first electronic device; and detecting the second electronic device that is in a current network connection, and determining capability information of the second electronic device.

3. The method according to claim 2, wherein the method further comprises:

determining the first list and the second list based on the capability information of the second electronic device.

4. A first electronic device, comprising a processor, a non-transitory memory and a display, wherein the memory is configured to store one or more computer programs, and when the computer program is executed by the processor, the first electronic device is caused to perform:

displaying an interface of an application on the display, wherein the application comprises a first function and a second function, wherein the first function is associated with a first hardware requirement of a task to be executed, and wherein the second function is associated with a second hardware requirement of the task to be executed;

detecting a first operation of a user on the display;

displaying a switching interface on the display in response to the first operation of the user, wherein the switching interface comprises a first entry corresponding to the first function, a second entry corresponding to the second function, a first list corresponding to the first entry, and a second list corresponding to the second entry;

detecting a second operation performed by the user on a first identifier in the first list, wherein the second operation on the first identifier instructs to invoke first hardware of a second electronic device to handle the first function of the task;

in response to the second operation, invoking the first hardware of the second electronic device;

detecting a third operation performed by the user on a second identifier in the second list, wherein the third operation on the second identifier instructs to invoke second hardware of the second electronic device to handle the second function of the task;

in response to the third operation, invoking the second hardware of the second electronic device; and performing, after the invoking the second hardware of the second electronic device:

detecting a fourth operation performed by the user on a first button corresponding to a software function of a second application, the second application corresponding to the second hardware; and invoking the software function of the second application corresponding to the second hardware.

5. The first electronic device according to claim 4, wherein the first electronic device is further caused to perform:

determining a function requirement of a task currently executed by the first electronic device; and detecting the second electronic device that is in a current network connection, and determining capability information of the second electronic device.

6. The first electronic device according to claim 5, wherein the first electronic device is further caused to perform:

determining the first list and the second list based on the capability information of the second electronic device.

7. A method comprising:

displaying, by a first electronic device, an interface of a first application, wherein the first application comprises a first function and a second function, wherein the first function is associated with a first hardware requirement of a task to be executed, and wherein the second function is associated with a second hardware requirement of the task to be executed;

detecting, by the first electronic device, a first operation of a user;

displaying, by the first electronic device, a switching interface in response to the first operation of the user, wherein the switching interface comprises a first entry corresponding to the first function, a second entry corresponding to the second function, a first list corresponding to the first entry, and a second list corresponding to the second entry;

detecting, by the first electronic device, a second operation performed by the user on a first identifier in the first list, wherein the second operation on the first identifier instructs to invoke first hardware of a second electronic device to handle the first function of the task;

in response to the second operation, invoking, by the first electronic device, the first hardware of the second electronic device;

implementing, by the second electronic device, the first function using the first hardware;

detecting, by the first electronic device, a third operation performed by the user on a second identifier in the second list, wherein the third operation on the second identifier instructs to invoke second hardware of the second electronic device to handle the second function of the task;

in response to the third operation, invoking, by the first electronic device, the second hardware of the second electronic device;

implementing, by the second electronic device, the second function using the second hardware; and performing, after the invoking, by the first electronic device, the second hardware of the second electronic device:

detecting, by the first electronic device, a fourth operation performed by the user on a first button corresponding to a software function of a second application, the second application corresponding to the second hardware; and invoking, by the first electronic device, the software function of the second application corresponding to the second hardware.

8. The method according to claim 7, wherein the method further comprises:

determining a function requirement of a task currently executed by the first electronic device; and detecting the second electronic device that is in a current network connection, and determining capability information of the second electronic device.

9. The method according to claim 8, wherein the method further comprises:

determining the first list and the second list based on the capability information of the second electronic device.

* * * * *